(12) United States Patent
Tobiason et al.

(10) Patent No.: US 6,847,457 B2
(45) Date of Patent: Jan. 25, 2005

(54) INTERFEROMETER USING INTEGRATED IMAGING ARRAY AND HIGH-DENSITY PHASE-SHIFTING ARRAY

(75) Inventors: Joseph D. Tobiason, Woodinville, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 269 days.

(21) Appl. No.: 10/282,110

(22) Filed: Oct. 29, 2002

(65) Prior Publication Data

US 2004/0080754 A1 Apr. 29, 2004

(51) Int. Cl.[7] ............................................... G01B 9/02
(52) U.S. Cl. ..................................................... 356/495
(58) Field of Search .............................. 356/457, 458, 356/491, 492, 495, 511

(56) References Cited

U.S. PATENT DOCUMENTS

| | | | |
|---|---|---|---|
| 5,073,294 A | 12/1991 | Shannon et al. | |
| 5,528,287 A | 6/1996 | Stern | |
| 6,018,393 A | * 1/2000 | Takishima et al. | .......... 356/511 |
| 6,055,103 A | 4/2000 | Woodgate et al. | |
| 6,160,597 A | 12/2000 | Schadt et al. | |
| 6,300,991 B1 | 10/2001 | Schadt et al. | |
| 6,304,330 B1 | 10/2001 | Millerd et al. | |
| 6,369,869 B2 | 4/2002 | Schadt et al. | |

FOREIGN PATENT DOCUMENTS

DE    19652113 A1 * 6/1998 ............. G01J/9/02

OTHER PUBLICATIONS

New U.S. Patent Application, Oct. 15, 2002, Tobiason et al.
Harrold, Jonathan et al., "3D Display Systems Hardware Research at Sharp Laboratories of Europe: an update," Sharp Technical Journal, May 21, 1999, pp. 1–7.
Moia, Franco et al., "Optical LPP/LCP Devices: A new Generation of Optical Security Elements," Proceedings of SPIE; Optical Security and Counterfeit Deterrence Techniques III, vol. 3973, pp. 196–203, San Jose (CA), Jan. 27–28, 2000.

\* cited by examiner

Primary Examiner—Samuel A. Turner
Assistant Examiner—Michael A. Lyons
(74) Attorney, Agent, or Firm—Oliff & Berridge, PLC

(57) ABSTRACT

An integrated imaging element for an interferometer generates at least one interference image that includes multiple interference portions with different relative phase shifts interleaved in a pattern having a high spatial frequency in the image. The interleaved pattern is at least partially determined by the pattern of a high density relative retarder array used in the integrated imaging element. In various embodiments, the multiple interference portions are interleaved in a checkerboard-like pattern across the entire surface of a detector device. As a result, various non-common mode errors present in various interferometers that generate separate non-interleaved images for each relative phase are reduced or eliminated.

43 Claims, 18 Drawing Sheets

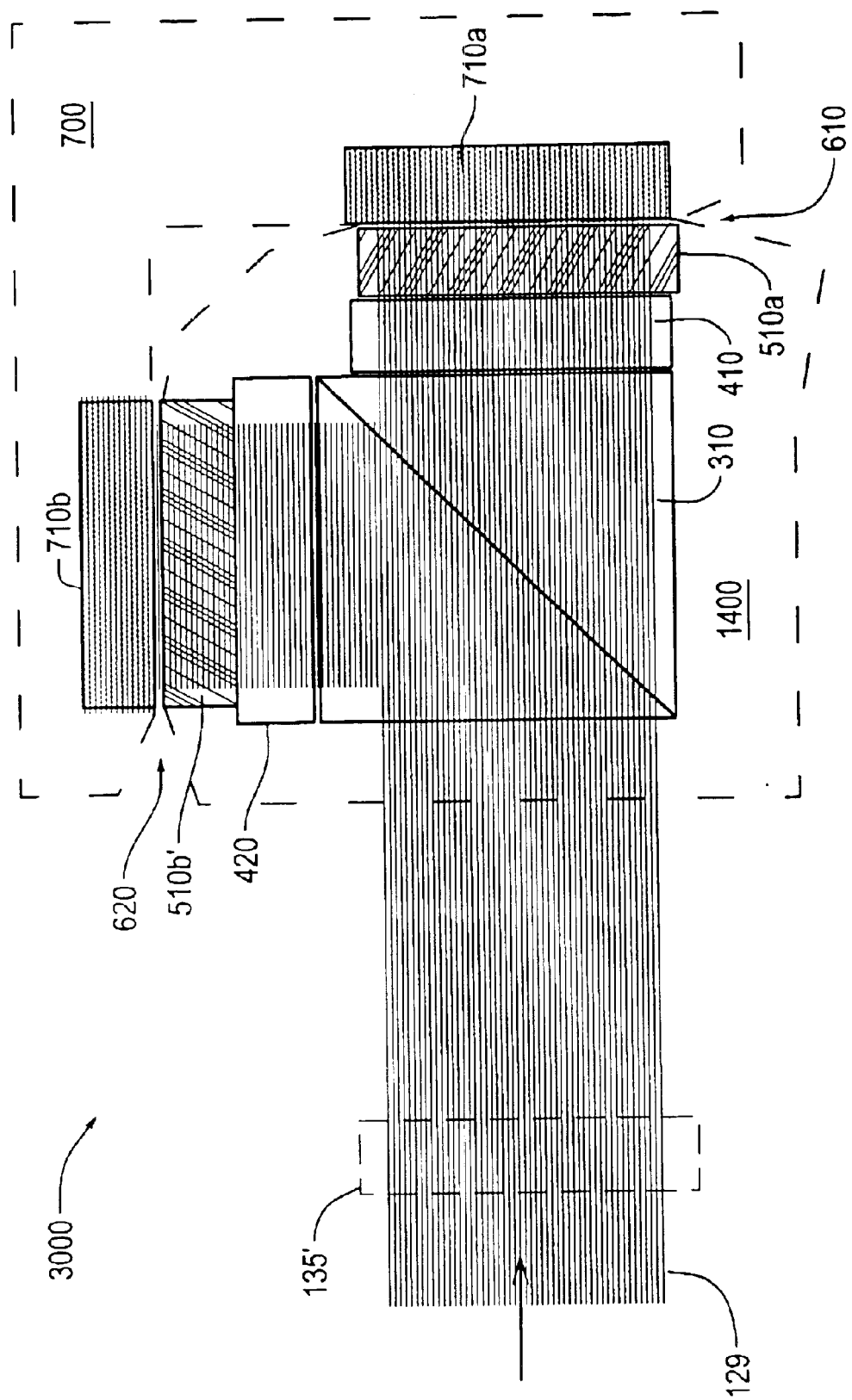

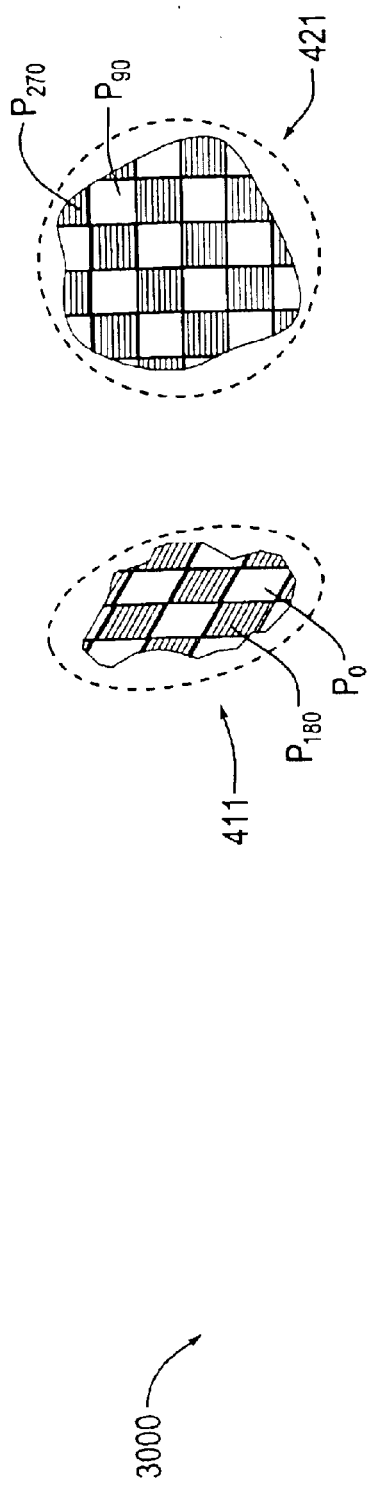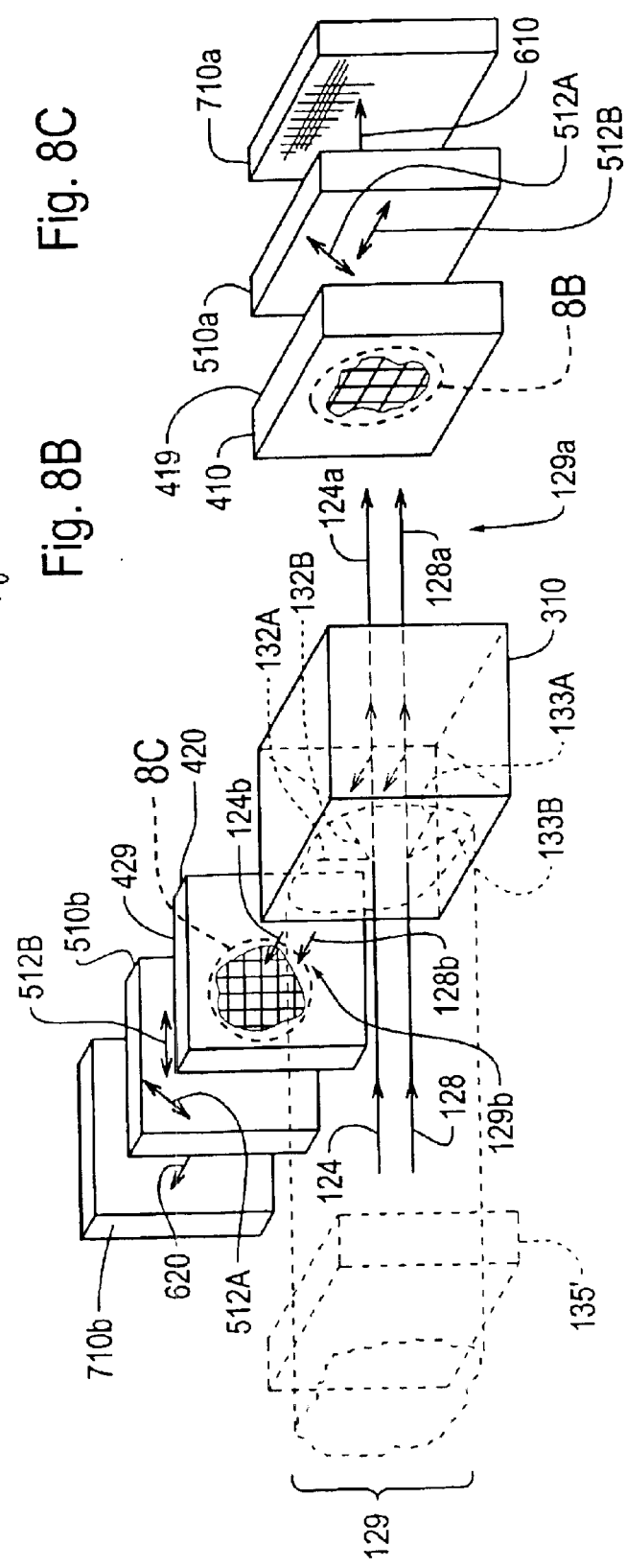
Fig. 8C
Fig. 8B
Fig. 8A

401

| P0 (Q0) | P120 (Q120) | P240 (Q240) | P0 (Q0) | P120 (Q120) |
|---|---|---|---|---|
| P240 (Q240) | P0 (Q0) | P120 (Q120) | P240 (Q240) | P0 (Q0) |
| P120 (Q120) | P240 (Q240) | P0 (Q0) | P120 (Q120) | P240 (Q240) |
| P0 (Q0) | P120 (Q120) | P240 (Q240) | P0 (Q0) | P120 (Q120) |

| P0 (Q0) | P120 (Q120) | P0 (Q0) | P120 (Q120) | P0 (Q0) |
|---|---|---|---|---|
| P240 (Q240) | P0 (Q0) | P240 (Q240) | P0 (Q0) | P240 (Q240) |
| P0 (Q0) | P120 (Q120) | P0 (Q0) | P120 (Q120) | P0 (Q0) |
| P240 (Q240) | P0 (Q0) | P240 (Q240) | P0 (Q0) | P240 (Q240) |

Fig. 17

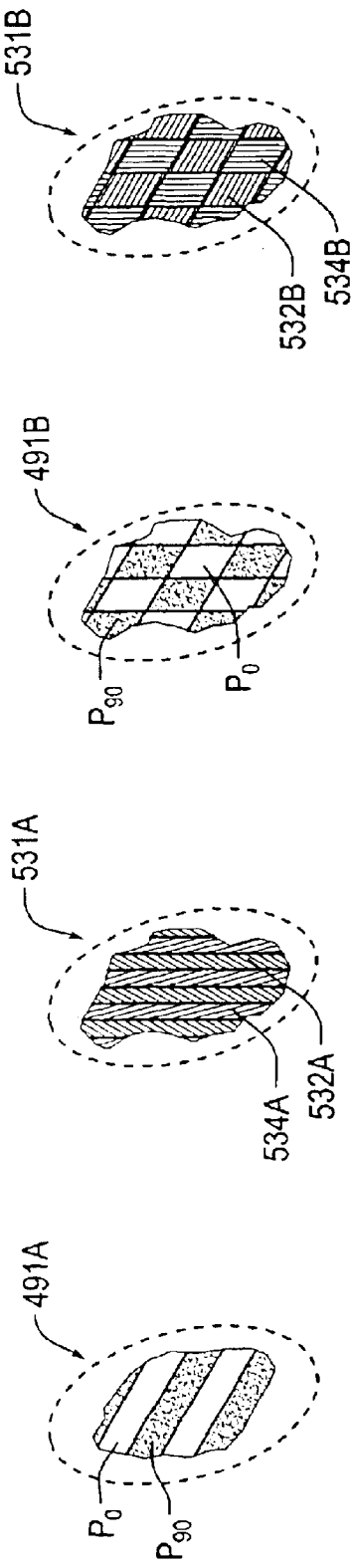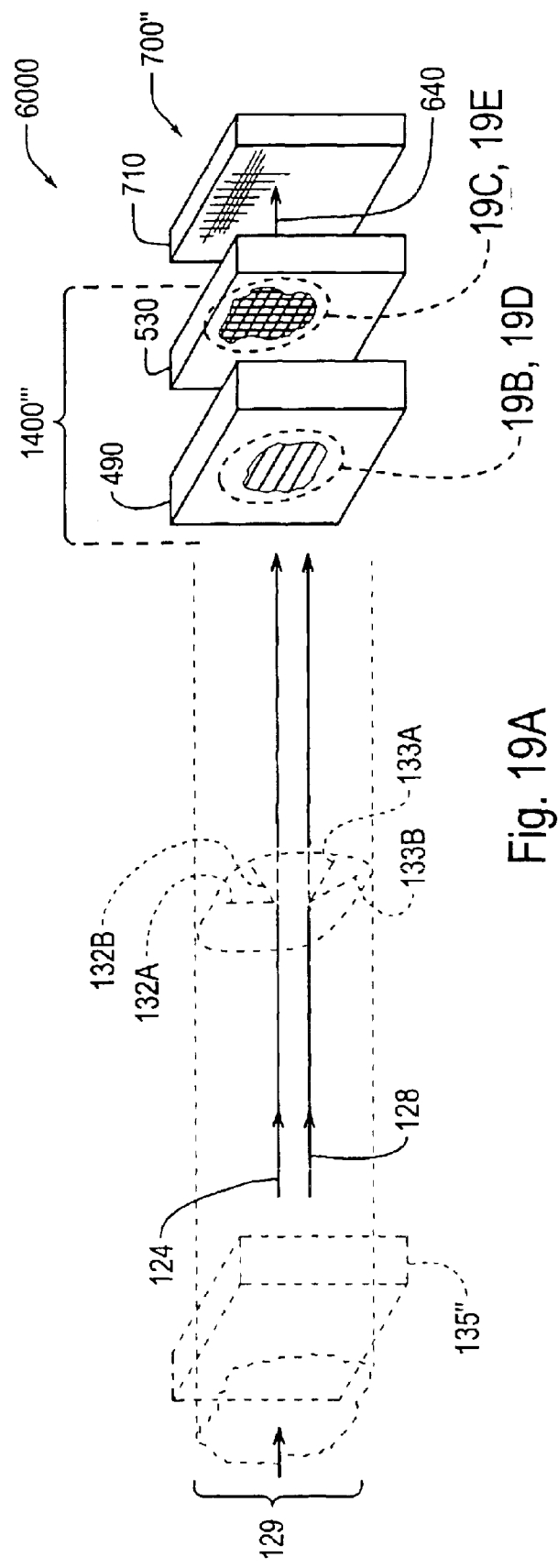

INTERFEROMETER USING INTEGRATED IMAGING ARRAY AND HIGH-DENSITY PHASE-SHIFTING ARRAY

BACKGROUND OF THE INVENTION

1. Field of Invention

This invention is directed to an interferometer that includes improved phase shifting and polarizing structures.

2. Description of Related Art

U.S. Pat. No. 6,304,330, which is incorporated herein by reference for all of its relevant teachings, discloses a novel multiple phase-shifting image generating structure that combines a wavefront-spreading element, a phase-shifting interference element and a sensing element. By combining the wavefront-spreading element, the phase-shifting interference element, and the sensing element, the multiple phase-shifting image generating structure shown in the 330 patent is able to convert many sources of potential error in interferometry measurements into common-mode errors. That is, these errors, in view of the multiple phase-shifting image generating structure disclosed in the 330 patent, equally affect all of the interferometry measurements. As a result, the magnitude and direction of these common-mode errors can be ignored when making high-precision measurements using an interferometer that includes the multiple phase-shifting image generating structure disclosed in the 330 patent.

SUMMARY OF THE INVENTION

However, the multiple phase-shifting image generating structure disclosed in the 330 patent introduces new sources of non-common-mode errors that can adversely affect high-precision interferometry measurements. Achieving an error insensitivity similar to that obtained with the particular form of the multiple phase-shifting image generating structure disclosed in the 330 patent while avoiding such new non-common-mode error sources, or converting them into common-mode errors, would be desirable.

This invention provides an imaging element for an interferometer that converts non-common-mode error sources of various multiple phase-shifting image generating structures into common-mode errors.

This invention separately provides an imaging element for an interferometer that is relatively insensitive to path length changes between an upstream optical element and the imaging element.

This invention further provides an imaging element that is less sensitive to path length changes than the multiple phase-shifting image generating element disclosed in the 330 patent.

This invention provides an imaging element that is usable in one or more ways that are relatively insensitive to variations over the sensing element with regard to the relation between input image intensity values and output signal values.

This invention further provides an imaging element that usable in one or more ways that are less sensitive to variations between the input image intensity values and output signal values over the sensing element than the multiple phase-shifting image generating structure disclosed in the 330 patent.

This invention separately provides an imaging element having a high-density phase-shifting array.

This invention separately provides an imaging element having a high-density phase-shifting array and a high-density polarizing array.

This invention separately provides an imaging element for an interferometer that divides an input light beam into a plurality of different portions based on phase differences or relative phase-shift, where the different portions of like-phase-shift are interleaved across an imaging array on a pixel cell-by-pixel cell basis.

This invention separately provides an imaging element for an interferometer that divides an input light beam into a plurality of different portions based on phase differences or relative phase-shift and polarization differences, where the different portions of like-phase-shift and polarization are interleaved across an imaging array on a pixel cell-by-pixel cell basis.

This invention further provides an imaging element where the pixel cells are single pixels in size.

This invention separately provides an imaging element for an interferometer that splits an input light beam into two similar portions and applies the two portions to different regions of an imaging array, where a phase difference is introduced everywhere between the portions and each of the first two portions is further divided into at least two portions based on phase differences within each portion, where for each of the first two portions, the at least two second portions based on phase differences within each portion are interleaved on a pixel cell-by-pixel cell basis across the corresponding portions of the imaging array.

In various exemplary embodiments, the systems and methods according to this invention include an integrated imaging element of an interferometer that receives a combined wavefront having differently polarized portions. The integrated imaging element includes at least one high-density phase-shift array element, at least one polarizer element, and at least one imaging array. Each of the at least one high-density phase-shift array element includes a pattern of two or more different phase-shift portions that each apply a different phase shift to a first one of the differently polarized portions of the combined wavefront relative to a second one of the differently polarized portions of the combined wavefront. Each high-density phase-shift array element transmits the combined wavefront to a polarizer element. The combined wavefront passes through the polarizer element to generate two or more interference portions comprising interference light. Each interference portion has a unique phase relationship relative to the other interference portions.

In various exemplary embodiments, at least one of the high-density phase-shift array elements includes a substrate or material layer that has a fixed fast axis and that applies a thickness-dependent phase-shift to a first one of the differently polarized portions of the combined wavefront relative to a second one of the differently polarized portions of the combined wave front. In various exemplary embodiments, the substrate and/or material layer is processed to provide an interleaved repeating pattern of two or more different phase-shift portions, where the substrate or material layer that has the fixed fast axis within each of the different phase-shift portions has a different thickness.

In various exemplary embodiments, the at least one high-density phase-shift array element is a single high-density phase-shift array element that has an interleaved repeating pattern of at least three different phase-shift portions having different thicknesses. In various other exemplary embodiments, the at least one high-density phase-shift array element includes two different high-density phase-shift array elements, where each high-density phase-shift array element has an interleaved repeating pattern of two or more different phase-shift portions having different thicknesses.

In various exemplary embodiments, at least one of the high-density phase-shift array elements includes a substrate and a layer of birefringent material that has the property that the fast axis direction can be selectively varied in various portions. The birefringent material applies a thickness-dependent phase-shift to a first one of the differently polarized portions of the combined wavefront relative to a second one of the differently polarized portions of the combined wavefront, the relative phase shift depending at least partially on the varied orientation of the fast axis direction relative to the differently polarized portions of the combined wavefront in the various portions.

In various exemplary embodiments, the layer of birefringent material has a constant thickness and is processed to provide an interleaved repeating pattern of two or more different phase-shift portions that have differently aligned fast axis directions. In various other exemplary embodiments, the layer of birefringent material is processed or formed to provide a pattern of at least first and second different thickness regions. In some of such exemplary embodiments, the birefringent material is further processed to provide a respective interleaved repeating pattern of two or more different phase-shift portions in each of the respective different thickness regions, where the two or more different phase-shift portions in each respective different thickness region have differently aligned fast axis directions.

In various exemplary embodiments, the at least one substrate is a single substrate that does not apply a thickness-dependent phase-shift. In various ones of such exemplary embodiments, the layer of birefringent material is formed to have an interleaved repeating pattern of at least three different phase shift portions, where each different phase-shift portion has a different fast axis orientation. In various other ones of such exemplary embodiments, a surface of the substrate is processed to provide a repeating pattern of two or more differently recessed regions. In such exemplary embodiments, the layer is formed over the processed surface to provide the two or more different layer thicknesses.

The birefringent material is further processed to provide a respective interleaved repeating pattern of two or more different phase-shift portions in each of the respective different layer thickness regions, where the two or more different phase-shift portions in each respective different layer thickness region have differently aligned fast axis directions. Among the two or more respective different phase-shift portions in each of the two respective different layer thicknesses, at least three different relative phase shifts are provided for a first one of the differently polarized portions of the combined wavefront relative to a second one of the differently polarized portions of the combined wavefront.

In various exemplary embodiments, at least one of the high-density phase-shift array elements includes at least two substrates, at least one of the substrates having a layer of birefringent material that that has the property that the fast axis direction can be selectively varied in various portions. The birefringent material applies a thickness-dependent phase-shift to a first one of the differently polarized portions of the combined wavefront relative to a second one of the differently polarized portions of the combined wavefront. In such exemplary embodiments, the relative phase shift depends at least partially on the varied orientation of the fast axis direction relative to the differently polarized portions of the combined wavefront in the various portions.

In various exemplary embodiments, the substrates do not apply a thickness-dependent phase-shift. In various ones of such exemplary embodiments, at least a second one of the layers of the birefringent material is formed to have a different thickness than a first one of the layers of birefringent material. In each different layer, the birefringent material is processed to provide a respective interleaved repeating pattern of two or more different phase-shift portions. In particular, the two or more different phase-shift portions in each respective different layer have differently aligned fast axis directions.

In various exemplary embodiments, one of the substrates does not apply a thickness-dependent phase-shift, while another one of the substrates does apply a thickness-dependent phase-shift. In various ones of such exemplary embodiments, the layers on those substrates have the same thickness. In each layer, the birefringent material is processed to provide a respective interleaved repeating pattern of two or more different phase-shift portions, where the two or more different phase-shift portions in each respective different layer have differently aligned fast axis directions.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein;

FIG. 7 is a top plan view that illustrates a first exemplary phase shift imaging element including a first exemplary embodiment of a multiple phase-shift generating structure incorporating the first and second exemplary high-density phase-shifting array elements shown in FIG. 6;

FIG. 8 is an exploded view of the phase-shift imaging element shown in FIG. 7, including the first exemplary embodiment of the multiple phase-shift generating structure shown in FIG. 7;

FIG. 16 illustrates the relative phase-shift relationships between the different phase shift portions of a ninth exemplary embodiment of a high-density phase-shifting array element according to this invention;

FIG. 17 illustrates the relative phase-shift relationships between the different phase shift portions of a tenth exemplary embodiment of a high-density phase-shifting array element according to this invention;

FIG. 19 is an exploded view illustrating a fourth exemplary embodiment of a phase-shift imaging element including a fourth exemplary embodiment of a multiple phase-shift generating structure according to this invention that incorporates a high-density phase-shifting array element according to this invention combined with a high-density polarizer array according to this invention;

DETAILED DESCRIPTION OF EXEMPLARY EMBODIMENTS

Figure 1:
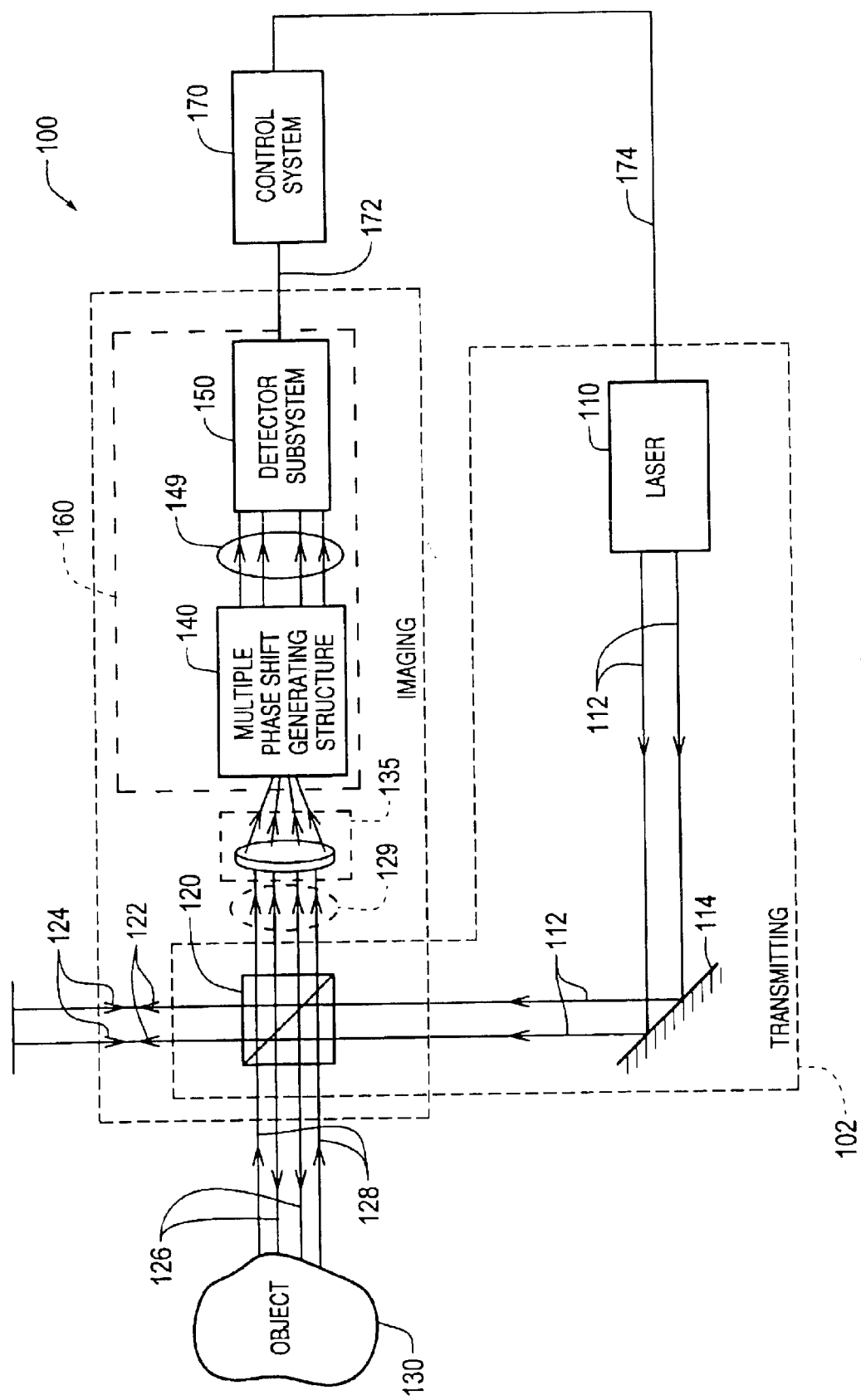
FIG. 1 illustrates one exemplary embodiment of an interferometer apparatus with which the various exemplary embodiments of the phase-shift array imaging element according to this invention are usable.

FIG. 1 shows one exemplary embodiment of an interferometer 100 with which the various exemplary embodiments of the phase-shift imaging element and other optical elements according to this invention are usable. As shown in FIG. 1, the interferometer 100 generally includes a transmitting portion 102 and an imaging portion 104. The transmitting portion 102 includes a laser source 110 that transmits a coherent light wavefront 112. In various exemplary embodiments, the laser source 110 may include two lasers, wavelength modulation, or any other known or later-developed device, structure or apparatus that provides at least two wavelengths of light at different times, for the coherent light wavefront 112.

As used herein, the term "light" encompasses not only visible light, but any part of the electromagnetic spectrum that is otherwise usable according to the principles of this invention. When at least two wavelengths of light are provided, the interferometer 100 may provide certain types of absolute measurement. In any case, the coherent light wavefront 112 transmitted by the laser source 110 is redirected by a mirror 114 into a single polarizing wavefront splitter 120. In particular, it should be appreciated that the single polarizing wavefront splitter 120 is shared by both the transmitting portion 102 and the imaging portion 104. That is, the single polarizing wavefront splitter 120 both splits the coherent light wavefront 112 into a reference wavefront 122 and an object wavefront 126, as well as combining the return reference wavefront 124 and the returning object wavefront 128 into a combined wavefront 129. The combined wavefront 129 then passes through an optical input portion 135.

As shown in FIG. 1, the imaging portion 104 of the exemplary embodiment of the interferometer 100 includes, in addition to the single polarizing wavefront splitter 120 and the optical input portion 135, a multiple phase-shift image generating portion 1600. In various exemplary embodiments, the optical input portion 135 includes one or more optical elements such as lenses, apertures and the like, such that the combined wavefront 129 transmitted by the optical input portion 135 is compatible with the multiple phase-shift image generating portion 1600. In various exemplary embodiments, the optical input portion includes a telecentric arrangement of an aperture and lenses. As shown in FIG. 1, the multiple phase-shift image generating portion 1600 includes a multiple phase-shift generating structure 1400 that inputs the combined wavefront 129 from the optical input portion 135 and outputs multiple phase-shifted interference image information 600 to a detector subsystem 700.

The detector subsystem 700 has, in general, an active surface that may be defined by an optical array. The optical array may be a 2-dimensional pixel array and may be a video-imaging sensor, such as a charged coupled device (CCD) camera, or the like. The detector subsystem 700 inputs the multiple phase-shifted interference image information 600 and outputs the image data captured by the detector subsystem 700 over a signal line 172 to a control system 170. The control system 170 performs any desired image processing and/or analyses on the captured image data, including measurement determinations. The control system 170 also outputs a control signal 174 to drive the laser source 110 of the transmitting portion 102.

Figure 2:
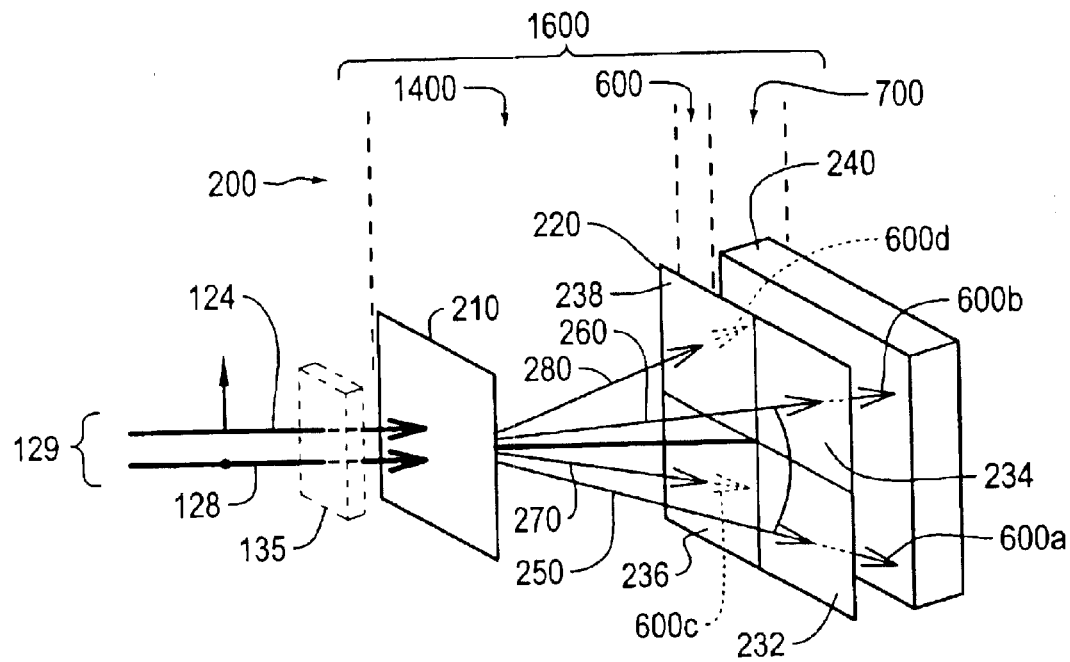
FIG. 2 illustrates the particular form of a multiple phase-shifted image generating structure disclosed in the 330 patent.

FIG. 2 schematically shows one exemplary embodiment of a multiple phase-shifted-image generating apparatus 200 disclosed in the 330 patent. The multiple phase-shifted-image generating apparatus 200 includes a wavefront splitting element 210 and a phase-shifting interference element 220 that are usable in combination to provide a known embodiment of the multiple phase-shift generating structure 1400 previously described with reference to in FIG. 1. The multiple phase-shifted-image generating apparatus 200 also includes a detector array 240, which similarly provides a known embodiment of the detector subsystem 700.

As shown in FIG. 2, the combined wavefront 129 transmitted by the optical input portion 135 includes the reference wavefront 124 from the transmitting portion 102 and the object wavefront 128 returned or reflected by the object 130 through the polarizing wavefront splitter 120. The polarizing wavefront splitter 120 is configured so that the reference wavefront 124 and the object wavefront 128 are orthogonally polarized, which is indicated in FIG. 2 by the arrow and dot symbol convention applied to the wavefronts 124 and 128.

From the optical input portion 135, the combined wavefront 129 is directed onto the wavefront splitting element 210. As disclosed in the 330 patent, the wavefront splitting element 210 is a two-dimensional diffractive optical element (DOE), and is more particularly a holographic optical element (HOE). In any case, the wavefront splitting element 210 splits the combined wavefront 129 into four spatially-separated and nominally congruent sub-wavefronts 250, 260, 270 and 280, which may, in various embodiments, be transmitted through an output lens (not shown). In particular, as disclosed in the 330 patent, each of the sub-wavefronts 250–280 follows a spatially discrete path. Each of the sub-wavefronts 250–280 is directed from the exemplary wavefront splitting element 210 to an exemplary phase-shifting interference element 220, which includes one section 232, 234, 236 and 238 for each of the sub-wavefronts 250-280, respectively.

In particular, as disclosed in the 330 patent, the phase-shifting interference element 220 is disposed with respect to the wavefront splitting element 210 so that the plurality of sub-wavefronts 250–280 are respectively incident on one of the plurality of sections 232–238. In particular, each of the sections 232–238 of the exemplary phase-shifting interference element 220 everywhere shifts the relative phase between the reference and object wavefronts 124 and 128 of that respective one of the sub-wavefronts 250–280 that is incident on that section 232–238 by a discrete phase shift $\Delta\phi_i$. The sections 232–238 of the exemplary phase-shifting interference element 220 then transmit the resulting wavefronts through respective polarizers to provide one known embodiment of the multiple phase-shifted interference image information 600 previously described with reference to in FIG. 1.

In particular, each of the sections 232–238 of the phase-shifting interference element 220 thus transmits a complete respective one of the spatially-separated phase-shifted interferograms 600a, 600b, 600c and 600d to the detector array 240. The phase shift of each of the spatially-separated phase-shifted interferograms 600a–600d is everywhere the same, and is out of phase with the phase shift of the other phase-shifted interferograms by a factor related to the various discrete phase shifts $\Delta\phi_i$.

As disclosed in the 330 patent, the detector array 240 may be a video-imaging sensor, such as a charged coupled device (CCD) camera. As disclosed in the 330 patent, the detector array 240 is disposed with respect to the phase-shifting interference element 220 so that the spatially-separated plurality of phase-shifted interferograms 600a, 600b, 600c and 600d are substantially simultaneously incident on the active surface of the detector array 240. That is, the active surface of the detector array 240 is able to image the respective spatially-separated phase-shifted interferograms 600a, 600b, 600c and 600d. Based on the imaged spatially-separated phase-shifted interferograms 600a, 600b, 600c and 600d, the spatially resolved phase of each of the spatially-separated phase-shifted interferograms 600a, 600b, 600c and 600d can be measured instantaneously in their different respective regions on the detector array 240.

Figure 3:
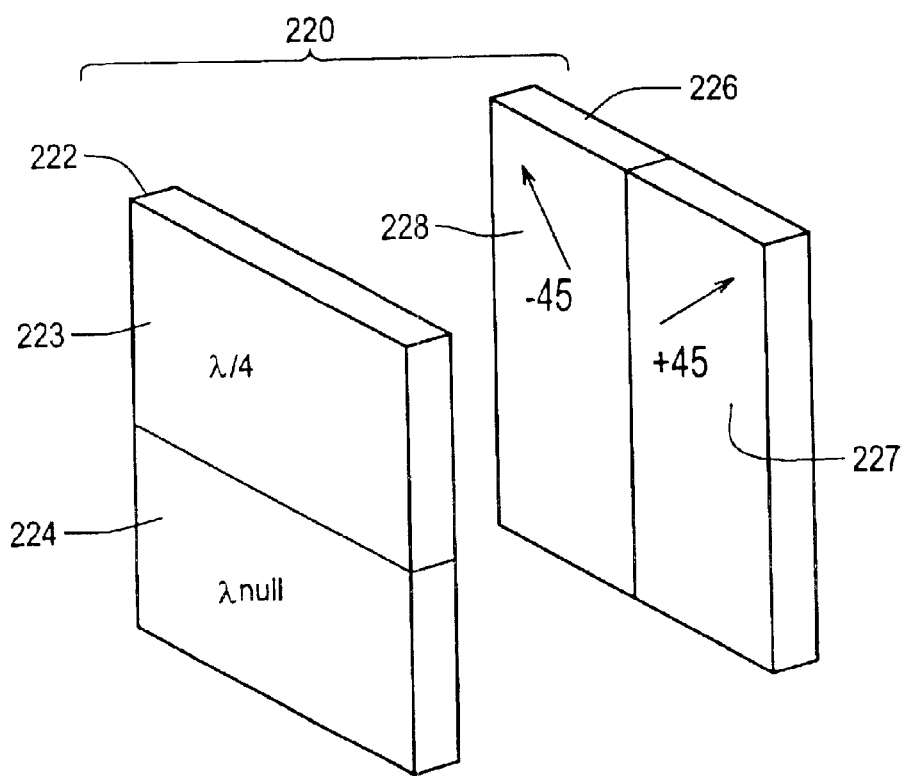
FIG. 3 illustrates in greater detail the phase-shifting element of FIG. 2 of the 330 patent.

FIG. 3 shows one exemplary embodiment of the phase-shifting interference element 220 disclosed in the 330 patent. As shown in FIG. 3, the phase-shifting interference element 220 includes a first plate 222 and a second plate 226. It should be appreciated that, in FIG. 3, the first and second plates 222 and 226 are shown spaced from each other for ease of illustration. However, in operation in the interferometer 100, the first and second plates 222 and 226 would be placed adjacent to each other in an abutting relationship.

As shown in FIG. 3, the first plate 222 includes a quarter-wave plate 223 and a blank or neutral plate 224. In general, a quarter-wave plate shifts the relative phase of two orthogonally-polarized incident wavefronts by 90°. In contrast, the blank or neutral plate shifts the relative phase of two orthogonally-polarized incident wavefronts by 0°. That is, the blank or neutral plate 224 does not create any relative phase shift between the two orthogonally-polarized incident wavefronts. As shown in FIG. 3, the plates 223 and 224 are coplanar and divide the first plate 222 into respective halves.

The second plate 226 of the exemplary phase-shifting interference element 220 includes a pair of polarizing portions 227 and 228 that are configured to polarize an incident wavefront linearly so that electric field vectors of the transmitted wavefront are perpendicular with each other. In particular, in the exemplary embodiment shown in FIG. 3, one of the polarizing portions, such as, for example, the first polarizing portion 227, is configured to transmit polarized light at +45° with respect to the vertical axis. As a result, this causes the in-phase components arising from the reference and object wavefronts 124 and 128 to interfere.

Similarly, the other polarizing portion, such as, for example, the second polarizing portion 228, is configured to polarize light at −45° with respect to the vertical axis. As a result, the out-of-phase components arising from the reference and object wavefronts 124 and 128 interfere. Like the quarter-wave and blank or neutral plates 223 and 224, the first and second polarizing portions 227 and 228 of the second plate 226 are also generally coplanar and divide the second plate 226 into respective halves.

Accordingly, it should be appreciated that, according to the structure shown in FIG. 3, the first portion 232 of the exemplary phase-shifting interference element 220 corresponds to the portion of the exemplary phase-shifting interference element 220 where the neutral plate 224 overlaps with the first (+45') polarizing portion 227. Similarly, the second portion 234 corresponds to the quarter-wave plate 223 overlapping the first (+45°) polarizing portion 227. In contrast, the third portion 236 corresponds to the neutral plate 224 overlapping the second (−45°) polarizing portion 228, while the fourth portion 238 corresponds to the quarter-wave plate 223 overlapping the second (−45°) polarizing portion 228.

In particular, in the exemplary embodiment shown in FIG. 3, the first and second plates 222 and 226 are configured so that the respective portions 223 and 224 of the first plate 222 are perpendicular to the first and second polarizing portions 227 and 228 of the second plate 226.

Figure 4:
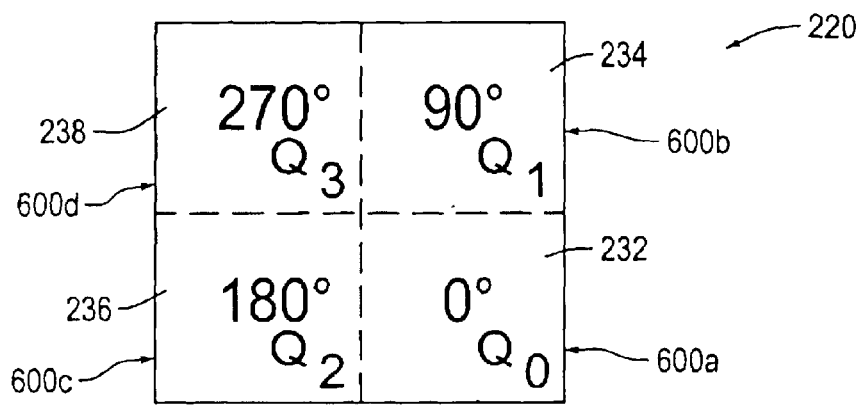
FIG. 4 illustrates the relative phase shift between the four portions of light generated using the multiple phase-shifted image generating structure disclosed in the 330 patent.

As a result, in the exemplary embodiment of the phase-shifting interference element 220 shown in FIG. 3, and as represented in FIG. 4, in the first portion 232, the neutral plate 224 and the first (+45°) polarizing portion 227 interfere the in-phase component, that is, the 0° component between the reference and object wavefronts 124 and 128 incident on the phase-shifting interference element 220, to generate the interferogram 600a. In contrast, in the second portion 234, the quarter-wave plate 223 and the first (+45°) polarizing portion 227 combine to interfere the in-phase quadrature component, that is, the 90° component, between the incident reference and object wavefronts 124 and 128, to generate the interferogram 600b. In contrast to both the first and second portions 232 and 234, for the third portion 236, the neutral plate 224 and the second (−45°) polarizing portion 228 combine to interfere the out-of-phase component, that is, the 180° component, between the incident reference and object wavefronts 124 and 128, to generate the interferogram 600c. Finally, for the fourth portion 238, the quarter-wave plate 223 and the second (−45°) polarizing portion 228 combine to interfere the out-of-phase quadrature component, i.e., the 270° component, between the reference and object wavefronts 124 and 128, to generate the interferogram 600d.

As disclosed in the 330 patent, it is desirable to maximize the imaging area of the detector array 240. Thus, to maximize the imaging area of the detector array 240, the portion of the surface area of the detector array 240 that is illuminated with the spatially-separated interferograms 600a, 600b, 600c and 600d should be maximized. Thus, in the multiple phase-shifted image generating apparatus 200 disclosed in the 330 patent, to maximize the imaging area of the detector array 240, the phase-shifting interference element 220 is desirably placed adjacent to or substantially at the active surface of the detector array 240. By detecting the plurality of spatially-separated phase-shifted interferograms 600a, 600b, 600c and 600d substantially instantaneously using the detector array 240, the control system 170 is able to instantaneously measure the entire test object 130. Additionally, by instantaneously detecting all of the spatially-separated phase-shifted interferograms 600a, 600b, 600c and 600d, there is no need to individually scan any of the incident object wavefronts 126 spatially through or across the surface of the object 130.

Figure 5:
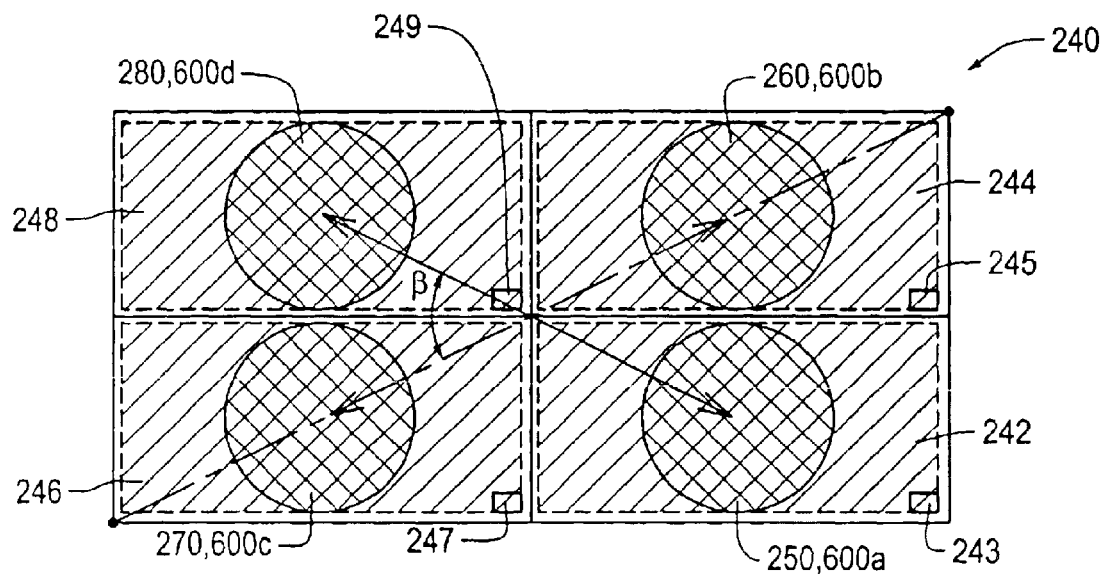
FIG. 5 illustrates how the four portions of light are distributed over an imaging array when using the multiple phase-shifted image generating structure disclosed in the 330 patent.

As shown in FIG. 5, the imaged sub-wavefronts 250, 260, 270 and 280 are spatially separated from each other across the surface of the detector array 240. However, one or more of the optical input portion 135, the wavefront splitting element 210, and/or the output lens (if present) are configured so that each of the imaged sub-wavefronts 250, 260, 270 and 280, that is, each of the phase-shifted interferograms 600a–600d incident at the surface of the detector array 240 is adjacent to, or substantially contiguous with, at least one other sub-wavefront, as also shown in FIG. 5. For example, as shown in FIG. 5, the sub-wavefront 250 is substantially contiguous with the sub-wavefronts 260 and 270, while the sub-wavefront 260 is substantially contiguous with the sub-wavefronts 250 and 280, the sub-wavefront 270 is substantially contiguous with the sub-wavefronts 250 and 280, and the sub-wavefront 280 is substantially contiguous with the sub-wavefronts 270 and 260.

Additionally, as shown in FIG. 5, the radial angular displacement β produced by the exemplary wavefront splitting element 210 is configured so that the radial angular displacement β becomes 90° and all four images are radially symmetric. As such, each of the sub-wavefronts 250, 260, 270 and 280 follows an independent optical path from the wavefront splitting element 210 to the surface of the detector array 240. Ideally, each of these independent optical paths has a length that is substantially equal to each of the other optical paths. Accordingly, the plurality of sub-wavefronts 250, 260, 270 and 280 reach the surface of the detector array 240 substantially simultaneously.

As shown in FIG. 5, the detector array 240 can be considered to have distinct portions 242, 244, 246 and 248 in which each of the sub-wavefronts 250, 260, 270 and 280, respectively, are nominally congruently imaged, as the phase-shifted interferograms 600a, 600b, 600c and 600d. In particular, as shown in FIG. 5, when the wavefront splitting element 210 and the phase-shifting interference element 220 disclosed in the 330 patent are used as the multiple phase-shift generating structure 1400, each of the portions 242–248 is spaced apart from each other within the detector array 240.

Accordingly, in the resulting known embodiment of the multiple phase-shifted interference image information 600 disclosed in the 330 patent, when comparing pixels in order to determine a measurement value for the object 130, widely-separated pixels in each of the portions 242–248 of the detector array 240 must be compared. For example, for a given pixel 243 in the first portion 242, correspondingly located pixels 245, 247 and/or 249 in the second-fourth portions 244–248, respectively, must be compared.

As outlined above, the known wavefront splitting element 210, in combination with the known phase-shifting interference element 220, converts a number of errors in other interferometers that are not common-mode errors into common-mode errors when used in the interferometer 100, as shown in FIGS. 1 and 2. However, as shown in FIG. 2, the wavefront-splitting element 210 must be spaced away from the phase-shifting interference element 220 a distance sufficient to get the appropriate divergence and spacing between each of the sub-wavefronts 250, 260, 270 and 280. Additionally, as recognized in the 330 patent, each of the path lengths of the paths of the sub-wavefronts 250, 260, 270 and 280 from the wavefront-splitting element 210 to the phase-shifting interference element 220 should ideally be the same.

However, the requirement that these path lengths ideally be the same introduces a new source of error. That is, any rotations and/or translations that do not affect the paths of the sub-wavefronts 250, 260, 270 and 280 equally will cause the path lengths of these paths to vary. In general, this will cause different focus conditions in the associated spatially-separated phase-shifted interferograms 600a, 600b, 600c and 600d, and/or may cause a shift in the relative locations of the various portions spatially-separated phase-shifted interferograms 600a, 600b, 600c and 600d upon the detector, which can lead to errors. For example, for the given pixel 243 in the first portion 242, as discussed above with respect to FIG. 5, the correspondingly located pixels 245, 247 and/or 249 in the second-fourth portions 244–248, respectively, may no longer correspond to precisely the same portion of the object 130 and, thus, may no longer be properly comparable. This in turn introduces a source of error into the measurement values generated by the control system 170 from the image data output over the signal line 172 from the detector array 240.

Similarly, because the associated spatially-separated phase-shifted interferograms 600a, 600b, 600c and 600d of the sub-wavefronts 250, 260, 270 and 280 are spaced apart from each other over the surface of the detector array 240, any variations in the output signal amplitude for a given intensity value generated by one of the subportions 242, 244, 246 and 248 to that output by one of the other subportions 242, 244, 246 or 248 will introduce a source of error.

As is well known in the art, for semiconductor imaging devices, such as CCD arrays and C-MOS-based arrays, any two adjacent pixels will likely have the same response curve or transfer function between an input intensity and an output signal amplitude. However, as is well-known in the art, for such semiconductor imaging, pixels significantly spaced apart within the array, such as the pixels 243, 245, 247, and 249, can have significantly different response curves or transfer functions between the input intensity and output signal amplitude.

Accordingly, this introduces another error into the measurements generated by the control system 170 from the image data generated by the detector array 240. In addition, it is difficult and/or expensive to make the multiple phase-shifted-image generating apparatus 200, including the wavefront-splitting element 210 that provides the functions described with reference to FIGS. 2–5, without introducing various aberrations that vary between the comparable regions of the spatially-separated phase-shifted interferograms 600a, 600b, 600c and 600d.

It should be appreciated that the various errors and difficulties described above with reference to the elements and operations shown in FIGS. 2–5 exemplify similar errors and difficulties that may arise in any system to the extent that the multiple phase-shift generating structure 1400 and the multiple phase-shifted interference image information 600 distribute spatially-separated wavefronts, that is, spatially-separated phase-shifted interferograms, into separate portions or surfaces of the detector subsystem 700.

The inventors, in addition to recognizing these new sources of non-common-mode errors, have determined that these and other errors can be reduced, and ideally eliminated, to the extent that multiple phase-shifted interference image information can be provided for multiple phases within a small region on the detector subsystem 700. This is in contrast to distributing each of the sub-wavefronts 250, 260, 270 and 280, and thus the respective distinct spatially-separated phase-shifted interferograms 600a, 600b, 600c and 600d into separate portions of the detector array 240, which embodies the detector subsystem 700, over independent optical paths.

Stated another way, the inventors have determined that, if the number of spatially-separated sub-wavefronts, such as the sub-wavefronts 250, 260, 270 and 280 disclosed in the 330 patent, and their respective spatially-separated phase-shifted interferograms in the multiple phase-shifted interference image information 600, can be reduced relative to the number of phases included in the multiple phase-shifted interference image information 600, then at least some errors related to these non-common-mode error sources can either be eliminated and/or converted into common-mode errors. In either case, this tends to reduce the amount of error in related measurements.

For example, if the multiple phase-shifted interference image information produced by the combination of the spatially-separated phase-shifted interferograms 600a, 600b, 600c and 600d can be retained, while modifying or eliminating the wavefront splitting element 210, such that at least some of the optical paths for at least some of the phases included in the multiple phase-shifted interference image information were no longer spaced apart over the quadrants $Q_0$–$Q_3$ and the surface of the detector subsystem 700, these non-common-mode error sources can either be eliminated and/or converted into common-mode errors. In either case, this tends to reduce the amount of error, or ideally would not create errors, in the measurements generated by the control system 170 from the images output by the detector subsystem 700 over the signal line 172.

Figures 6A, 6B:
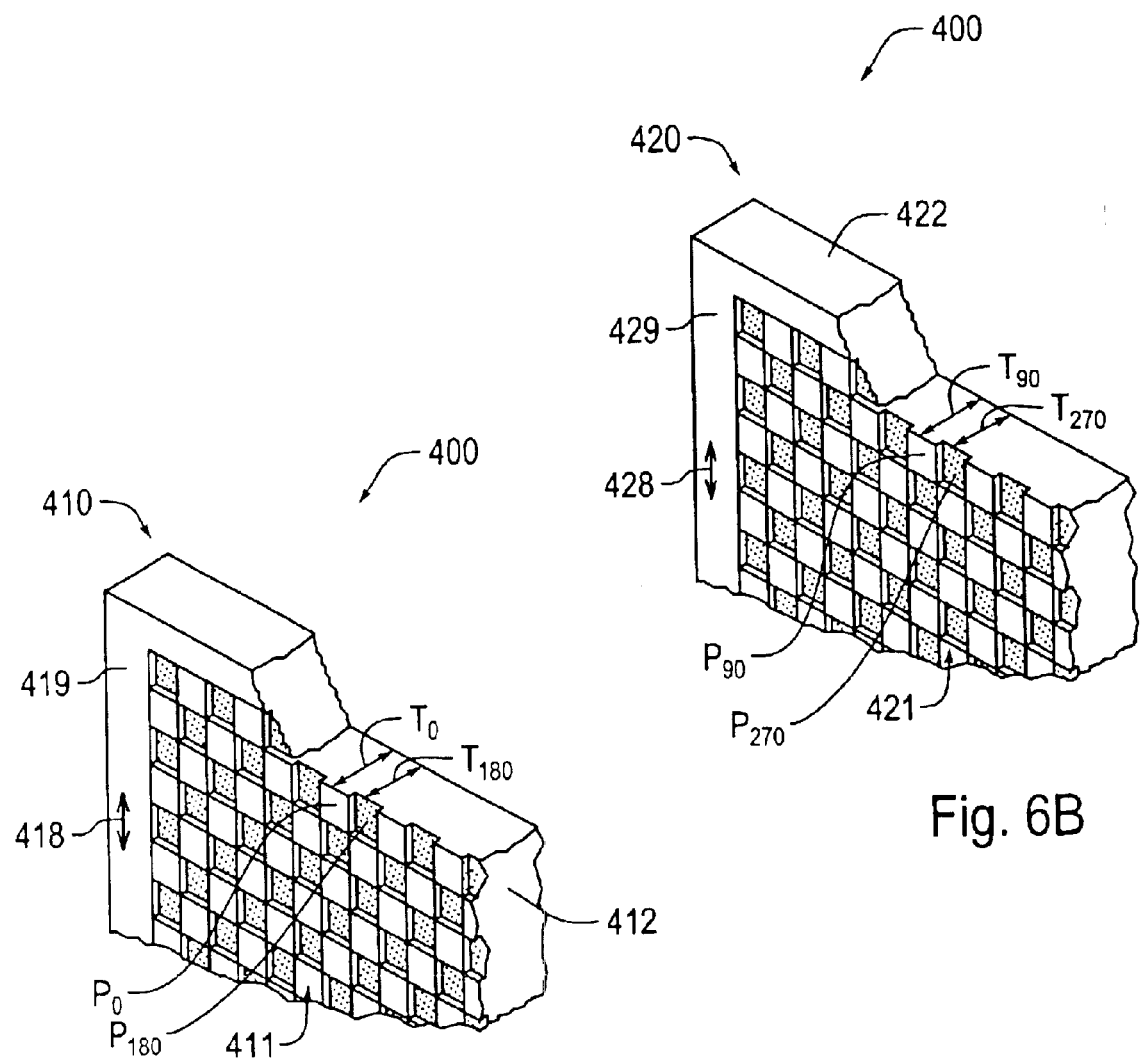
FIG. 6 illustrates a perspective and cross-sectional view of portions of first and second exemplary embodiments of a high-density phase-shifting array element usable in a first exemplary embodiment of a high-density multiple phase-shifted image generating structure according to this invention.

FIG. 6 illustrates a portion of a first exemplary embodiment of a high-density phase-shifting array element 410 according to this invention. The high-density phase-shifting array element 410, shown in FIG. 6A, is usable in various exemplary embodiments of the multiple phase-shift generating structure 1400, as described below with respect to the first and second exemplary embodiments 3000 and 4000 of a phase-shift imaging element according to this invention. It should be appreciated that the exemplary embodiments 3000 and 4000, and similar phase-shift imaging elements according to this invention, are usable in place of the multiple phase-shift image generating apparatus 200 shown in FIGS. 2–5 and, more generally, in the multiple phase-shift image generating portion 1600 described with reference to FIG. 1.

FIG. 6 further illustrates a portion of a second exemplary embodiment of a high-density phase-shifting array element 420, shown in FIG. 6B, that is usable in each of the first and second exemplary embodiments 3000 and 4000 of the phase-shift array imaging element according to this invention, that are, in turn, usable in place of the multiple phase-shift image generating structure 200 and, more generally, in the multiple phase-shift image generating portion 1600 described with reference to FIG. 1.

As shown in FIG. 6, the first and second exemplary embodiments of the high-density phase-shifting array element 410 and 420, respectively, are "variable thickness" type relative retarder arrays formed of birefringent material. In the first and second exemplary embodiments of the high-density phase-shifting array element 410 and 420, the fast and slow axes of the birefringent material of the relative retarder array are uniformly oriented throughout the retarder array. The thickness in each portion of a "thickness pattern" of the relative retarder array determines the amount by which any component of the light of a combined wavefront 129 that is polarized parallel to the slow axis is "relatively retarded" in comparison to any component of the light of the combined wavefront 129 that is polarized parallel to the fast axis.

It should be appreciated that, for a given wavelength of light, the relative retardation between various polarized light components passing through any portion of a relative retarder array can be characterized as a relative phase shift between the various polarized light components. Accordingly, such relative retardation between the polarized light components passing through any portion of a relative retarder array is referred to alternatively as a relative retardation, a relative phase shift, or simply as a phase shift or phase-shift. Such terms generally have the same meaning below, unless otherwise indicated by the context or related discussion.

It should also be appreciated that the terms "fast axis" and "slow axis" are used herein primarily in a relative sense. That is, as used herein, the fast axis is that axis that has an effective index of refraction that is smaller that the effective index of refraction of the axis that acts as the slow axis. In various exemplary embodiments, the fast and slow axes may align with particular crystallographic axes, or the like, which are referred to in a strict sense in some fields as the fast and slow axes of a particular material. However, more generally, any material axes that operate to provide operationally-effective "fast" and "slow" axes according to the principles of this invention fall within the scope of the terms fast axis and slow axis, respectively, as used here.

As shown in FIG. 6, in various exemplary embodiments, the first exemplary embodiment of the high-density phase-shifting array element 410, as shown in FIG. 6A, is formed using a birefringent substrate 412, such as a low order quartz wave plate. The birefringent substrate 412 has a surface 419 and a fast axis 418. A slow axis, not shown, is orthogonal to the fast axis 418 and parallel to the surface 419. As shown in FIG. 6, the birefringent substrate 412 of the first exemplary embodiment of the high-density phase-shifting array element 410 has a nominal thickness $T_0$ such that the component of a combined wavefront 129 that is polarized parallel to the slow axis of the birefringent substrate 412 is retarded by an integer number of wavelengths relative to the component of the combined wavefront 129 that is polarized parallel to the fast axis of the birefringent substrate 412.

As shown in FIG. 6, in various exemplary embodiments, the second exemplary embodiment of the high-density phase-shifting array element 420, shown in FIG. 6B, is also formed using a birefringent substrate 422, such as a low order quartz wave plate. The birefringent substrate 422 has a surface 429 and a fast axis 428. As shown in FIG. 6, the birefringent substrate 422 of the second exemplary embodiment of the high-density phase-shifting array element 420 has a nominal thickness $T_0$ such that the component of a combined wavefront 129 that is polarized parallel to the slow axis of the birefringent substrate 412 is retarded by an integer number of wavelengths plus an additional quarter of a wavelength relative to the component of the combined wavefront 129 that is polarized parallel to the fast axis of the birefringent substrate 412.

Accordingly, each portion $P_0$ of the high-density phase-shifting array element 410 has the nominal thickness $T_0$. As a result, the portions $P_0$ of the first exemplary embodiment of the high-density phase-shifting array element 410 do not produce any net relative phase shift between the components of the wavefront 129. That is, each portion $P_0$ produces a zero-degree phase shift between the components of the wavefront 129, as indicated by the subscript "0", used as a convention herein. In contrast, each portion $P_{90}$ of the high-density phase-shifting array element 420 has the nominal thickness $T_{90}$. That is, the substrate 422 is nominally a quarter wave plate. As a result, the portions $P_{90}$ of the second exemplary embodiment of the high-density phase-shifting array element 420 produce a relative phase shift of 90 degrees between the components of the wavefront 129, as indicated by the subscript "90", used as a convention herein.

As shown in FIG. 6, each of the first and second exemplary embodiments of the high-density phase-shifting array elements 410 and 420 includes an array of recesses that are etched into the substrates 412 and 422. As shown in FIG. 6, the recesses are rectangular. However, more generally, it should be appreciated that, in various exemplary embodiments, the shape of the recesses can be any usable shape that corresponds to the shape of a pixel, or a group of pixels, of a detector array of the detector subsystem 700 and the associated signal processing that is used in a phase-shift array imaging element 3000, 4000 or the like according to this invention.

In various exemplary embodiments, the recesses are etched with sides that are as perpendicular as possible to the nominal surface plane of the substrate 412 or 422. Such etching can be obtained by reactive ion etching or other methods. As shown in FIG. 6, the recesses of the first and second exemplary embodiments of the high-density phase-shifting array elements 410 and 420 are etched to a depth having a dimension corresponding to the thickness of a half-wave plate in the birefringent substrate 412, as described in detail below. Accordingly, for each of the recesses that are etched into the substrates 412 and 422, the relative phase shift produced by the recesses differs by 180 degrees from the relative phase shift produced by the unetched areas for the wavefront components polarized along the fast and slow axes.

That is, as shown in FIG. 6, the substrate 412 in the recesses has a thickness of $T_{180}$, such that the component of a combined wavefront 129 that is polarized parallel to the slow axis of the birefringent substrate 412 is retarded by an integer number of wavelengths plus an additional half of a wavelength relative to the component of the combined wavefront 129 that is polarized parallel to the fast axis of the birefringent substrate 412. Each portion $P_{180}$ of the high-density phase-shifting array element 410 has the nominal thickness $T_{180}$. That is, each of the recesses in the substrate 412 correspond to a nominal half wave plate. As a result, the portions $P_{180}$ of the first exemplary embodiment of the high-density phase-shifting array element 410 produce a relative phase shift of 180 degrees between the components of the wavefront 129, as indicated by the subscript "180", used as a convention herein. These 180-degree phase shift portions $P_{180}$ of the first exemplary embodiment of the high-density phase-shifting array element 410 that have the nominal thickness $T_{180}$ produce a phase shift that is different by 180 degrees relative to the zero-degree portions $P_0$.

Similarly, the substrate 422 in the recesses has a thickness of $T_{270}$, such that the component of a combined wavefront 129 that is polarized parallel to the slow axis of the birefringent substrate 422 is retarded by an integer number of wavelengths plus an additional three-quarters of a wavelength relative to the component of the combined wavefront 129 that is polarized parallel to the fast axis of the birefringent substrate 422. Each portion $P_{270}$ of the high-density phase-shifting array element 420 has the nominal thickness $T_{270}$. That is, each of the recesses in the substrate 422 correspond to a nominal three-quarter wave plate. As a result, the portions $P_{270}$ of the second exemplary embodiment of the high-density phase-shifting array element 420 produce a relative phase shift of 270 degrees between the components of the wavefront 129, as indicated by the subscript "270", used as a convention herein. These 270-degree phase shift portions $P_{270}$ of the second exemplary embodiment of the high-density phase-shifting array element 420 that have the nominal thickness $T_{270}$ produce a phase shift that is different by 180 degrees relative to the 90-degree portions $P_{90}$.

As shown in FIG. 6, in various exemplary embodiments, the 0-degree and 90-degree phase-shift portions $P_0$ and $P_{90}$ are formed by the surfaces 419 and 429 of the first and second substrates 412 and 422, respectively. The 180-degree and 270-degree phase-shift portions $P_{180}$ and $P_{270}$ are formed by etching into the first and second substrates 412 and 422, respectively, to an etch depth dimension corresponding to the thickness of a half-wave plate in the birefringent substrates 412 and 422, respectively. In various exemplary embodiments, for each of the first and second substrates 412 and 422, the etch depth dimension corresponds to the thickness of a zero-order half-wave plate. However, it should be appreciated that etch depth dimension in either of the first and second substrates 412 and/or 422 could correspond to any odd multiple of the thickness of a zero-order half-wave plate.

It should also be appreciated that, in various exemplary embodiments, the thickness $T_0$ may be made less than the thickness $T_{180}$. Similarly, the thickness $T_{90}$ may be made less than the thickness $T_{270}$. In such cases, the 180-degree and 270-degree phase-shift portions $P_{180}$ and $P_{270}$ may be formed by the surfaces 419 and 429 of the first and second substrates 412 and 422, respectively. The zero-degree and 90-degree phase-shift portions $P_0$ and $P_{90}$ may then be formed by etching into the first and second substrates 412 and 422, respectively, to an etch depth dimension corresponding to the thickness of a half-wave plate in the birefringent substrates 412 and 422, respectively.

As shown in FIG. 6, the first exemplary embodiment of the high-density phase-shifting array element 410 includes alternating first or zero-degree phase-shift portions $P_0$ and second or 180-degree phase-shift portions $P_{180}$ distributed over the surface 419 in a pattern 411. In particular, as shown in FIG. 6, the pattern 411 of the first and second phase-shift portions $P_0$ and $P_{180}$ alternates in both the horizontal and vertical directions of the first exemplary embodiment of the high-density phase-shifting array element 410. This creates a checkerboard placement of the first and second phase-shift portions $P_0$ and $P_{180}$. In various exemplary embodiments, when the first exemplary embodiment of the high-density phase-shifting array element 410 is incorporated into each of the detector devices 3000 and 4000 shown in FIGS. 7, 8, 10 and 11 according to this invention, the checkerboard pattern of the first and second phase-shift portions $P_0$ and $P_{180}$ extends to cover substantially the entire surface area of one portion of a detector device 710 used to implement the detector subsystem 700.

Similarly, as shown in FIG. 6, the second exemplary embodiment of the high-density phase-shifting array element 420 includes alternating first or 90-degree phase-shift portions $P_{90}$ and second or 270-dgree phase-shift portions $P_{270}$ distributed over the surface 429 in a pattern 421. In particular, as shown in FIG. 6, the pattern 421 of the first and second phase-shift portions $P_{90}$ and $P_{270}$ alternates in both the horizontal and vertical directions of the second exemplary embodiment of the high-density phase-shifting array element 420. This creates a checkerboard placement of the first and second phase-shift portions $P_{90}$ and $P_{270}$. In various exemplary embodiments, when the second exemplary embodiment of the high-density phase-shifting array element 420 is incorporated into each of the detector devices 3000 and 4000 shown in FIGS. 7, 8, 10 and 11 according to this invention, the checkerboard pattern of the first and second phase-shift portions $P_{90}$ and $P_{270}$ extends to cover substantially the entire surface area of the other portion of the detector device 710 used to implement the detector subsystem 700.

In the embodiments of the high-density phase-shifting array elements 410 and 420 shown in FIG. 6, it should be appreciated that the fast axes 418 and 428 of the first and second birefringent substrates 412 and 422, respectively, lie in a plane that is normal to the surfaces 419 and 429. In various exemplary embodiments, the fast axes 418 and 428 are parallel to the vertical edges of the zero-degree and 180-degree phase shift portions $P_0$ and $P_{180}$ and the 90-degree and 270-degree phase shift portions $P_{90}$ and $P_{270}$, respectively. However, it should be appreciated that, in various other exemplary embodiments, the fast axes 418 and 428 could lie parallel to the horizontal edges of the various phase shift portions, or at 45 degrees relative to these edges, or in any other operable orientation, depending on the relative orientations of the polarized components of the combined wavefront 129 and other related design factors. It should also be appreciated that, in these first and second exemplary embodiments of the high-density phase-shifting array elements 410 and 420, the fast axes 418 and 228 are fixed and constant throughout the entire first and second substrates 412 and 422, respectively, and the phase shift portions $P_0$, $P_{90}$, $P_{180}$ and $P_{270}$ are obtained by controllably varying the fabricated thicknesses within the first and second substrates 412 and 422.

The various phase-shift portions $P_0$, $P_{90}$, $P_{180}$ and $P_{270}$ of the first and second exemplary embodiments of the high-density phase-shifting array elements 410 and 420 may be formed by any known or later-developed method of fabrication. Such methods include, but are not limited to, material-addition methods, such as patterned deposition or coating, or the like; or material-removal methods, such as patterned etching, or the like; or material displacement methods such micro-molding or micro-embossing or the like. In particular, the only manufacturing requirement is that the various phase-shift portions $P_0$, $P_{90}$, $P_{180}$ and $P_{270}$ can be fabricated in relatively high-density arrays. Specifically, the dimensions of the various phase-shift portions $P_0$, $P_{90}$, $P_{180}$ and $P_{270}$ must be able to approach the dimensions of one pixel, or a small group of pixels, of an optical detector array, as described further below. In various exemplary embodiments according to this invention, as shown in FIG. 6, the arrays of the various phase-shift portions $P_0$, $P_{90}$, $P_{180}$ and $P_{270}$ are implemented by etching or otherwise creating a pattern of regions having different thicknesses within the first and second substrates 412 and 422 that are formed of a birefringent material.

In particular, each of the substrates 412 and 422 is masked by any suitable known or later-developed method, such as methods used for thin film fabrication or the like. Accordingly, the patterns 411 and 421 of the first and second phase angle portions $P_0$ and $P_{180}$, and of the third and fourth phase-shift portions $P_{90}$ and $P_{270}$, can be etched into the surfaces 419 and 429 of the substrates 412 and 422 by any suitable known or later-developed method, such as reactive ion etching or other suitable methods. As previously described, in various exemplary embodiments, the portions $P_{180}$ and $P_{270}$ are etched to an etch depth dimension corresponding to the thickness of a half-wave plate in the birefringent substrates 412 and 422, respectively. For example, in various exemplary embodiments that use a typical commercially-available quartz wave-plate material as the substrates 412 and 422, a nominal etch depth of 35 microns from the surfaces 419 and 429 for the phase-shift portions $P_{180}$ and $P_{270}$ is suitable for a laser source that emits a laser wavefront having a wavelength of 633 nm.

It should also be appreciated that, as shown in FIG. 6, the replication directions of the various phase-shift portions $P_0$, $P_{90}$, $P_{180}$ and $P_{270}$ are arranged horizontally and vertically. However, more generally, the replication directions of each of the various phase-shift portions $P_0$, $P_{90}$, $P_{180}$ and $P_{270}$ are completely controllable and selectable in combination with the other elements of the multiple phase-shift generating structure according to this invention. In various exemplary embodiments, the various phase-shift portions $P_0$, $P_{90}$, $P_{180}$ and $P_{270}$ will be of equal size and shape and will cover equal portions of a detector array of the detector subsystem 700.

In various exemplary embodiments, each of the various phase-shift portions $P_0$, $P_{90}$, $P_{180}$ and $P_{270}$ will extend over an integer number of pixels of the detector array of the detector subsystem 700. In various exemplary embodiments, the boundaries of the various phase-shift portions $P_0$, $P_{90}$, $P_{180}$ and $P_{270}$ will be aligned with the boundaries between the pixels of the detector array. Thus, in such exemplary embodiments, each pair or set of the various phase-shift portions $P_0$ and $P_{180}$, and $P_{90}$ and $P_{270}$, define unit cells within the first and second exemplary embodiments of the high-density phase-shifting array elements 410 and 420 and the corresponding detector arrays of the detector subsystem 700. At one extreme, each of the respective various phase-shift portions $P_0$, $P_{90}$, $P_{180}$ and $P_{270}$ can be associated with and aligned with a respective single pixel of the corresponding detector array.

It should be appreciated that grouping the zero and 180 degree portions $P_0$ and $P_{180}$ on the first high-density phase-shifting array element 410 and the 90 and 270 degree portions $P_{90}$ and $P_{270}$ on the second high-density phase-shifting array element 420 is more appropriate when attempting to cancel certain common-mode offset errors, but is otherwise somewhat arbitrary. That is, this is not done because of some fundamental limitation on the various phase-shift groupings usable in a high-density phase-shifting array element according to this invention. Thus, a high-density phase-shifting array element could instead contain the zero and 90 degree portions $P_0$, and $P_{90}$, while another high-density phase-shifting array element could instead contain the 180 and 270 degree portions $P_{180}$, and $P_{270}$. Thus, in various exemplary embodiments of a phase-shift imaging element according to this invention other combinations of the various phase-shift portions $P_0$, $P_{90}$, $P_{180}$ and $P_{270}$ can be implemented in a high-density phase-shifting array element and at least some of the advantages and benefits of a high-density phase-shifting array element according to this invention will be provided.

FIGS. 7 and 8 illustrate one exemplary phase-shift imaging element 3000 according to this invention. As shown in FIG. 7, the phase-shift imaging element 3000 includes a first exemplary embodiment of a multiple phase-shift generating structure 1400 according to this invention and a first exemplary embodiment of a detector subsystem 700 according to this invention, which includes detector devices 710a and 710b. In the exemplary embodiment shown in FIGS. 7 and 8, the multiple phase-shift generating structure 1400 incorporates the pair of high-density phase-shifting array elements 410 and 420 according to this invention. The multiple phase-shift generating structure 1400 also includes a beam splitter 310 and two polarizers 510a and 510b.

It should be appreciated that the phase-shifted-image generating apparatus 200 disclosed in the 330 patent and described with reference to FIGS. 2–5 uses two phase-shifting "portions", the quarter-wave plate 223 and the blank or neutral plate 224 of the first portion 222, and two differently oriented polarizers, the first +45° polarizing portion 227 and the second −45° polarizing portion 228, to produce four interference images that are spatially separated. In contrast, the exemplary phase shift imaging element 3000 according to this invention uses four phase-shifting portions, the interleaved portions $P_0$, $P_{180}$, and the interleaved portions $P_{90}$ and $P_{270}$ portions of the high-density phase-shifting array elements 410 and 420, respectively, and the two polarizers having a same effective orientation, the polarizers 510a and 510b, to produce two interference images that each include two interleaved interference image portions having different phase-shifts.

As shown in FIGS. 7 and 8, in this exemplary embodiment, the first high-density phase-shifting array element 410 and a first polarizer element 510a are adjacent to the beam splitter 310 along a first direction. Along this first direction, the multiple phase-shift generating structure 1400 generates multiple phase-shifted interference image information 610 at its interface with the detector device 710a. The second high-density phase-shifting array element 420 and a second polarizer element 510b are adjacent to the beam splitter 310 along a second direction. Along this second direction, the multiple phase-shift generating structure 1400 generates multiple phase-shifted interference image information 620 at its interface with the detector device 710b. However, it should be appreciated that the high-density phase-shifting array elements 410 and 420 do not have to lie along the first and second directions, respectively. That is, the high-density phase-shifting array elements 410 and 420 could instead lie along the second and first directions, respectively, without substantially changing the operating principles of the phase-shift imaging element 3000.

As shown in FIGS. 7 and 8, the combined wavefront 129 is transmitted by the optical input portion 135'. Various design considerations related to the optical input portion 135' are discussed further below with reference to FIGS. 20–23. The transmitted combined wavefront 129 includes the reference wavefront 124 and the object wavefront 128. The transmitted combined wavefront 129 passes through the beam splitter 310, which splits the combined wavefront 129 into two respective combined sub-wavefronts or "copies" 129a and 129b. It should be appreciated that, due to the action of the beam splitter 310, the sub-wavefronts or "copies" 129a and 129b are mirror images of each other. However, with appropriate signal processing, this difference is inconsequential. Moreover, in various exemplary embodiments, this difference can even be advantageous. The sub-wavefront 129a is directed along the first direction to the first high-density phase-shifting array element 410 and the polarizer element 510a to the detector device 710a. In contrast, the sub-wavefront 129b is directed along the second direction to the second high-density phase-shifting array element 420 and the second polarizer element 510b to the detector device 710b.

As previously described, the zero degree phase-shift portions $P_0$ and the 180 degree phase-shift portions $P_{180}$ of the first high-density phase-shifting array element 410 are fabricated to shift the relative phase between the two orthogonally polarized sub-wavefront components 124a and 128a comprising the combined sub-wavefront 129a by 0° and 180°, respectively. Thus, when the sub-wavefront 129a directed along the first direction to the first high-density phase-shifting array element 410 is transmitted by the first high-density phase-shifting array element 410, the checkerboard pattern 411 of the first high-density phase-shifting array element 410 creates a spatially interleaved checkerboard phase-shift pattern, corresponding to the pattern 411, in the combined wavefront 129a. In the checkerboard phase-shift pattern 411, the two orthogonally polarized sub-wavefront components 124a and 128a are relatively phase-shifted by 0 degrees corresponding to the portions $P_0$ and by 180 degrees corresponding to the portions $P_{180}$.

The combined sub-wavefront 129a passing out of the first high-density phase-shifting array element 410, including the checkerboard phase-shift pattern 411, is then directed onto the polarizer element 510a. The polarizer element 510a is oriented to transmit the in-phase components of the orthogonally polarized sub-wavefront components 124a and 128a of the combined sub-wavefront 129a. As a result, the multiple phase-shifted interference image information 610 includes a checkerboard pattern, corresponding to the pattern 411, of first "0 degree" interference portions and second "180 degree" interference portions interleaved at a high spatial frequency corresponding to the checkerboard pattern of the 0 degree phase-shift portions $P_0$ and the 180 degree phase-shift portions $P_{180}$.

Similarly, the 90 degree phase-shift portions $P_{90}$ and the 270 degree phase-shift portions $P_{270}$ of the second high-density phase-shifting array element 420 are fabricated to shift the relative phase between the two orthogonally polarized sub-wavefront components 124b and 128b comprising the combined sub-wavefront 129b by 90° and 270°, respectively. Thus, when the sub-wavefront 129b that is directed along the second direction to the second high-density phase-shifting array element 420 is transmitted by the second high-density phase-shifting array element 420, the checkerboard pattern 422 of the second high-density phase-shifting array element 420 acts to create a spatially interleaved checkerboard phase-shift pattern, corresponding to the pattern 421, in the combined wavefront 129b. In the checkerboard phase-shift pattern 421, the two orthogonally polarized sub-wavefront components 124b and 128b are relatively phase-shifted by 90 degrees corresponding to the portions $P_{90}$ and 270 degrees corresponding to the portions $P_{270}$.

The combined sub-wavefront 129b passing out of the second high-density phase-shifting array element 420, including the checkerboard phase-shift pattern 421, is then directed onto the polarizer element 510b. The polarizer element 510b is oriented to transmit the in-phase components of the orthogonally polarized sub-wavefront components 124b and 128b of the combined sub-wavefront 129b. As a result, the multiple phase-shifted interference image information 620 includes a checkerboard pattern, corresponding to the pattern 421, of first "90 degree" interference portions and second "270 degree" interference portions interleaved at a high spatial frequency corresponding to the checkerboard pattern of the 90 degree phase-shift portions $P_{90}$ and the 270 degree phase-shift portions $P_{270}$.

In various exemplary embodiments, the patterned surfaces 419 and 429 of the first and second high-density phase-shifting array elements 410 and 420 are oriented toward their corresponding detector devices 710a and 710b, respectively. In this case, the sub-wavefronts 129a and 129b are incident on the unetched or "plain" sides of the first and second high-density phase-shifting array elements 410 and 420 and exit through the patterned surfaces 419 and 429 onto the first and second polarization elements 510a and 510b, respectively.

In various exemplary embodiments, the patterned or etched surfaces 419 and 429 of the high-density phase-shifting array elements 410 and 420 abut the polarizer elements 510a and 510b, respectively. In various exemplary embodiments, the first and second polarization elements 510a and 510b are distinct polarization elements. However, it should be appreciated that, in various other exemplary embodiments, the polarizer elements 510a and 510b may be fabricated directly on the surface of the first and second high-density phase-shifting array elements 410 and 420, respectively, that is closest to the corresponding detector 710a or 710b. Thus, it should be appreciated that, in various exemplary embodiments, the structures and/or functions of the polarizer elements 510a and/or 510b may be merged with and/or indistinguishable from the corresponding first and/or second high-density phase-shifting array elements 410 and 420. In embodiments where the patterned surfaces 419 and 429 are closest to the corresponding detectors 710a and 710b, the patterned surfaces 419 and 429 may be planarized if necessary for the application of the polarizer elements 510a and 510b, according to planarizing techniques known in the thin film and semiconductor processing fields.

In various exemplary embodiments, planarization can include filling the etched ones of the various phase-shift portions $P_0$–$P_{270}$ with an optical material having an index of refraction that matches the nominal index of refraction of the substrate of the high-density phase-shifting array element 410 or 420 and that is amorphous or otherwise lacking a retardation effect. In various exemplary embodiments, as the surfaces 419 and 429 are planarized, care is taken to avoid removing any phase shifting material. This may be accomplished by leaving a thin film of the neutral optical material over the entire surface 419 and/or 429 of the phase-shifting array elements 410 and/or 420. In various exemplary embodiments, where the phase-shifting array elements 410 and/or 420 are joined to separate polarizer elements 510a and 510b, respectively, an optical grade adhesive having an appropriate optical index can be used to both fill the patterned surfaces 419 and 429 and to join the patterned surfaces 419 and 429 of the phase-shifting array elements 410 and/or 420 to the polarizer elements 510a and 510b, respectively.

In various exemplary embodiments, the high-density phase-shifting array elements 410 and 420 may include a set of "barrier strips" of a light-blocking material that coincides with the edges between the phase-shift portions $P_0$–$P_{270}$ of the high-density phase-shifting array elements 410 and 420 according to this invention. In general, the barrier strips have a width sufficient to occlude any sloped portion of the etched sidewalls between the phase-shift portions $P_0$–$P_{270}$ of the high-density phase-shifting array elements 410 and 420.

In some of these exemplary embodiments, the barrier strips are also wide enough to prevent unwanted leakage from a particular interference portion of the multiple phase-shifted interference image information 610 and 620 into an unintended detector element or pixel. For example, such leakage could occur due to various alignment tolerances during fabrication and assembly of a phase-shift imaging element 3000 according to this invention.

In various exemplary embodiments, the polarizer elements 510a and 510b are wire-grid polarizer elements such as those disclosed in U.S. Patent application serial number, incorporated herein by reference in its entirety, fabricated directly on a planar surface of the first and second high-density phase-shifting array elements 410 and 420, respectively, that is closest to the corresponding detector 710a or 710b. In such embodiments, it is particularly easy to form the set of "barrier strips" during the thin films steps used fabricate the wire-grid polarizer elements.

It should be appreciated that, in various other exemplary embodiments, the polarizer elements 510a and/or 510b and/or barrier strips may be fabricated directly on the surface of the detector devices 710a and 710b, respectively. When the polarizer element 510a or 510b is a wire-grid polarizer, a thin insulating layer should be used between the active portions of the detector device 710a or 710b and the elements of the wire-grid polarizer. Thus, it should be appreciated that, in various exemplary embodiments, the structure and function of the polarizer elements 510a and/or 510b and the detector devices 710a and/or 710b, respectively, may be merged.

In various exemplary embodiments, regardless of their respective methods of fabrication, the patterned surfaces 419 and 429 of the phase-shifting array elements 410 and 420 are oriented toward the detector respective detector devices 710a and 710b, and to abut the polarizer elements 510a and 510b. In various exemplary embodiments, the polarizer elements 510a and 510b are thin relative to the depth of focus of the multiple phase-shifted interference image information 610 and/or 620 in the vicinity of the detector devices 710a and 710b. In various exemplary embodiments, the polarizer elements 510a and 510b abut the respective detector devices 710a and 710b such that the polarizer elements 510a and 510b are separated from the surface of the detector elements of the detector devices 710a and 710b, respectively, by only a thin film insulating layer or a negligible air gap, or the like.

In such "abutting" embodiments, the best alignment between the various phase-shift portions $P_0$–$P_{270}$, and the detector elements of their corresponding detector devices 710a or 710b is facilitated, and "leakage" of interference light of different relative phase-shifts between adjacent detector elements or pixels is reduced, and, ideally, minimized. Furthermore, any light scattered or diffracted by the polarizing structures of the first and second polarizer elements 510a and 510b will be primarily confined to, and averaged by, the abutting pixel(s), and thus will not disturb the acquired multiple phase-shifted interference image information 610 and/or 620.

In various exemplary embodiments, regardless of their respective fabrication methods, the polarizer elements 510a and 510b, the high-density phase-shifting array elements 410 and 420, the detector portions 710a and 710b and the beam splitter 310 are effectively bonded or joined together to form a monolithic phase-shift imaging element, such as the phase-shift imaging element 3000 shown in FIG. 7. It should be appreciated that in various exemplary embodiments according to this invention it is advantageous to fabricate the polarizer elements 510a and 510b, the high-density phase-shifting array elements 410 and 420, and the beam splitter 310 such that each portion of the effective optical path length of each of the combined sub-wavefronts 129a and 129b are as similar as possible, and ideally, equal.

In a first exemplary embodiment of the phase-shift imaging element 3000, the reference wavefront 124 and the object wavefront 128 are polarized along the orthogonal vertical and horizontal directions 132A and 133A shown in FIG. 8. In this exemplary embodiment, the fast axes 418 and 428 of the of the birefringent substrate material of the respective phase-shifting array elements 410 or 420 are oriented vertically, as shown in FIG. 6, and the polarizer elements 510a and 510b each has the polarization direction 512A, i.e., the polarization direction that lies at a 45 degree angle to the orthogonal vertical and horizontal directions 132A and 133A. As a result, the polarizer element 510a transmits and interferes the in-phase components of the orthogonally polarized sub-wavefront components 124a and 128a of the combined sub-wavefront 129a in the checkerboard phase-shift pattern passing out of the first high-density phase-shifting array element 410 to produce the multiple phase-shifted interference image information 610. Similarly, the polarizer element 510b transmits and interferes the in-phase components of the orthogonally polarized sub-wavefront components 124b and 128b of the combined sub-wavefront 129b in the checkerboard phase-shift pattern passing out of the second high-density phase-shifting array element 420 to produce the multiple phase-shifted interference image information 620.

In particular, the multiple phase-shifted interference image information 610 includes a checkerboard pattern of "$Q_0$" and "$Q_2$" interference portions. The "$Q_0$" interference portions correspond to a relative phase shift of zero degrees between the sub-wavefront components 124a and 128a that pass through the zero degree phase-shift portions $P_0$ of the first high-density phase-shifting array element 410 and the polarizer element 510a. The "$Q_2$" interference portions correspond to a relative phase shift of 180 degrees between the sub-wavefront components 124a and 128a that pass through the 180 degree phase-shift portions $P_{180}$ of the first high-density phase-shifting array element 410 and the polarizer element 510a.

Thus, the $Q_0$ and $Q_2$ interference portions within the multiple phase-shifted interference image information 610 are interleaved in a checkerboard pattern at a high spatial frequency corresponding to the pattern 411 of the high-density phase-shifting array element 410. It should be appreciated that, in one sense, this checkerboard pattern of $Q_0$ and $Q_2$ interference portions corresponds to a high-density interleaving of the $Q_0$ quadrant 232 and the $Q_2$ quadrant 236 shown in FIG. 4, transmitted as a single image onto the surface of the detector device 710a.

Similarly to the $Q_0$ and $Q_2$ interference portions of the multiple phase-shifted interference image information 610, the multiple phase-shifted interference image information 620 includes a checkerboard pattern of "$Q_1$" and "$Q_3$" interference portions. The $Q_1$ interference portions correspond to a relative phase shift of 90 degrees between the phase-shifted sub-wavefront components 124b and 128b that pass through the 90 degree phase-shift portions $P_{90}$ of the second high-density phase-shifting array element 420 and the second polarizer element 510b. In contrast, the $Q_3$ interference portions correspond to a relative phase shift of 270 degrees between the sub-wavefront components 124b and 128b that pass through the 270 degree phase-shift portions $P_{270}$ of the second high-density phase-shifting array element 420 and the second polarizer element 510b.

Thus, the $Q_1$ and $Q_3$ interference portions within the multiple phase-shifted interference image information 620 are interleaved in a checkerboard pattern at a high spatial frequency corresponding to the pattern 421 of the second high-density phase-shifting array element 420. It should be appreciated that, in one sense, this checkerboard pattern of $Q_1$ and $Q_3$ interference portions corresponds to a high-density interleaving of the $Q_1$ quadrant 234 and the $Q_3$ quadrant 238 shown in FIG. 4, transmitted as a single image onto the surface of the detector device 710b.

It should be appreciated that, because the sub-wavefronts or "copies" 129a and 129b are mirror images of each other, as described above, the multiple phase-shifted interference image information 610 and the multiple phase-shifted interference image information 620 are, likewise, mirror images of each other with respect to their information content with respect to the object 130. However, with appropriate signal processing, this difference is inconsequential or, in various embodiments, even advantageous.

In a second exemplary embodiment of the phase-shift imaging element 3000, the reference wavefront 124 and the object wavefront 128 are polarized along the orthogonal directions 132B and 133B shown in FIG. 8. In particular, the orthogonal polarization directions 132B and 133B are rotated by 45 degrees relative to the horizontal and vertical directions 132A and 133B of the first exemplary embodiment. In this second exemplary embodiment, the fast axes 418 and 428 of the substrate material of the respective phase-shifting array elements 410 or 420 are similarly rotated by 45 degrees relative to the vertical directions shown in FIG. 6, but the phase-shifting array elements 410 and 420 are otherwise unchanged in structure.

In this second exemplary embodiment, the polarizer elements 510a and 510b each has the polarization direction 512B, i.e., the polarization direction that lies halfway between the orthogonal polarization directions 132B and 133B. As a result, similarly to the first exemplary embodiment, the polarizer elements 510a transmits and interferes the in-phase components of the orthogonally polarized sub-wavefront components 124a and 128a in the checkerboard phase-shift pattern passing out of the first high-density phase-shifting array element 410. In contrast, the polarizer element 510b transmits and interferes the in-phase components of the orthogonally polarized sub-wavefront components 124b and 128b in the checkerboard phase-shift pattern passing out of the second high-density phase-shifting array element 420.

Thus, it should be appreciated that this second exemplary embodiment operates in substantially the same manner as the first exemplary embodiment of the phase-shift imaging element 3000 described above. As a result, in various exemplary embodiments, the multiple phase-shifted interference image information 610 and the multiple phase-shifted interference image information 620 provided by this second exemplary embodiment of the of the phase-shift imaging element 3000 include the same checkerboard patterns described above with respect to the first exemplary embodiment of the phase-shift imaging element 3000.

It should be appreciated that, as shown in FIGS. 7 and 8, because the first exemplary embodiment of the multiple phase shift generating structure 1400 according to this invention and the exemplary phase shift imaging element 3000 are each monolithic or integrated structures, the various optical paths shown in FIGS. 7 and 8 are not independent of each other. That is, any vibrations or other rotational and/or translational motions that may be encountered are inherently equally applied to all of the optical paths. Thus, any errors created by such rotational and/or translational motions are common-mode errors. Thus, any such errors do not affect the accuracy of the determined measurements generated by the control system 170.

Furthermore, it should be appreciated that the "0° relative phase shift" interference portions, referred to as the $Q_0$ interference portions, and the "180° relative phase shift" interference portions, referred to as the $Q_2$ interference portions, are interleaved in a high spatial frequency checkerboard pattern across the surface of the detector device 710a. As a result, it should be appreciated that the various non-common mode errors present in the multiple phase shifted-image generating apparatus 200 shown in FIGS. 2–5, due to spatial separation of phase-shifted interferograms 600a and 600c in the $Q_0$ and $Q_2$ quadrants, are reduced, and, ideally, are eliminated. That is, because the 0° and 180° phase shift interference portions are adjacent to each other at each location throughout the detector device 710a, it can be assumed that each location is imaging substantially the same portion of portion of the object 130 in the 0° and 180° phase shift interference portions at each location. Furthermore, for the pixels at each location, inconsistencies in the transfer function from the incident light intensity to the output signal amplitude are reduced, and, ideally, are minimal. Thus, in various exemplary embodiments, errors related to these factors are reduced and/or minimized, and in many exemplary embodiments, ideally, are eliminated.

It should be appreciated that, in various exemplary embodiments according to this invention, such benefits arise because multiple phase-shifted interference image information 600 is provided for multiple phases within a small region on a detector subsystem 700. Stated another way, in various exemplary embodiments according to this invention, such benefits arise because a single image arising from a single sub-wavefront includes information for each of two or more different relative phase shifts, and that information is interleaved throughout the image. It should be appreciated that, in various exemplary embodiments according to this invention, the same benefits are derived from the "90° relative phase shift" interference portions, referred to as the $Q_1$ interference portions, and the "270° relative phase shift" interference portions, referred to as the $Q_3$ interference portions, that are interleaved in a high spatial frequency checkerboard pattern across the surface of the detector device 710b, for the same reasons.

It should be appreciated that the first exemplary embodiment of the multiple phase shift generating structure 1400 according to this invention and the exemplary phase shift imaging element 3000 provide two different phases of relative phase-shift interference information arising from only a single image that is derived from a single sub-wavefront. Similarly, the first exemplary embodiment of the multiple phase shift generating structure 1400 according to this invention and the exemplary phase shift imaging element 3000 provide four different phases of relative phase-shift interference information arising from only two spatially-separated images that are each respectively derived from a single respective sub-wavefront.

In various exemplary embodiments, the components of the phase-shift imaging element 3000 are selected and assembled to insure that the optical path lengths of the combined sub-wavefronts 129a and 129b are substantially equal. Thus, any focusing, aperture, and/or magnification properties, or the like, of the optical input portion 135' will produce the same image effects at the detector devices 710a and 710b.

In addition, in various exemplary embodiments, the detector devices 710a and 710b are selected as a matched set and/or calibrated to match the outputs of comparable detector elements of pixels between the two detector devices 710a and 710b. It should be appreciated that using two detector devices 710a and 710b allows the image of each respective sub-wavefront 129a and 129b or image of the multiple phase-shifted interference image information 610 and 620 to be larger than can be obtained if both images are imaged into spatially separated regions of a single similarly-sized detector device. The available signal and spatial resolution of the phase shift imaging element 3000 are improved accordingly.

However, this exemplary embodiment does have a partial disadvantage, in that differences in the nominal image light intensity and/or inconsistencies in the transfer function from the incident light intensity to the output signal amplitude may be present between the comparable detector elements or pixels of the different detector devices 710a and 710b. It should be appreciated that, due to such differences, some residual non-common mode errors remain in some, but not all, of the operations associated with the measurements generated by the control system 170. It should be appreciated further, that these residual errors are reduced in the various exemplary embodiments described above that match and/or calibrate the two detector devices.

Figure 9A:
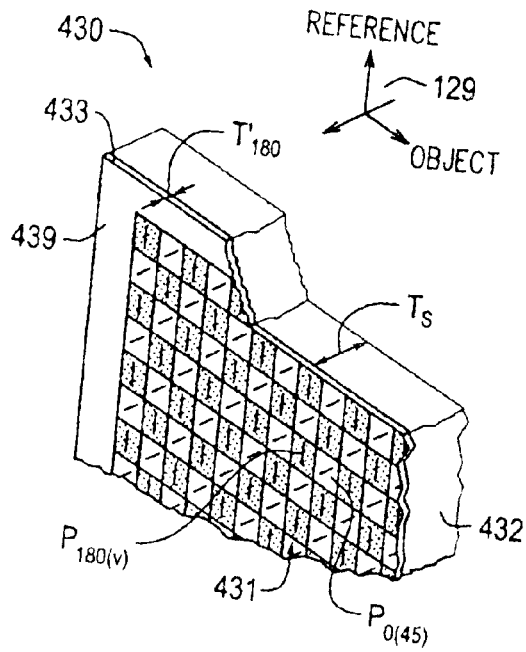
FIG. 9 illustrates a perspective and cross-sectional view of portions of third, fourth and fifth exemplary embodiments of a high-density phase-shifting array element usable in the first exemplary embodiment of the high-density multiple phase-shifted image generating structure according to this invention.
Figure 9B:
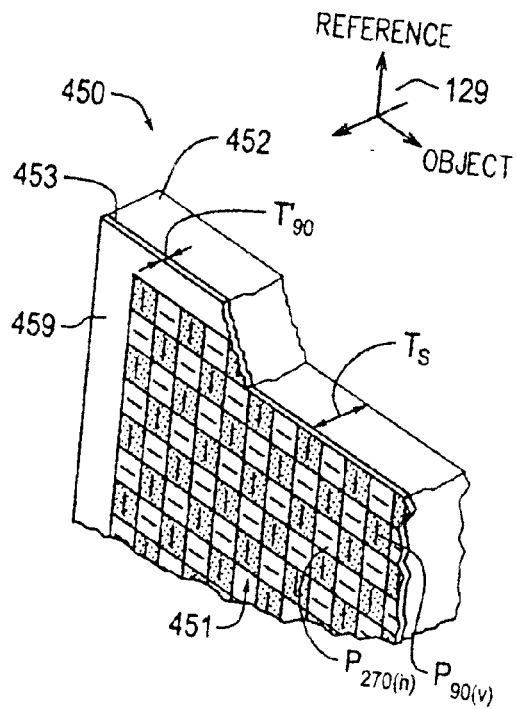
Figure 9C:
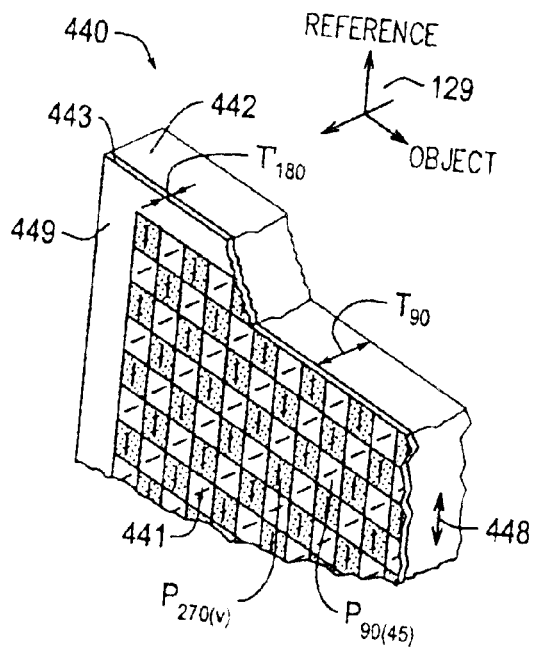

FIG. 9 illustrates a portion of a third exemplary embodiment of a high-density phase-shifting array element 430 according to this invention. The high-density phase-shifting array element 430, shown in FIG. 9A, is usable in various exemplary embodiments of the multiple phase-shift generating structure 1400, as described above and below with respect to the first and second exemplary embodiments 3000 and 4000, respectively, of a phase-shift imaging element according to this invention. FIG. 9 further illustrates, in FIGS. 9B and 9C, a portion of a fifth exemplary embodiment of a high-density phase-shifting array element 450 and a portion of a fourth exemplary embodiment of a high-density phase-shifting array element 440 according to this invention that is interchangeable with the high-density phase-shifting array element 450.

The high-density phase-shifting array elements 430 and 450 are usable in each of the first and second exemplary embodiments 3000 and 4000 of the phase-shift array imaging element according to this invention. It should be appreciated that the exemplary embodiments 3000 and 4000, and similar phase-shift imaging elements according to this invention, are usable in place of the multiple phase-shift image generating apparatus 200 shown in FIGS. 2–5 and, more generally, in the multiple phase-shift image generating portion 1600 described with reference to FIG. 1.

As shown in FIG. 9, in various exemplary embodiments, the third exemplary embodiment of the high-density phase-shifting array element 430, shown in FIG. 9A, is formed using a null-phase-shift substrate 432. In various exemplary embodiments, the null phase-shift substrate 432 can be formed using an amorphous material or other non-birefringent material and the substrate thickness $T_S$ of the substrate 432 can be any desired value. However, in various other embodiments, a birefringent material may be used, provided that the thickness $T_S$ of the substrate 432 must be such that the component of a combined wavefront 129 that is polarized parallel to the slow axis of the birefringent substrate 432 is retarded by an integer number of wavelengths relative to the component of the combined wavefront 129 that is polarized parallel to the fast axis, and the fast axis of the substrate 432 must be operably aligned so that the material layer 433 operates as described below.

The high-density phase-shifting array element 430 further includes a birefringent material layer 433 including a surface 439. In particular, the birefringent material layer 433 is formed of a birefringent material that can have its fast axis selectively patterned as described in detail below. As shown in FIG. 9A, the birefringent material layer 433 of the third exemplary embodiment of the high-density phase-shifting array element 430 has a nominal thickness $T'_{180}$. Due to the thickness $T'_{180}$, the component of a combined wavefront 129 that is polarized parallel to a slow axis of the birefringent material layer 433 is retarded by one-half a wavelength, plus an integer number of wavelengths, if desired, relative to the component of the combined wavefront 129 that is polarized parallel to a fast axis of the birefringent material layer 433. As shown in FIG. 9A, the birefringent material layer 433 includes zero-degree phase shift portions $P_{0(45)}$ and 180 degree phase shift portions $P_{180(v)}$ arranged in a checkerboard pattern 431.

Each portion $P_{0(45)}$ of the birefringent material layer 433 has the nominal thickness $T'_{180}$. Each portion $P_{0(45)}$ is fabricated such that the fast axis of the birefringent material layer 433 in that portion is oriented at 45 degrees relative to the expected operational orientations of the orthogonal components of a combined wavefront 129, as indicated by the exemplary REFERENCE and OBJECT orthogonal components and the typical alignment lines shown in various portions $P_{0(45)}$ in the exemplary embodiment shown in FIG. 9A. It should be appreciated that, with these relative orientations, the portions $P_{0(45)}$ of the third exemplary embodiment of the high-density phase-shifting array element 430 retard the orthogonal components equally and, therefore, do not produce any net relative phase shift between the components of the wavefront 129.

That is, each portion $P_0$ produces a zero-degree relative phase shift between the components of the wavefront 129, as indicated by the subscript "0", used as a convention herein. It should be appreciated that the additional subscript "(45)" is used as an additional convention for labeling portions of "variable fast-axis" phase-shifting array elements herein, indicating that the relative orientation of the fast axis in the corresponding portion of a birefringent material layer is "45 degrees".

Each portion $P_{180(v)}$ of the birefringent material layer 433 has the nominal thickness $T'_{180}$. Each portion $P_{180(v)}$ is fabricated such that the fast axis of the birefringent material layer 433 in that portion is oriented vertically. That is, the fast axis of each portion $P_{180(v)}$ is parallel to the expected operational orientation of a vertically oriented one of the orthogonal components of a combined wavefront 129, as indicated by the exemplary REFERENCE and OBJECT orthogonal components and the typical alignment lines shown in various portions $P_{180(v)}$ in the exemplary embodiment shown in FIG. 9B. It should be appreciated that with these relative orientations, in the portions $P_{180(v)}$ of the third exemplary embodiment of the high-density phase-shifting array element 430 the horizontal component of the combined wavefront 129 that is polarized parallel to the slow axis in that portion of the birefringent material layer 433 is retarded by half a wavelength or 180 degrees phase-shift relative to the vertical component of the combined wavefront 129.

That is, each portion $P_{180(v)}$ produces a 180 degree relative phase shift between the components of the wavefront 129, as indicated by the subscript "180", used as a convention herein. It should be appreciated that the additional subscript "(v)" is used as an additional convention for labeling portions of "variable fast-axis" phase-shifting array elements herein, indicating that the relative orientation of the fast axis in the corresponding portion of a birefringent material layer is "vertical".

It should be appreciated, from the above description, that the portions $P_{0(45)}$ and $P_{180(v)}$ of the third exemplary embodiment of the high-density phase-shifting array element 430 are functionally equivalent to the portions $P_0$ and $P_{180}$ of the first exemplary embodiment of the high-density phase-shifting array element 410, with respect to their net optical effects in multiple phase-shifted interference image information. Thus, in various exemplary embodiments of the phase-shift imaging elements 3000 and 4000 according to this invention, the high-density phase-shifting array elements 430 and 410 are nominally interchangeable. Accordingly, the high-density phase-shifting array elements 430 and 410 may be employed according to similar design considerations, similarly dimensioned, and similarly assembled in the phase-shift imaging elements 3000 and 4000 to produce similar or identical interleaved phase-shifted image information, for example, as described with reference to FIGS. 7 and 8 above.

The fifth exemplary embodiment of the high-density phase-shifting array element 450, shown in FIG. 9B, is formed in a manner analogous to the third exemplary embodiment of the high-density phase-shifting array element 430 described above. In various exemplary embodiments, the high-density phase-shifting array element 450 includes a substrate 452 fabricated according to any of the methods and dimensions previously described for the substrate 432. The high-density phase-shifting array element 450 similarly includes a birefringent material layer 453 including a surface 459. Similarly, the birefringent material layer 453 is formed of a birefringent material that can have its fast axis selectively patterned, as described in detail below.

As shown in FIG. 9B, the birefringent material layer 453 of the fifth exemplary embodiment of the high-density phase-shifting array element 450 has a nominal thickness $T'_{90}$. Due to the thickness $T'_{90}$, the component of a combined wavefront 129 that is polarized parallel to a slow axis of the birefringent material layer 453 is retarded by one-quarter of a wavelength, plus an integer number of wavelengths if desired, relative to the component of the combined wavefront 129 that is polarized parallel to a fast axis of the birefringent material layer 453. As shown in FIG. 9B, the birefringent material layer 433 includes 90-degree phase shift portions $P_{90(v)}$ and 270 degree phase shift portions $P_{270(h)}$ arranged in a checkerboard pattern 451.

Each portion $P_{90(v)}$ of the birefringent material layer 453 has the nominal thickness $T'_{90}$. Each portion $P_{90\ (v)}$ is fabricated such that the fast axis of the birefringent material layer 453 in that portion is oriented vertically. That is, the fast axis of each portion $P_{90(v)}$ is parallel to the expected operational orientation of a vertically oriented one of the orthogonal components of a combined wavefront 129, as indicated by the exemplary REFERENCE and OBJECT orthogonal components and the typical alignment lines shown in various portions $P_{90(v)}$ in the exemplary embodiment shown in FIG. 9B.

It should be appreciated that, with these relative orientations, in the portions $P_{90(v)}$ of the fifth exemplary embodiment of the high-density phase-shifting array element 450, the horizontal component of the combined wavefront 129 that is polarized parallel to the slow axis in that portion of the birefringent material layer 453 is retarded by one-quarter of a wavelength or 90 degrees phase-shift relative to the vertical component of the combined wavefront 129. That is, each portion $P_{90(v)}$ produces a 90 degree relative phase shift between the components of the wavefront 129, as indicated by the subscript "90", used as a convention herein. It should be appreciated that the additional subscript "(v)", as discussed above, is used as an additional convention for labeling portions of "variable fast-axis" phase-shifting array elements herein, indicating that the relative orientation of the fast axis in the corresponding portion of a birefringent material layer is "vertical".

Each portion $P_{270(h)}$ of the birefringent material layer 453 has the nominal thickness $T'_{90}$. Each portion $P_{270(h)}$ is fabricated such that the fast axis of the birefringent material layer 453 in that portion is oriented horizontally. That is, the fast axis of each portion $P_{270(h)}$ is parallel to the expected operational orientation of a horizontally oriented one of the orthogonal components of a combined wavefront 129, as indicated by the exemplary REFERENCE and OBJECT orthogonal components and the typical alignment lines shown in various portions $P_{270(h)}$ in the exemplary embodiment shown in FIG. 9B. It should be appreciated that, with these relative orientations, in the portions $P_{270(h)}$ of the fifth exemplary embodiment of the high-density phase-shifting array element 450, the vertical component of the combined wavefront 129 that is polarized parallel to the slow axis in that portion of the birefringent material layer 453 is retarded by one-quarter of a wavelength or 90 degrees phase-shift relative to the horizontal component of the combined wavefront 129.

It should be appreciated that this is functionally equivalent to retarding the horizontal component by 270 degrees phase-shift relative to the vertical component of the combined wavefront 129 with respect to the net optical effects in multiple phase-shifted interference image information. Thus, it may be seen the each portion $P_{270(h)}$, in effect, produces a 270 degree relative phase shift between the components of the wavefront 129, as indicated by the subscript "270", used as a convention herein. It should be appreciated that the additional subscript "(h)", is used as an additional convention for labeling portions of "variable fast-axis" phase-shifting array elements herein, indicating that the relative orientation of the fast axis in the corresponding portion of a birefringent material layer is "horizontal".

Thus, it should be appreciated, from the above description, that the portions $P_{90(v)}$ and $P_{270(h)}$ of the fifth exemplary embodiment of the high-density phase-shifting array element 450 are functionally equivalent to the portions $P_{90}$ and $P_{270}$ of the second exemplary embodiment of the high-density phase-shifting array element 420. Accordingly, the high-density phase-shifting array elements 450 and 420 may be employed according to similar design considerations, similarly dimensioned, and similarly assembled in the phase-shift imaging elements 3000 and 4000 to produce similar or identical interleaved phase-shifted image information, for example, as described with reference to FIGS. 7 and 8 above.

The fourth exemplary embodiment of the high-density phase-shifting array element 440, shown in FIG. 9C, is formed in a manner analogous to the third exemplary embodiment of the high-density phase-shifting array element 430 described above, except the high-density phase-shifting array element 440 requires a birefringent substrate 442 having a nominal thickness $T_{90}$. Due to the thickness $T_{90}$, the component of a combined wavefront 129 that is polarized parallel to the slow axis of the birefringent substrate 412 is retarded by one-quarter of a wavelength, plus an integer number of additional wavelengths if desired, relative to the component of the combined wavefront 129 that is polarized parallel to the fast axis of the birefringent substrate 442. The arrow 448 indicates the substrate fast axis orientation in the exemplary embodiment shown in FIG. 9C, which is consistent with the following description of the structure and operation of high-density phase-shifting array element 440.

Otherwise, the high-density phase-shifting array element 440 similarly includes a birefringent material layer 443 including a surface 449. Similarly, the birefringent material layer 443 is formed of a birefringent material that can have its fast axis selectively patterned, as described in detail below. As shown in FIG. 9C, the birefringent material layer 443 of the fourth exemplary embodiment of the high-density phase-shifting array element 440 has a nominal thickness $T'_{180}$. Due to the thickness $T_{90}$, the component of a combined wavefront 129 that is polarized parallel to a slow axis of the birefringent material layer 453 is retarded by one-half of a wavelength, plus an integer number of wavelengths if desired, relative to the component of the combined wavefront 129 that is polarized parallel to a fast axis of the birefringent material layer 443. As shown in FIG. 9, the birefringent material layer 443 includes 90-degree phase shift portions $P_{90(45)}$ and 270 degree phase shift portions $P_{270(v)}$ arranged in a checkerboard pattern 441.

Each portion $P_{90(45)}$ of the birefringent material layer 443 has the nominal thickness $T'_{180}$. Each portion $P_{90(45)}$ is fabricated such that the fast axis of the birefringent material layer 443 in that portion is oriented at 45 degrees relative to the expected operational orientations of the orthogonal components of a combined wavefront 129, as indicated by the exemplary REFERENCE and OBJECT orthogonal components and the typical alignment lines shown in various portions $P_{90(45)}$ in the exemplary embodiment shown in FIG. 9C.

It should be appreciated that with these relative orientations, the portions $P_{90(45)}$ of the third exemplary embodiment of the high-density phase-shifting array element 430 retard the orthogonal components equally. Therefore, the portions $P_{90(45)}$ do not within themselves produce any net relative phase shift between the components of the wavefront 129. However, since the birefringent substrate 442, having the thickness $T_{90}$, everywhere produces a 90 degree retardation of the horizontal component of the combined wavefront 129, the $P_{90(45)}$ each produce transmitted light having a 90 degree relative phase shift between the components of the wavefront 129, as indicated by the subscript "90", used as a convention herein. It should be appreciated that the additional subscript "(45)" has the previously described conventional meaning.

Each portion $P_{270(v)}$ of the birefringent material layer 443 has the nominal thickness $T'_{180}$. Each portion $P_{270(v)}$ is fabricated such that the fast axis of the birefringent material layer 453 in that portion is oriented vertically. That is, the fast axis of each portion $P_{270(v)}$ is parallel to the expected operational orientation of a vertically oriented one of the orthogonal components of a combined wavefront 129, as indicated by the exemplary REFERENCE and OBJECT orthogonal components and the typical alignment lines shown in various portions $P_{270(v)}$ in the exemplary embodiment shown in FIG. 9C.

It should be appreciated that with these relative orientations, in the portions $P_{270(v)}$ of the fourth exemplary embodiment of the high-density phase-shifting array element 440 the horizontal component of the combined wavefront 129 that is polarized parallel to the slow axis in that portion of the birefringent material layer 443 is further retarded by one-half of a wavelength or 180 degrees phase-shift relative to the vertical component of the combined wavefront 129. It should be appreciated that because the birefringent substrate 442, having the thickness $T_{90}$, everywhere produces a 90 degree retardation of the horizontal component of the combined wavefront 129, the $P_{270(v)}$ portions therefore each produce transmitted light having a total of 270 degrees relative phase shift between the components of the wavefront 129, as indicated by the as indicated by the subscript "270", used as a convention herein. It should be appreciated that the additional subscript "(v)" has the previously described conventional meaning.

Thus, it should be appreciated from the above description that the portions $P_{90(45)}$ and $P_{270(v)}$ of the fourth exemplary embodiment of the high-density phase-shifting array element 440 are functionally equivalent to the portions $P_{90(v)}$ and $P_{270(h)}$ of the fifth exemplary embodiment of the high-density phase-shifting array element 450. Accordingly, the high-density phase-shifting array elements 440 and 450 may be employed according to similar design considerations, similarly dimensioned, and similarly assembled in the phase-shift imaging elements 3000 and 4000 to produce similar or identical interleaved phase-shifted image information, for example, as described with reference to FIGS. 7 and 8 above.

It should be appreciated that, in various exemplary embodiments of a phase-shift imaging element according to this invention, the accuracy and resolution of the resulting interferometric measurement is enhanced when the optical path lengths of all portions of the combined wavefront 129 are nominally the same through the phase-shift imaging element according to this invention. It should be appreciated that the exemplary "variable thickness" high-density phase-shifting array elements 410 and 420 produce inherently different optical path lengths in their different phase shift portions. If precisely equal path optical path lengths are desired, such embodiments require additional processing using refractive index-matching fill materials or the like. In contrast, each of the exemplary "variable fast-axis" high-density phase-shifting array elements 430, 440, and 450 nominally use constant-thickness birefringent material layers 433, 443 and 453, respectively. Thus, the high-density phase-shifting array elements 430, 440, and 450 each provide inherently equal optical path lengths in their different phase shift portions, without the need for additional processing.

It should be appreciated that the birefringent material layers 433, 443 and 453 can be formed using any birefringent material having a fast and/or slow axis orientation that can be controllably varied and patterned.

In various exemplary embodiments, the layers 433, 443 and 453 are formed using a class of materials known as "reactive mesogens". In various exemplary embodiments, reactive mesogens behave essentially as polymerizable liquid crystal materials. In general, the fast axis orientation of various portions of a reactive mesogen material layer will depend on an aligning condition that is applied to the various portions of the reactive mesogen material layer as the material experiences manufacturing conditions that fix the fast axis alignment of its various portions. In various known fabrication processes, the aligning condition can be one or more of the direction of an aligning field, the direction of an aligning light polarization, an alignment direction of an aligning surface, or the like.

By using materials such as reactive mesogens, it is possible to create an array of phase-shifting portions that includes a pattern of different fast-axis directions in the various phase-shifting portions. That is, by applying a particular aligning condition in each particular phase-shifting portion of the array at the time each particular portion of the array experiences the orientation-fixing manufacturing condition, the molecular orientation and the fast axis of the reactive mesogen material for each such particular phase-shifting portion is fixed. This is described in greater detail in U.S. Pat. Nos. 6,055,103 and 5,073,294 and in "3D Display Systems Hardware Research at Sharp Laboratories of Europe: an update," J. Harrold et al., Sharp Technical Journal, May 21, 1999, each of which is incorporated herein by reference in its entirety.

In various other exemplary embodiments, using a related technology, the layers 433, 443 and 453 are formed using a class of materials known as liquid crystals polymers (LCP) that behave essentially as polymerizable liquid crystal materials. These are fabricated with the aid of linear photo-polymerization (LPP) materials. Linear photo-polymerization is a photo-patternable technology that enables alignment of the liquid crystals polymers (LCP).

Liquid crystals polymer/linear photo-polymerization (LPP/LCP) devices may be created by structured photo-alignment of a linear photo-polymerization layer through photo-masks, thus generating a high resolution, photo patterned aligning layer that carries the aligning information needed to fabricate a variable fast-axis high-density phase-shift array according to this invention. The subsequent liquid crystals polymer layer transforms the aligning information layer into a patterned birefringent material layer according to this invention. This is described in greater detail in U.S. Pat. Nos. 6,300,991; 6,160,597 and 6,369,869, and in "Optical LPP/LCP Devices: A new Generation of Optical Security Elements", F. Moia et al., Proceedings of SPIE; Optical Security and Counterfeit Deterrence Techniques III, Vol.

3973, pp. 196–203, San Jose (Calif.), Jan. 27–28, 2000, each of which is incorporated herein by reference in its entirety.

The orientations of the fast axes within the layers 433, 443 and 453 for the various phase-shift portions $P_{O(45)}$, $P_{180(v)}$, $P_{90(45)}$, $P_{270(v)}$, $P_{90(v)}$ and $P_{270(h)}$ of the third, fourth and fifth exemplary embodiments of the high-density phase-shifting array elements 430, 440 and 450 may be formed by any known or later-developed method of controlling the fast axis orientation of the variable fast axis material used to form the layers 433, 443 and 453. In particular, the only manufacturing requirement is that the various phase-shift portions $P_{O(45)}$, $P_{180(v)}$, $P_{90(45)}$, $P_{270(v)}$, $P_{90(v)}$ and $P_{270(h)}$ can be fabricated in relatively high density arrays. Specifically, the dimensions of the various phase-shift portions $P_{O(45)}$, $P_{180(v)}$, $P_{90(45)}$, $P_{270(v)}$, $P_{90(v)}$ and $P_{270(h)}$ must be able to approach the dimensions of one pixel, or a small group of pixels, of an optical detector array, as described further below. In various exemplary embodiments according to this invention, the arrays of the various phase-shift portions $P_{O(45)}$, $P_{180(v)}$, $P_{90(45)}$, $P_{270(v)}$, $P_{90(v)}$ and $P_{270(h)}$ are implemented by rubbing along different directions various substrate surfaces, coated substrate surfaces and/or alignment layers (not shown) formed in operable aligning proximity to the birefringent material layers 433, 443 and 453.

Alternatively, in various exemplary embodiments according to this invention, the arrays of the various phase-shift portions $P_{O(45)}$, $P_{180(v)}$, $P_{90(45)}$, $P_{270(v)}$, $P_{90(v)}$ and $P_{270(h)}$ are implemented by sequentially applying one or more external fields that causes the material used to form the layers 433, 443 and 453 to align in the desired direction as the various phase-shift portions $P_{O(45)}$, $P_{180(v)}$, $P_{90(45)}$, $P_{270(v)}$, $P_{90(v)}$ and $P_{270(h)}$ are polymerized. For example, to form the pattern 431 in the material layer 433, the first phase angle portions $P_{O(45)}$ can be formed by selectively exposing those portions to a curing stimulus while applying an external magnetic, electrical or polarized light field having a first "45 degree" orientation. Then, the second phase angle portions $P_{180(V}$ can be formed by selectively exposing those portions to the curing stimulus while applying an external magnetic, electrical or polarized light field having a second "vertical" orientation.

It should also be appreciated that, as shown in FIG. 9, the replication directions of the various phase-shift portions $P_{O(45)}$, $P_{180(v)}$, $P_{90(45)}$, $P_{270(v)}$, $P_{90(v)}$ and $P_{270(h)}$ are arranged horizontally and vertically. However, more generally, the replication directions of each of the various phase-shift portions $P_{(45)}$, $P_{180(v)}$, $P_{90(45)}$, $P_{270}(v)$, $P_{90(v)}$ and $P_{270(h)}$ are completely controllable and selectable in combination with the other elements of the multiple phase-shift generating structure according to this invention. In various exemplary embodiments, the various phase-shift portions $P_{O(45)}$, $P_{180(v)}$, $P_{90(45)}$, $P_{270(v)}$, $P_{90(v)}$ and $P_{270(h)}$ will be of equal size and shape and will cover equal portions of a detector array of a detector subsystem 700.

In general, each of the various phase-shift portions $P_{O(45)}$, $P_{180(v)}$, $P_{90(45)}$, $P_{270(v)}$, $P_{90(v)}$ and $P_{270(h)}$ will extend over an integer number of pixels of the detector array. In general, the boundaries of the various phase-shift portions $P_{O(45)}$, $P_{180(v)}$, $P_{90(45)}$, $P_{270(v)}$, $P_{90(v)}$ and $P_{270(h)}$ will be aligned with the boundaries between the pixels of the detector array. Thus, each pair or set of the various phase-shift portions $P_{O(45)}$ and $P_{180(v)}$, $P_{90(45)}$ and $P_{270(v)}$, and $P_{90(v)}$ and $P_{270(h)}$ define unit cells within the third, fourth and fifth exemplary embodiments of the high-density phase-shifting array elements 430, 440 and 450 and their corresponding detector arrays. At one extreme, each of the respective various phase-shift portions $P_{O(45)}$, $P_{180(v)}$, $P_{90(45)}$, $P_{270(v)}$, $P_{90(v)}$ and $P_{270(h)}$ can be associated with and aligned with a respective single pixel of a corresponding detector array.

Figure 10:
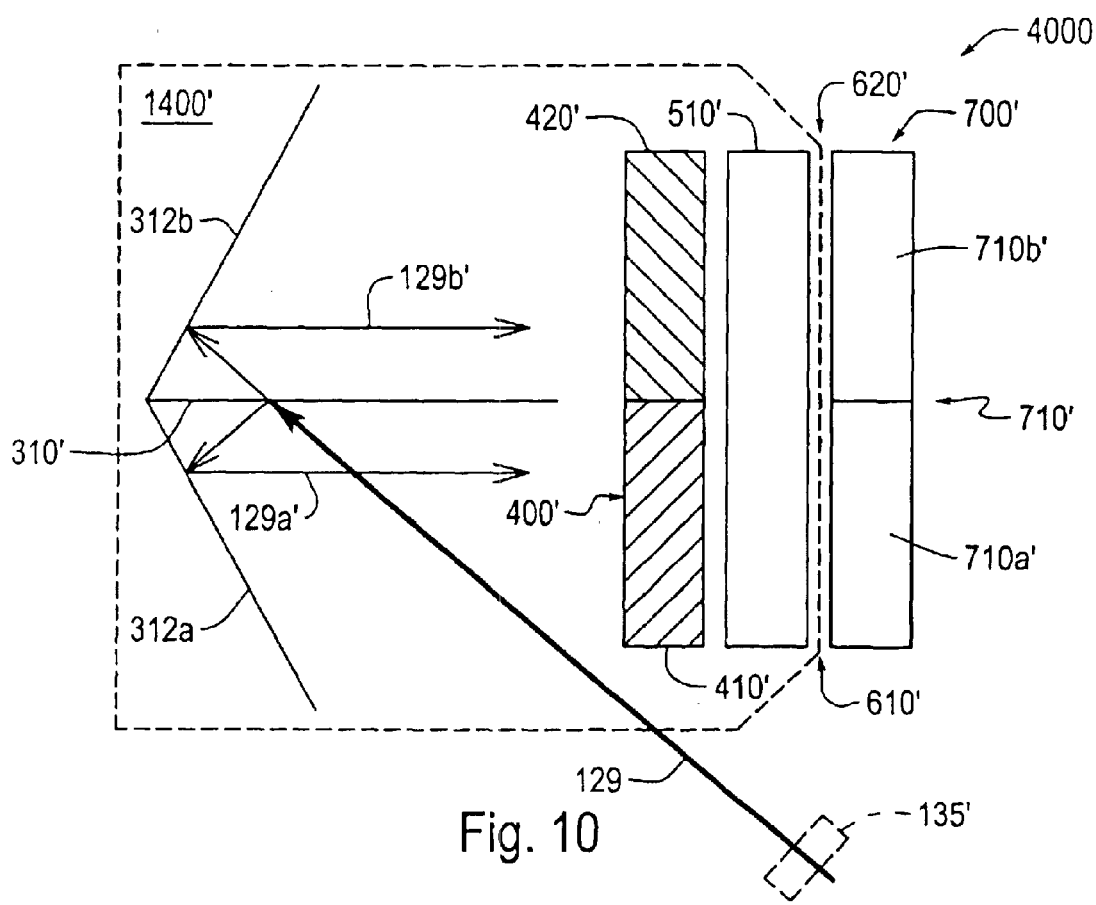
FIGS. 10 and 11 are plan views that illustrate a second exemplary phase-shift imaging element including a second exemplary embodiment of a multiple phase-shift generating structure incorporating two of the high-density phase-shifting array elements according to this invention.
Figure 11:
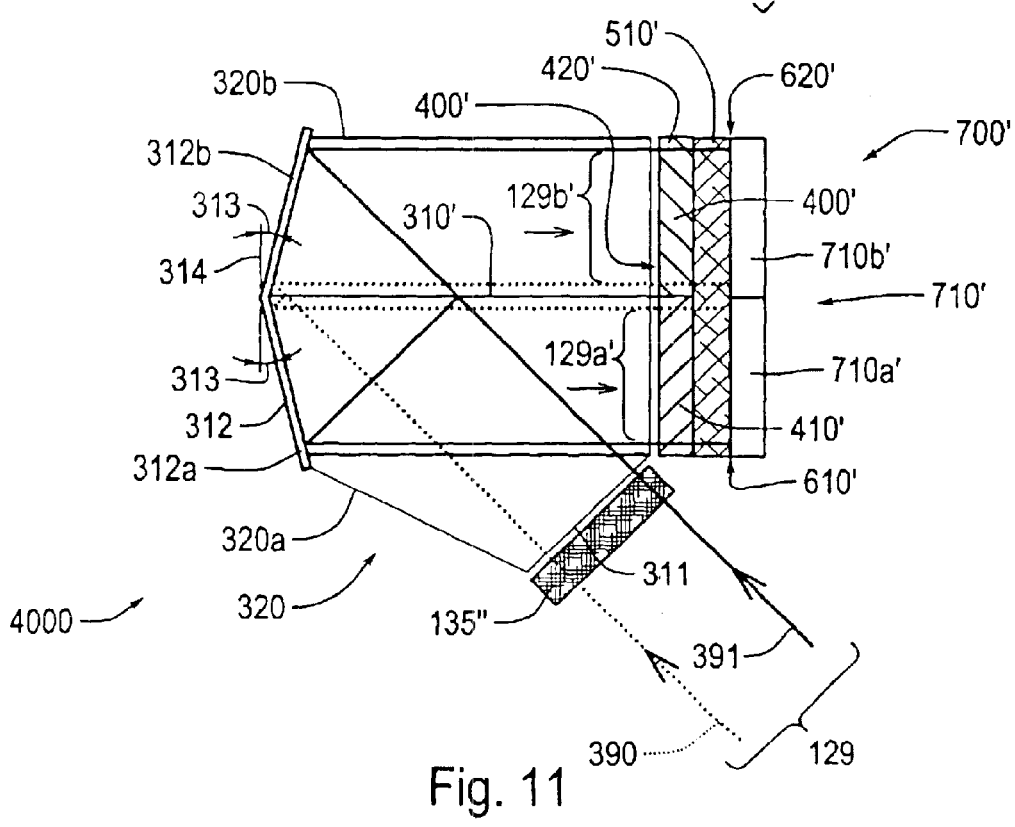

FIGS. 10 and 11 are plan views that illustrate a second exemplary phase-shift imaging element 4000 according to this invention. As schematically shown in FIG. 10, the phase-shift imaging element 4000 includes a second exemplary embodiment of a multiple phase-shift generating structure 1400' according to this invention and a detector subsystem 700', which includes the detector device 710' having the detector device portions 710a' and 710b'. The multiple phase-shift generating structure 1400' incorporates a high-density phase-shift array element 400' that includes first and second phase-shifting array sub-elements 410' and 420' according to this invention. The multiple phase-shift generating structure 1400' also includes a beam splitting surface 310', reflective surfaces 312a and 312b and a polarizer element 510'.

In the exemplary embodiment shown in FIG. 11, the beam splitting surface 310' and the reflective surfaces 312a and 312b of the phase-shift imaging element 4000 are provided by an optical block assembly 320, which includes a lower block half 320a and an upper block half 320b. The upper and lower block halves 320a and 320b are joined at the non-polarizing beam splitting surface 310', according to any known or later-developed beam splitter fabrication methods. The upper and lower block halves 320a and 320b also have end surfaces, or mirror mounting surfaces, fabricated to provide or mount the reflective surfaces 312a and 312b. The remaining components of the phase-shift imaging element 4000 are mounted to the opposite end of the optical block assembly 320, as shown.

The transmitted combined wavefront 129 passes through the optical block assembly 320, where the beam splitting surface 310' splits the combined wavefront 129 into the two respective combined sub-wavefronts or "copies" 129a' and 129b'. It should be appreciated that, due to the action of the beam splitting surface 310', the sub-wavefronts or "copies" 129a' and 129b' are mirror images of each other. However, with appropriate signal processing, this difference is inconsequential or, in various embodiment, even advantageous. The sub-wavefront 129a' is directed to the reflective surface 312a and reflected parallel to the beam splitting surface 310' along a first optical path on one side of the beam splitting surface 310'. In contrast, the sub-wavefront 129b' directed to the reflective surface 312b' and reflected parallel to the beam splitting surface 310' along a second optical path on the other side of the beam splitting surface 310'.

The dashed lines 390 and solid lines 391 illustrate first and second exemplary optical paths for different portions of the combined wavefront 129 as the combined wavefront 129 propagates through the phase-shift imaging element 4000. It should be appreciated that the components of the phase-shift imaging element 4000, as well as the orientation of the phase-shift imaging element 4000 relative to the angle of incidence of the input combined wavefront 129, are arranged such that the total optical path lengths of the exemplary optical paths represented by the lines 390 and 391 are substantially equal. The same is true for all optical paths of the various portions of the combined wavefront 129 as the combined wavefront 129 propagates through the phase-shift imaging element 4000.

In various exemplary embodiments, the optical block assembly 320 is arranged relative to the optical input portion 135' such that the combined wavefront 129 is received from a direction that is approximately normal to an input surface 311 of the optical block assembly 320. In various other exemplary embodiments, the input surface 311 intentionally deviates slightly from a normal orientation. This may be more advantageous than perfectly normal incidence when attempting to reduce spurious reflections and fringes. In either case, in various exemplary embodiments, the combined wavefront 129 propagates at a nominal angle of incidence of 45 degrees relative to the beam splitting surface 310'. In such embodiments, the end surfaces of the upper and lower block halves 320a and 320b are fabricated to provide each of the reflective surfaces 312a and 312b at an angle 313 of 22.5 degrees relative to a hypothetical plane 314 that is perpendicular to the beam splitting surface 310'.

As shown in FIGS. 10 and 11, the high-density phase-shift array element 400' includes the first and second phase-shifting array sub-elements 410' and 420'. In various exemplary embodiments, the first and second phase-shifting array sub-elements 410' and 420' are portions of a single high-density phase-shifting array element 400', as shown in FIGS. 10 and 11.

In such exemplary embodiments, the phase-shifting array sub-element 410' of the high-density phase-shift array element 400' is fabricated as outlined above with respect to either the first exemplary phase-shifting array element 410 or the third exemplary phase-shifting array elements 430 to form the first phase-shifting array sub-element 410' having the phase angle portions $P_0$ and $P_{180}$, or $P_{O(45)}$ and $P_{180(v)}$, respectively. Similarly, the phase-shifting array sub-element 410' of the high-density phase-shift array element 400' is fabricated as outlined above with respect to either the corresponding second exemplary phase-shifting array element 420, the fourth exemplary phase-shifting array element 440 or the fifth exemplary phase-shifting array element 450, to form the second phase-shifting array sub-clement 420' having the phase angle portions $P_{90}$ and $P_{270}$, $P_{90(45)}$ and $P_{270(v)}$, or $P_{90(v)}$ and $P_{270(h)}$, respectively.

In various other exemplary embodiments, the first and second phase-shifting array sub-elements 410' and 420' are separate members that are placed adjacent to each other, abutted against each other, or the like to form the high-density phase-shifting array element 400'. Alternatively, the separate first and second phase-shifting array sub-elements 410' and 420' can be joined together after fabrication using adhesive, fasteners, or the like to form a high-density phase-shifting array element 400' that acts as a single mechanical member. In such exemplary embodiments, the first and second phase-shifting array sub-elements 410' and 420' are formed as outlined above according to any of the first-fifth exemplary phase-shifting array elements 410-450 before being joined together to form the high-density phase-shifting array element 400' that acts as a single mechanical member.

Of course, it should further be appreciated that, in any of these exemplary embodiments, the second phase-shifting array sub-element 420' can include the phase angle portions $P_0$ and $P_{180}$, while the phase-shifting array sub-element 410' can include the phase angle portions $P_{90}$ and $P_{270}$. Likewise, it should be appreciated that, in any of these exemplary embodiments, the first phase-shifting array sub-element 410' and the second phase-shifting array sub-element 420' can include different combinations of the phase angle portions $P_0$, $P_{90}$, $P_{180}$ and $P_{270}$ than the combinations described above.

In various exemplary embodiments, the first phase-shifting array sub-element 410', a first portion of the polarizer element 510', and the detector device portion 710a are aligned to receive and process the sub-wavefront 129a' along the first optical path on one side of the beam splitting surface 310'. Along this first optical path, the multiple phase-shift generating structure 1400' generates multiple phase-shifted interference image information 610' at its interface with the detector device portion 710a'. Similarly, the second phase-shifting array sub-element 420', a second portion of the polarizer element 510', and the detector device portion 710b' are aligned to receive and process the sub-wavefront 129b' along the second optical path on the other side of the beam splitting surface 310'. Along this second optical path, the multiple phase-shift generating structure 1400' generates multiple phase-shifted interference image information 620' at its interface with the detector device portion 710b'.

It should be appreciated that, in various exemplary embodiments, the sub-wavefronts 129a' and 129b' are received and processed by similarly numbered elements in the same manner as described above for the sub-wavefronts 129a and 129b with respect to the phase-shift imaging element 3000 shown in FIGS. 7 and 8, in any of its various embodiments. In particular, the wavefronts 129a' and 129b' are received and processed by similarly numbered elements that are similarly constructed and oriented with respect to the polarization directions of the combined wavefronts 129a' and 129b'.

It should be further appreciated that the structure of the multiple phase-shifted interference image information 610' and 620' will, in various exemplary embodiments, be similar, or identical, to the structure of the multiple phase-shifted interference image information 610 and 620 described above with reference to the phase-shift imaging element 3000 shown in FIGS. 7 and 8, in any of its various embodiments. In various exemplary embodiments, when the detector device portions 710a' and 710b' are functionally identical to the detector devices 710a and 710b, the multiple phase-shifted interference image information 610' and 620' may be identical to the multiple phase-shifted interference image information 610' and 620'.

In any case, it should be appreciated that all of the previously-described features and benefits of the various embodiments of the multiple phase-shift generating structure 1400 and the phase-shift imaging element 3000 shown in FIGS. 7 and 8 are similarly provided for by various embodiments of the multiple phase-shift generating structure 1400' and the phase-shift imaging element 4000 shown in FIGS. 10 and 11. In addition, in various exemplary embodiments, the multiple phase-shift generating structure 1400' and the phase-shift imaging element 4000 enjoy an additional advantage, in that the high-density phase-shifting array element 400' is provided as a single relatively "planar" element. In addition, in various embodiments, the detector device portions 710a' and 710b' may be portions of a single detector device, which provides not only more convenient assembly and signal processing, but also provides inherently improved matching between the gain characteristics, and the like, of all comparable image pixels. As a result, in various exemplary embodiments, both costs and measurement errors are further reduced in the phase-shift imaging element 4000, in comparison to the phase-shift imaging element 3000.

However, it should be further appreciated that the various embodiments of both the phase-shift imaging element 3000 and the phase-shift imaging element 4000 provide for four separate "phase signals" arising from the four interference information portions $Q_0$–$Q_3$, which have different relative phase-shifts, similar to both the multiple phase shifted-image generating apparatus 200 shown in FIGS. 2–5, and to previous systems that use 4 separate detector elements, such as that disclosed in Smythe, R., et al, "Instantaneous Phase Measuring Interferometry", Optical Engineering 23:4 (1984) 3614. However, both of the phase-shift imaging elements 3000 and 4000 generally use simpler and/or fewer critical components, are easier to align and assemble, and/or are more stable and compact, while at the same time these elements eliminate at least some of the non-common mode errors found in prior art systems.

In various exemplary embodiments according to this of invention, the signal processing and software methods used are analogous to those described in the 330 patent. In particular, in various exemplary embodiments of an interferometer according to this invention, four separate "phase signals" are provided as described herein for each of one or more different wavelengths of the laser source 10. However, it should be appreciated that, in various exemplary embodiments according to this invention, the pixel-location coordinates processed in the equations disclosed in the 330 patent will be modified to correspond to the integrated pattern of the multiple phase-shifted interference image information 600 provided in the various exemplary embodiments according to this invention.

For example, Eq. 10 of the 330 patent indicates that, when the multiple phase-shifted interference image information 600 corresponds to that provided according to the description of FIGS. 2–5 herein, the phase at a particular (x,y) location may be calculated from comparable congruent pixels as:

$$\Phi(x,y)=\tan^{-1}\{[I_3(x,y)-I_1(x,y)]/[I_0(x,y)-I_2(x,y)]\} \quad (1)$$

where $I_0$, $I_1$, $I_2$ and $I_3$ are the respective intensities of each of the phase-shifted interferograms 600a–600d incident on the detector 240, i.e., the quadrants $Q_0$, $Q_1$, $Q_2$, and $Q_3$.

With regard to Eq. (1), in the related description set forth in the 330 patent, it should be understood that there are four congruent "sub-wavefront images" or interferograms in the multiple phase-shifted interference image information 600 corresponding to that provided according to the description of FIGS. 2–5 outlined above. As a result, comparable pixels in each image or interferogram are indicated to have "congruent pixel addresses" in the congruent images, regardless of whether these images are imaged onto different portions of a single detector array, or multiple detector arrays. Therefore, any related offsets of the actual signal processing addresses due to the actual offsets of comparable pixels on one or more detectors is assumed to be incorporated into the "congruent pixel addresses".

However, in the case of the multiple phase-shifted interference image information 600a' and 600b', or 600a" and 600b", provided by various embodiments of the phase-shift imaging elements 3000 or 4000, respectively, according to this invention, it should be appreciated that the multiple phase-shifted interference image information corresponding to the first sub-expression $[I_3(x,y)-I_1(x,y)]$ within Eq. (1), is interleaved in a single image 620 or 620' as the interference information portions $Q_3$ and $Q_1$ according to this invention. Thus, "congruent pixel addresses" are not appropriate for this first sub-expression within Eq. (1). Rather, for an embodiment according to this invention, where a single image of the multiple phase-shifted interference image information interleaves the interference portions $Q_3$ and $Q_1$, for any contiguous block of two interference portions $Q_3$ and $Q_1$ centered at a location (x,y), which are nominally identified as $Q_3(x,y)$ and $Q_1(x,y)$, one exemplary expression comparable to the first sub-expression above is:

$$[I_{Q3(x,y)}-I_{Q1(x,y)}],$$

where I indicates the image intensity value for each respective interference portion.

Similarly, in various exemplary embodiments according to this invention where a single image of the multiple phase-shifted interference image information interleaves the interference portions $Q_0$ and $Q_2$, for any contiguous block of two interference portions centered at a location (x,y), which are nominally identified as $Q_0$ and $Q_2$, one exemplary expression comparable to the second sub-expression $[I_0(x,y)-I_2(x,y)]$ within Eq. (1) above is:

$$[I_{Q0(x,y)}-I_{Q2(x,y)}].$$

It should be appreciated that, if each respective interference portion corresponds to a set of more than one pixel on the detector, then, in various exemplary embodiments, the image intensity value I indicates the average or representative intensity value for that entire set of pixels. The entire set of pixels can thus be regarded as a "meta-pixel". It should be appreciated that, in various exemplary embodiments, such meta-pixels have an extent corresponding to the extent of the first and second portions of a given high-density polarizer array 330 according to this invention, and such meta-pixels provide one desirable method of spatial averaging that is usable according to the principles of this invention.

It should also be appreciated that, in various exemplary embodiments, each individual interference portion may be a comparable interference portion involved in a measurement determination at at least four different (x,y) locations corresponding to the four borders of that comparable interference portion with its four comparable neighboring interference portions.

Thus, one total expression comparable to Eq. 10 in the 330 patent is:

$$\Phi(x,y)=\tan^{-1}\{[I_{Q3(x,y)}-I_{Q1(x,y)}]/[I_{Q0(x,y)}-I_{Q2(x,y)}]\}. \quad (2)$$

Alternatively, for any block of three contiguous interference portions along a row or column, that is, for interference portion patterns such as $Q_3$-$Q_1$-$Q_3$, $Q_1$-$Q_3$-$Q_1$, $Q_0$-$Q_2$-$Q_0$, or $Q_2$-$Q_0$-$Q_2$, centered at a location (x,y), the following exemplary alternative expression is also usable:

$$\Phi(x,y)=\tan^{-1}\{[I^{ave}_{Q3(x,y)}-I^{ave}_{Q1(x,y)}]/[I^{ave}_{Q0(x,y)}-I^{ave}_{Q2(x,y)}]\} \quad (3)$$

where $I^{ave}$ indicates the area-averaged image intensity value for each respective interference portion, regardless of whether there are one or two of the various respective interference portions in the three contiguous interference portions.

It should be appreciated that Eq. (3) averages the pixels on each side of an (x,y) center pixel, which nominally removes the minimal gradient or offset error present in Eq. (2). That is, a "comparable average" according to Eq. (3) has a nominal spatial location that, ideally, coincides with the (x,y) center pixel.

It should be appreciated that, with regard to the expressions in the above-outlined discussion, in various exemplary embodiments, the multiple phase-shifted interference image information 610 and 620 or the multiple phase-shifted interference image information 610' and 620', respectively, may be mirror images of each other, as preciously described. In such cases, it should be appreciated that the (x,y) location address scheme is similarly a mirror image in the multiple phase-shifted interference image information 610 and 620 or the multiple phase-shifted interference image information 610' and 620', respectively. Such a "mirror image" (x,y) location address scheme for the "congruent (x,y) location addresses" makes the mirror image structure of the underlying images inconsequential or even, in various embodiments according to this invention, advantageous.

Based on the foregoing examples and discussion, various modifications and other signal processing methods usable with these and other embodiments according to this invention will be apparent to one skilled in the art.

It should be appreciated that, in various embodiments according to this invention, the two wavelength or "two color interferometry" signal processing and measurement determining methods described in the 330 patent may be applied, when the two wavelengths are close enough together that the various components of the various embodiments described herein are operable with either wavelength. In such a case, one expression for determining a distance or range to an object, comparable to Eq. 14 in the 330 patent, is:

$$R(x,y) = \{[(\lambda_1\lambda_2)/4\pi(\lambda_1-\lambda_2)] \times [\Phi_{\lambda,1}(x,y) - \Phi_{\lambda,2}(x,y)]\}, \quad (4)$$

where:

$\lambda_1$ and $\lambda_2$ are the two wavelengths;

$\Phi_{\lambda,1}$ is the phase determination for the first wavelength, determined according to Eq. (2), Eq. (3), or the like; and $\Phi_{\lambda,2}$ is the phase determination for the second wavelength.

Figure 12:
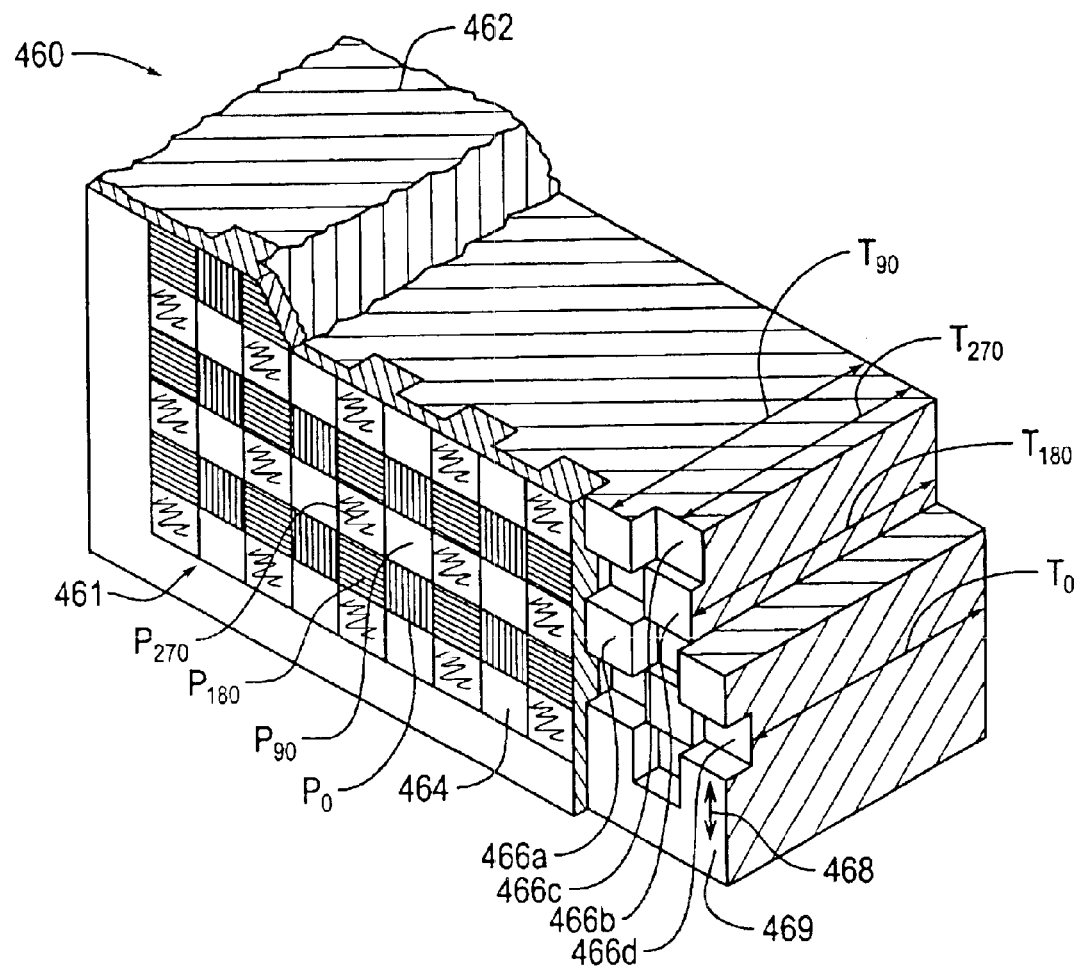
FIG. 12 illustrates a perspective and cross-sectional view of a portion of a sixth exemplary embodiment of a high-density phase-shifting array element according to this invention.
Figure 13B:
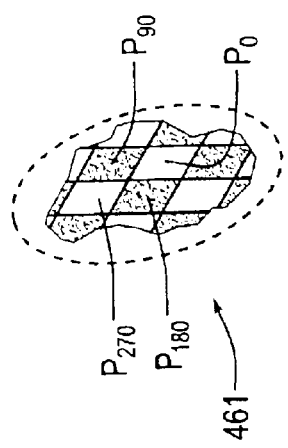
FIG. 13 is an exploded view illustrating a third exemplary embodiment of a phase shift imaging element including a third exemplary embodiment of the multiple phase-shift generating structure incorporating the sixth exemplary high-density phase-shifting array element shown in FIG. 12.
Figure 13A:
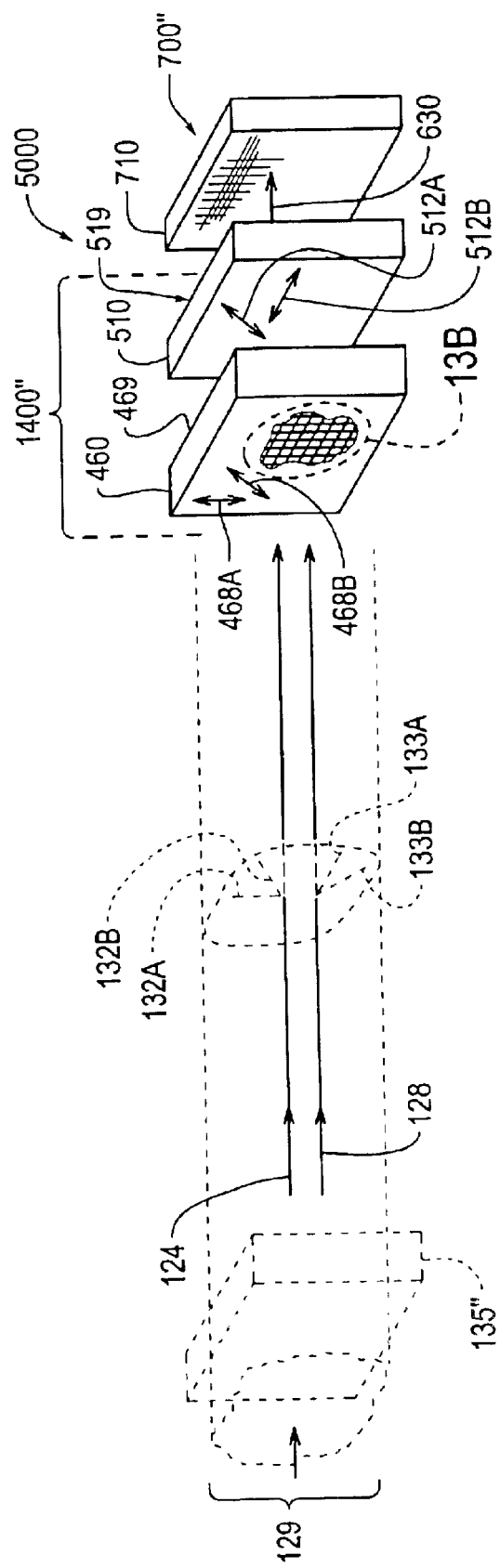

FIG. 12 illustrates a portion of a sixth exemplary embodiment of a high-density phase-shifting array element 460 according to this invention. The high-density phase-shifting array element 460 produces four different relative phase-shifts in its various portions and is usable in various exemplary embodiments of the multiple phase-shift generating structure 1400", as described below with respect to a third exemplary embodiment 5000 of the phase-shift imaging element according to this invention that is shown in FIG. 13.

For purposes of explanation, the high-density phase-shifting array element 460 may be functionally regarded as an interleaved combination of the high-density phase-shifting array elements 410 and 420 shown in FIG. 6. As shown in FIG. 12, in various exemplary embodiments, the sixth exemplary embodiment of the high-density phase-shifting array element 460 is formed using a birefringent substrate 462 such as a low order quartz wave plate. The birefringent substrate 462 has a surface 469 and a fast optical axis or fast axis 468. The nominal thickness $T_{90}$ of the birefringent substrate 462 is determined in the same manner as the nominal thickness $T_{90}$ of the birefringent substrate 422 of the high-density phase-shifting array element 420, to produce the same optical effect. That is, the substrate 462 is nominally a quarter wave plate. Each portion 466a of the high-density phase-shifting array element 460, corresponding to each portion $P_{90}$, has the nominal thickness $T_{90}$. As a result, the portions $P_{90}$ of the sixth exemplary embodiment of the high-density phase-shifting array element 460 produce a relative phase shift of 90 degrees between the components of the wavefront 129, as indicated by the subscript "90".

Similarly, the thickness $T_{270}$ of the recessed portions 466c of the birefringent substrate 462 is determined in the same manner as the thickness $T_{270}$ of the $P_{270}$ portions of the birefringent substrate 422 of the high-density phase-shifting array element 420, to produce the same optical effect. That is, each of the recessed portions 466c of the substrate 462 correspond to a nominal a three-quarter wave plate. Each portion 466c of the high-density phase-shifting array element 460, corresponding to each portion $P_{270}$, has the nominal thickness $T_{270}$. As a result, the portions $P_{270}$ of the sixth exemplary embodiment of the high-density phase-shifting array element 460 produce a relative phase shift of 270 degrees between the components of the wavefront 129, as indicated by the subscript "270".

The thickness $T_{180}$ of the recessed portions 466b of the birefringent substrate 462 is determined in a manner similar to the thickness $T_{180}$ of the $P_{180}$ birefringent substrate 412 of the high-density phase-shifting array element 420, to produce the same optical effect. That is, each of the recessed portions 466b of the substrate 462 correspond to a nominal half-wave plate. Each portion 466b of the high-density phase-shifting array element 460, corresponding to each portion $P_{180}$, has the nominal thickness $T_{180}$. As a result, the portions $P_{180}$ of the sixth exemplary embodiment of the high-density phase-shifting array element 460 produce a relative phase shift of 180 degrees between the components of the wavefront 129, as indicated by the subscript "180".

The thickness $T_0$ of the recessed portions 466d of the birefringent substrate 462 is determined in a manner similar to the thickness $T_0$ of the birefringent substrate 412 of the high-density phase-shifting array element 420, to produce the same optical effect. That is, each of the recessed portions 466d of the substrate 462 correspond to a nominal full-wave plate. Each portion 466d of the high-density phase-shifting array element 460, corresponding to each portion $P_0$, has the nominal thickness $T_0$. As a result, the portions $P_0$ of the sixth exemplary embodiment of the high-density phase-shifting array element 460 produce a relative phase shift of zero degrees between the components of the wavefront 129, as indicated by the subscript As shown in FIG. 12, each portion 466a of the high-density phase-shifting array element 460, corresponding to each portion $P_{90}$, is a portion of the surface 469 of the substrate 462. Each of the portions 466b–466d, corresponding to the portions $P_{180}$, $P_{270}$ and $P_0$, respectively, are recesses formed in the substrate 462 with three distinct depths, respectively, that produce and/or correspond to the thicknesses $T_{180}$, $T_{270}$ and $T_0$, as previously described. Thus, the sixth exemplary embodiment of the high-density phase-shifting array element 460 includes an array of surface portions and recesses that are formed into a surface 469 of the substrate 462 corresponding to a pattern 461, that therefore also corresponds to the pattern of the phase-shift portions $P_0$–$P_{270}$.

In various exemplary embodiments, the recesses are formed by etching, as previously described with reference to the of the high-density phase-shifting array elements 410 and 420 shown in FIG. 6. More generally, the high-density phase-shifting array clement 460 may be formed by any known or later-developed method of fabrication. In particular, the only manufacturing requirement is that the various phase-shift portions $P_0$, $P_{90}$, $P_{180}$ and $P_{270}$ can be fabricated in relatively high-density arrays. Specifically, the dimensions of the various phase-shift portions $P_0$, $P_{90}$, $P_{180}$ and $P_{270}$ must be able to approach the dimensions of one pixel, or a small group of pixels, of an optical detector array, as described further below.

As shown in FIG. 12, the recesses used to form the portions 466b–466d and the remaining areas of the surface 469 used to form the portion 466a are rectangular. However, more generally, it should be appreciated that, in various exemplary embodiments, the shape of recesses and remaining portions of the surface 469 can be any usable shape that corresponds to the shape of a pixel, or a group of pixels, of a detector array of the detector subsystem 700 and the associated signal processing that is used in a phase-shift array imaging element 3000, 4000 or the like according to this invention.

It should be appreciated that the various portions 466a–466d of the high-density phase-shifting array element 460 have thicknesses that vary by a step corresponding to the thickness of a quarter-wave plate in substrate 462. Thus, it should be appreciated that in various other exemplary embodiments, the relative nominal etch depths or planes of the array of surface portions and recessed portions corresponding to the phase-shift portions $P_0$–$P_{270}$ may be fabricated in various permutations equivalent to increasing or reducing all of thicknesses of the various portions 466a–466d by one or more steps corresponding to the thickness of a quarter-wave plate in substrate 462. Based on the discussions above and below, other alternative variations and suitable patterns will be apparent to one skilled in the art.

As shown in FIG. 12, in various exemplary embodiments, the surface 469 is covered with a planarizing layer 464 that fills in the recesses in the surface 469 formed by etching the portions 466b–466d. If the planarizing layer 464 is provided, it can be formed of a material that does not apply any thickness-dependent phase shift to the wavefront 129 that is incident on the substrate 462 and can have an index of refraction that matches the nominal index of refraction of the birefringent substrate 462 so that the optical path lengths of the various optical paths through the high-density phase-shifting array element 460 tend to be made more similar, or ideally, equal. However, it should be appreciated that, in various exemplary embodiments, the planarizing layer 464 can be omitted.

As shown in FIG. 12, the sixth exemplary embodiment of the high-density phase-shifting array element 460 includes a repeating arrangement of four adjacent phase-shift portions $P_0$–$P_{270}$ distributed over the surface 469 in the pattern 461. In particular, as shown in FIG. 12, the pattern 461 creates a repeating interleaved placement of the first-fourth phase-shift portions $P_0$–$P_{270}$. In various exemplary embodiments, when the sixth exemplary embodiment of the high-density phase-shifting array element 460 is incorporated into various exemplary embodiments of the multiple phase-shift generating structure 1400", as described below with respect to a third exemplary embodiment 5000 of the phase-shift imaging element according to this invention that is shown in FIG. 13, the interleaved pattern of the first-fourth phase-shift portions $P_0$–$P_{270}$ extends to cover substantially the entire surface area of the detector device 710 used to implement the detector subsystem 700.

It should also be appreciated that, as shown in FIG. 6, the replication directions of each of the four phase-shift portions $P_0$–$P_{270}$ are arranged horizontally and vertically. However, more generally, the replication directions of each of the four phase-shift portions $P_0$–$P_{270}$ is completely controllable and selectable in various operable patterns of the four phase-shift portions $P_0$–$P_{270}$ and with the signal processing for the multiple phase-shift generating structure according to this invention. In various exemplary embodiments, each the various phase-shift portions $P_0$, $P_{90}$, $P_{180}$ and $P_{270}$ will be of equal size and shape and will cover equal portions of a detector array of the detector subsystem 700.

In various exemplary embodiments, each of the various phase-shift portions $P_0$, $P_{90}$, $P_{180}$ and $P_{270}$ will extend over an integer number of pixels of the detector array of the detector subsystem 700. In various exemplary embodiments, the boundaries of the various phase-shift portions $P_0$, $P_{90}$, $P_{180}$ and $P_{270}$ will be aligned with the boundaries between the pixels of the detector array. Thus, in such exemplary embodiments, each set of the various phase-shift portions $P_0$–$P_{270}$, define unit cells within the sixth exemplary embodiment of the high-density phase-shifting array elements 46 and the corresponding detector arrays. At one extreme, each of the respective various phase-shift portions $P_0$, $P_{90}$, $P_{180}$ and $P_{270}$ can be associated with and aligned with a respective single pixel of the corresponding detector array.

As shown in FIG. 12, it should be appreciated that the fast axis 468 of the birefringent substrate 462 lies in a plane that is normal to the surface 469. In various exemplary embodiments, the fast axis 468 is parallel to the vertical edges of the phase shift portions $P_0$–$P_{270}$. However, it should be appreciated that, in various other exemplary embodiments, the fast axis 468 could lie parallel to the horizontal edges of the various phase shift portions, or at 45 degrees relative to these edges, or in any other operable orientation, depending on the relative orientations of the polarized components of the combined wavefront 129 and other related design factors. It should also be appreciated that, in this sixth exemplary embodiment of the high-density phase-shifting array element 460, the fast axis 468 is fixed and constant throughout the entire substrates 462 and the phase shift portions are obtained by controllably varying the fabricated thicknesses within the substrates 462.

As previously described, in various exemplary embodiments, the various portions 466a–466d of the high-density phase-shifting array element 460 have thicknesses that vary by a step corresponding to the thickness of a quarter-wave plate in substrate 462. For example, in various exemplary embodiments that use a typical commercially-available quartz wave-plate material as the substrate 462, a thickness step of 17.5 microns is suitable for a laser source that emits a laser wavefront having a wavelength of 633 nm.

It should be appreciated that, in general, the relative phase-shift between the phase $\Phi_{fast}$ of a light component polarized along a fast axis of a birefringent material and the phase $\Phi_{slow}$ a light component polarized along a slow axis of a birefringent material is:

$$\Phi_{slow}\Phi_{fast} = (2\pi t/\lambda)(n_{slow} - n_{fast}) = 2\pi t \beta/\lambda \qquad (5)$$

where $\Phi_{fast} - \Phi_{slow}$ is the relative phase-shift;

t is the thickness of the birefringent material;

$\lambda$ is the wavelength of the light components;

$n_{slow}$ is the index of refraction of the birefringent material along the slow axis;

$n_{fast}$ is the index of refraction of the birefringent material along the fast axis; and $\beta$ is the birefringence of the material, that is, the difference between the indices of refraction of the birefringent material along the fast and slow axes.

Thus, the various thicknesses and/or thickness step dimensions usable in various exemplary embodiments according to this invention that use various birefringent substrates and/or birefringent material layers can be determined according to Eq. (6), which describes the thickness of a birefringent material that is required to change the phase of a light component polarized along a slow axis of a birefringent material relative to the phase of a light component polarized along a fast axis of a birefringent material by a fraction 1/x of the wavelength of the light components $\lambda$:

$$t_{1/x-wave} = (k + 1/x)\frac{\lambda}{\beta}, \qquad (6)$$

where k is an integer greater than or equal to zero, corresponding to a number of full waves phase-shifts included in the thickness t.

Thus, in various exemplary embodiments described herein, for a given wavelength of the light components λ and a given birefringence β:

$T_0$ and/or $T'_0$ corresponds to a thickness $(k+\frac{1}{4})\lambda/\beta$, $T_{90}$ and/or $T'_{90}$ corresponds to a thickness $(k+\frac{1}{4})\lambda/\beta$, $T_{180}$ and/or $T'_{180}$ corresponds to a thickness $(k+\frac{1}{2})\lambda/\beta$, and $T_{270}$ and/or $T_{270}$ corresponds to a thickness $(k+\frac{3}{4})\lambda/\beta$.

In various exemplary embodiments, a thickness step or etch step should be minimized in order to maintain as low of an aspect ratio as possible. Thus, in various exemplary embodiments, k is set to zero and a material having a relatively high birefringence is chosen. For example, in comparison to quartz, which has a birefringence of 0.009 and thus gives a minimum quarter-wave step dimension of 17.5 um at 633 run, in various exemplary embodiments, the birefringent material calcite, which has a birefringence of 0.172, gives a minimum quarter-wave step dimension of 0.92 microns. In various exemplary embodiments, one of the previously discussed reactive mesogen materials, which has a birefringence of 0.16, gives a minimum quarter-wave step dimension of 1.075 microns.

It should be appreciated that, in various exemplary embodiments where the ideal thicknesses of the various portions of the high-density phase-shifting array element according to this invention are not attained during fabrication, or the phase shifts resulting from various portions are otherwise not ideal, that any phase-shift imaging element according to this invention can be calibrated and/or compensated for by subsequent calibration procedures and signal processing. Such calibration procedures and signal processing can be performed using various phase correction factors or other techniques to compensate for various phase errors and/or variations across the retardation array, and, in various exemplary embodiments, at levels of resolution as fine as the pixel level.

FIG. 13 is an exploded view illustrating a third exemplary embodiment of a phase-shift imaging element 5000 according to this invention. As shown in FIG. 11, the phase-shift imaging element 5000 includes including a third exemplary embodiment of a multiple phase-shift generating structure 1400" according to this invention and a detector subsystem 700". In various exemplary embodiments, a single detector 710 of any suitable known or later-developed type is used to implement the detector subsystem 700". The multiple phase-shift generating structure 1400" incorporates any exemplary embodiment of the sixth exemplary high-density phase-shifting array element 460 according to this invention, combined with a polarizer element 510. In contrast to any of the previously described embodiments, no beam splitter is required in the phase-shift imaging element 5000.

As shown in FIG. 13, the combined wavefront 129 is transmitted by the optical input portion 135". The transmitted combined wavefront 129 includes the reference wavefront 124 and the object wavefront 128. The transmitted combined wavefront 129 propagates as a single wavefront that fills the high-density phase-shifting array element 460.

It should be appreciated, from the foregoing discussions of the structure and operation of the high-density phase-shifting array element 460, that the transmitted combined wavefront 129 that propagates from the high-density phase-shifting array element 460 includes a pattern of four different interleaved phase-shifted portions having different relative phase-shifts corresponding to the pattern 461 of the first-fourth phase-shift portions $P_0$–$P_{270}$ that are present in the high-density phase-shifting array element 460.

The transmitted combined wavefront 129 passing out of the high-density phase-shifting array element 460, including the interleaved phase-shift pattern, is directed onto the polarizer element 510. The polarizer element 510 is oriented to transmit the in-phase components of the orthogonally polarized sub-wavefront components 124 and 128 of the combined sub-wavefront 129. As a result, the multiple phase-shifted interference image information 630 includes an interleaved pattern of first "0 degree relative phase-shift" or $Q_0$ interference portions corresponding to the portions $P_0$, second "90 degree relative phase-shift" or $Q_1$ interference portions corresponding to the portions $P_{90}$, third "180 degree relative phase-shift" or $Q_2$ interference portions corresponding to the portions $P_{180}$, and fourth "270 degree relative phase-shift" or $Q_3$ interference portions corresponding to the portions $P_{270}$, interleaved at a high spatial frequency corresponding to the interleaved pattern 461 of the portions $P_0$–$P_{270}$.

The 2-dimensionally interleaved pattern of $Q_0$–$Q_3$ interference portions in the multiple phase-shifted interference image information 630 that passes out of the polarizer array element 510 are received as a single image that extends substantially over the entire surface area of the detector device 710 that is used to implement the detector subsystem 700". It should be appreciated that the 2-dimensionally interleaved pattern of first, second, third and fourth relative-phase interference portions in the multiple phase-shifted interference image information 600" corresponds to a high-density interleaving of the $Q_0$–$Q_3$ quadrants, 232–238, shown in FIG. 4, transmitted as a single image onto the surface of the detector device 710.

In various exemplary embodiments, the patterned surface 469 of the high-density phase-shifting array element 460 is oriented towards the polarizer element 510 and the detector 710. More generally, in various exemplary embodiments, the respective fabrication, orientation and assembly of the high-density phase-shifting array element 460, the polarizer element 510 and the detector 710 can be similar to any of the various embodiments previously described for the respective fabrication, orientation and assembly of the corresponding elements of the phase-shift imaging elements 3000 and 4000, described with reference to FIGS. 7, 8, 10 and 11. In various exemplary embodiments, regardless of their respective fabrication methods, the polarizer element 510, the high-density phase-shifting array element 460 and the detector 710 are effectively bonded or joined together to form the phase-shift imaging element 5000 shown in FIG. 13 as a monolithic phase-shift imaging element.

It should be appreciated that, in various exemplary embodiments according to this invention, it is advantageous to fabricate the polarizer element 510, the high-density phase-shifting array element 460 and the detector 710 such that each portion of the effective optical path length of the combined wavefronts 129 are as similar as possible, and ideally, equal. It should be appreciated that, in various exemplary embodiments, a distance d (not shown) between the patterned surface 469 of the high-density phase-shifting array element 460 and a detector surface of the detector 710 should be less than the maximum depth of focus of the image that is presented at the detector 710. In various exemplary embodiments, the distanced is approximately 1-2 mm or less. In various other exemplary embodiments, the distance d is less than 0.2 mm.

The polarization direction 512 of the polarizer array element 510 is aligned relative to the polarization directions 132 and 133 of the reference wavefront 124 and the object wavefront 128 in a similar way to that previously described for the polarizer array elements 510a and 510b shown in FIG. 8. In a first exemplary embodiment of the phase-shift imaging element 5000, the reference wavefront 124 and the object wavefront 128 are polarized along the orthogonal directions 132A and 133A as shown in FIG. 13. In this first exemplary embodiment, the polarizer array element 510 has the polarization direction 512A as indicated on the polarizer array element 510.

In a second exemplary embodiment of the phase-shift imaging element 5000, the reference wavefront 124 and the object wavefront 128 are polarized along the orthogonal directions 132B and 133B as shown in FIG. 13. In this second exemplary embodiment, the polarizer array element 510 has the polarization direction 512B as indicated on the polarizer array element 510. As a result, in either case, the polarizer element 510 transmits and interferes the in-phase components of the orthogonally polarized components 124 and 128 of the wavefront 129 in the interleaved phase-shift pattern passing out of the high-density phase-shifting array element 460 to produce the multiple phase-shifted interference image information 630.

However, it should be appreciated that, in various other exemplary embodiments, the polarizer array element 510 can be oriented to transmit and interfere the out-of-phase components of the orthogonally polarized components 124 and 128 of the wavefront 129. Nevertheless, the resulting multiple phase-shifted interference image information will still contain four different useable interference portions similar to the 2-dimensionally interleaved pattern of $Q_0$–$Q_3$ interference portions in the multiple phase-shifted interference image information 630.

It should be appreciated that, in various exemplary embodiments, when two laser wavelengths are used to create and absolute interferometer, the wavelengths may be sufficiently similar so that one high-density phase-shifting array element 460 is suitable for both wavelengths.

It should be appreciated that various exemplary embodiments of the multiple phase shift generating structure 1400" and the exemplary phase shift imaging element 5000 provide four different phases of relative phase-shift interference information arising from a single image that is derived from a single undivided wavefront. Thus, it should be appreciated that all of the previously described features and benefits of the various embodiments of the multiple phase-shift generating structure 1400 and the phase-shift imaging element 3000 shown in FIGS. 7 and 8, and the multiple phase-shift generating structure 1400' and the phase-shift imaging element 4000 shown in FIGS. 10 and 11, are similarly provided by various embodiments of the multiple phase-shift generating structure 1400" and the phase-shift imaging element 5000 shown in FIG. 13.

In addition, in various exemplary embodiments, the multiple phase-shift generating structure 1400" and the phase-shift imaging element 5000 shown in FIG. 13 enjoy an additional advantage in that the high-density phase-shifting array element 460 is provided as a single element. Furthermore, because the high-density phase-shifting array element 460 allows more than two different "types" of interference portions to be provided along a single optical path, that is, within a single image on the detector 710, no beam splitting element is required. This results not only in fewer optical element aberrations and more convenient assembly and/or signal processing, but also in improved matching between the gain characteristics and the like, of all comparable image pixels. This occurs because all comparable pixels are located in the same small region of the detector.

Furthermore, all comparable pixels are located in the same small region of the detector. Accordingly, the optical path lengths from a particular portion of the object to each of the particular corresponding $Q_0$–$Q_3$ interference portions in a particular local portion of the multiple phase-shifted interference image information 630 are inherently similar. Thus, the related relative phase-shift information and the related measurement determination will generally be insensitive to reasonably expected rotational and/or translational motions of the exemplary phase shift imaging element 5000. As a result, in various exemplary embodiments, both costs and measurement errors are further reduced in the phase-shift imaging element, in comparison to the phase-shift imaging elements 3000 and 4000.

Figure 14:
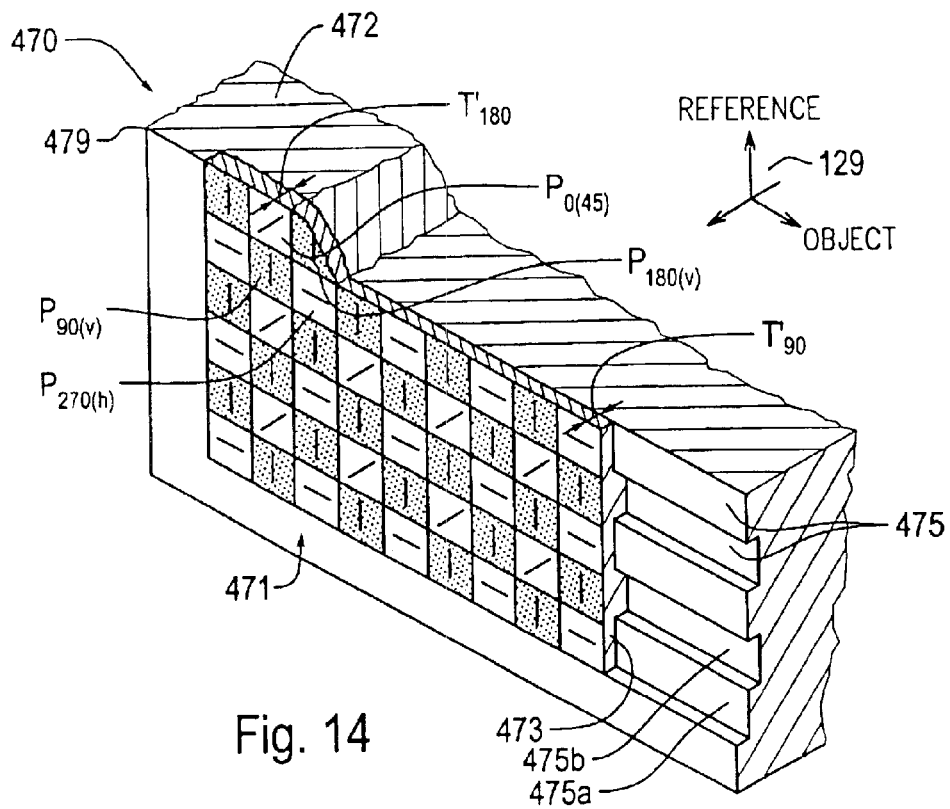
FIG. 14 illustrates a perspective and cross-sectional view of a portion of a seventh exemplary embodiment of a high-density phase-shifting array element according to this invention.

FIG. 14 illustrates a portion of a seventh exemplary embodiment of a high-density phase-shift array element 470 according to this invention. The high-density phase-shifting array element 470 is usable in various exemplary embodiments of the multiple phase-shift generating structure 1400", as described above with respect to the third exemplary embodiment of the phase-shift imaging element 5000. As shown in FIG. 14, the seventh exemplary high-density phase-shift array element 470 includes a null-phase-shift substrate 472. It should be appreciated that the null phase-shift substrate 472 can be formed using an amorphous or other non-birefringent material. In such exemplary embodiments, the thickness of the substrate 472 can be any desired value. That is possible because such substrates 472 do not apply any thickness-dependent phase shift to light incident upon the substrate 472. The substrate 472 includes recessed portions 475. In particular, first portions 475a underlie phase-shift portions $P_{90(v)}$ and $P_{270(h)}$, while second portions 475b underlie phase-shift portions $P_{0(45)}$ and $P_{180(v)}$, as described in detail below.

For purposes of explanation, the high-density phase-shifting array element 470 may be functionally regarded as an interleaved combination of the high-density phase-shifting array elements 430 and 450 shown in FIG. 9. The high-density phase-shifting array element 470 includes a birefringent material layer 473 including a surface 479. Similarly to the high-density phase-shifting array elements 430 and 450, the birefringent material layer 473 is formed of a birefringent material that can have its fast axis direction selectively patterned, as previously described.

As shown in FIG. 14, the birefringent material layer 473 of the seventh exemplary embodiment of the high-density phase-shifting array element 470 has a nominal thickness $T'_{90}$ overlying and/or determined by the first portions 475a. The nominal thickness $T'_{90}$ of the birefringent material layer 473 is determined in the same manner as the nominal thickness $T'_{90}$ of the birefringent material layer 453 of the high-density phase-shifting array element 450, to produce the same optical effect. As shown in FIG. 14, the birefringent material layer 473 includes 90-degree phase shift portions $P_{90(v)}$ and 270 degree phase shift portions $P_{270(h)}$ arranged in an alternating pattern along the rows coinciding with the first portions 475a. Each portion $P_{90(v)}$ and each portion $P_{270(h)}$ of the birefringent material layer 473 has the nominal thickness $T'_{90}$.

In various exemplary embodiments, each portion $P_{90(v)}$ is fabricated such that the fast axis of the birefringent material layer 473 in that portion is oriented vertically. That is, the fast axis in each portion $P_{90\ (v)}$ is oriented parallel to the expected operational orientation of a vertically-oriented one of the orthogonal components of a combined wavefront 129. In contrast, each portion $P_{270(h)}$ is fabricated such that the fast axis of the birefringent material layer 473 in that portion is oriented horizontally. That is, the fast axis in each portion $P_{270(h)}$ is oriented parallel to the expected operational orientation of a horizontally-oriented one of the orthogonal components of a combined wavefront 129. This is indicated by the exemplary REFERENCE and OBJECT orthogonal components and the typical alignment lines shown in various portions $P_{90(v)}$ and $P_{270(h)}$ in the exemplary embodiment shown in FIG. 14. It should be appreciated that, with these relative orientations, the portions $P_{90(v)}$ and $P_{270(h)}$ function identically to the similarly numbered portions of the high-density phase-shifting array element 450, to produce the same optical effect.

In an analogous manner, as shown in FIG. 14, the birefringent material layer 473 of the seventh exemplary embodiment of the high-density phase-shifting array element 470 has a nominal thickness $T'_{180}$ overlying and/or determined by the second portions 475b. The nominal thickness $T'_{180}$ of the birefringent material layer 473 is determined in the same manner as the nominal thickness $T'_{180}$ of the birefringent material layer 433 of the high-density phase-shifting array element 430, to produce the same optical effect. As shown in FIG. 14, the birefringent material layer 473 includes 180-degree phase shift portions $P_{180(v)}$ and zero degree phase shift portions $P_{0(45)}$ arranged in an alternating pattern along the rows coinciding with the second portions 475b. Each portion $P_{180(v)}$ and each portion $P_{0(45)}$ of the birefringent material layer 473 has the nominal thickness $T'_{180}$.

In various exemplary embodiments, each portion $P_{180(v)}$ is fabricated such that the fast axis of the birefringent material layer 473 in that portion is oriented vertically. That is, the fast axis in each portion $P_{180(v)}$ is oriented parallel to the expected operational orientation of a vertically-oriented one of the orthogonal components of a combined wavefront 129. In contrast, each portion $P_{0(45)}$ is fabricated such that the fast axis of the birefringent material layer 473 in that portion is oriented at 45 degrees. That is, the fast axis in each portion $P_{0(45)}$ is oriented midway between the expected operational orientation of the orthogonal components of a combined wavefront 129. This is indicated by the exemplary REFERENCE and OBJECT orthogonal components and the typical alignment lines shown in various portions $P_{180(v)}$ and $P_{0(45)}$ the exemplary embodiment shown in FIG. 14. It should be appreciated that, with these relative orientations, the portions $P_{180(v)}$ and $P_{0(45)}$ function identically to the similarly numbered portions of the high-density phase-shifting array element 430, to produce to produce the same optical effect.

It should be appreciated from the above-outlined description, that the portions $P_{0(45)}$, $P_{90(v)}$, $P_{180(v)}$ and $P_{270(h)}$ of the seventh exemplary embodiment of the high-density phase-shifting array element 470 are functionally equivalent to the portions $P_0$, $P_{90}$, $P_{180}$ and $P_{270}$ of the sixth exemplary embodiment of the high-density phase-shifting array element 460, with respect to their net optical effects in multiple phase-shifted interference image information. Thus, in various exemplary embodiments of the phase-shift imaging element 5000 according to this invention, the high-density phase-shifting array elements 470 and 460 are nominally interchangeable. Accordingly, the high-density phase-shifting array elements 470 and 460 may be employed according to similar design considerations, similarly dimensioned, and similarly assembled in the phase-shift imaging element 5000 to produce similar or identical interleaved phase-shifted image information, for example, as described with reference to FIG. 13 above.

As shown in FIG. 14, in various exemplary embodiments, fabricating the interleaved thicknesses $T'_{180}$, $T'_{90}$ is facilitated by preliminarily fabricating the first and second recessed portions 475a and 475b formed in the substrate 472 with two distinct depths that produce and/or correspond to the thicknesses $T'_{180}$ and $T'_{90}$, respectively. The two distinct depths of the first and second recessed portions 475a and 475b may be formed in the substrate 472 by known etching or micro-embossing techniques, or any other appropriate known or later-developed technique. In various exemplary embodiments, the surfaces of the first and second recessed portions 475a and 475b receive various alignment treatments as described in above and in the incorporated references, if needed, and are filled with the birefringent material layer 473 of a birefringent material.

Any of the polymerizable birefringent materials described previously that can receive a fast axis aligning and patterning process, and that are compatible with the various fast axis alignment treatments used in a particular embodiment, can be used to form the layer 473. In particular, in the embodiment shown in FIG. 14, in various portions, the material that forms the layer 473 provides a retardation effect that depends on the thickness of the layer 473 in that portion, and a fast axis direction that can be controllably varied and determined for that portion based on the conditions that the various portions of the layer 473 experience as those portions of the layer 473 are polymerized, as previously described. In various exemplary embodiments, the surface 479 of the birefringent material layer 473 is made coplanar with a peripheral surface of the substrate 472.

Figure 15:
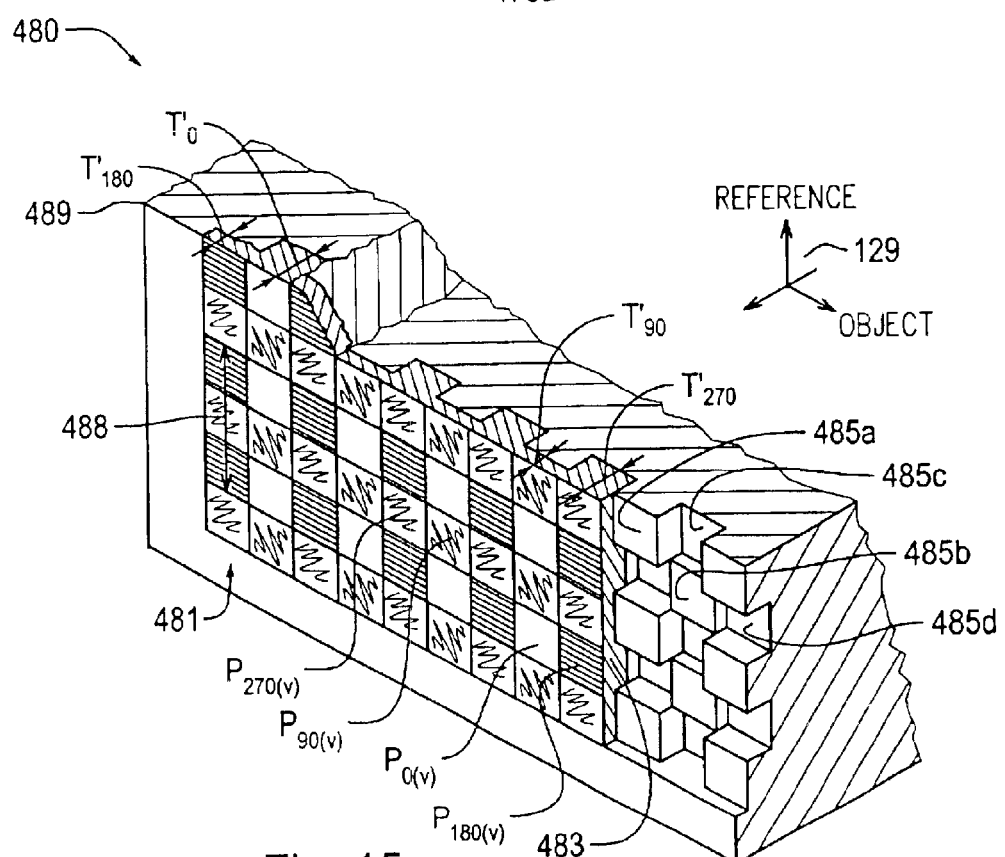
FIG. 15 illustrates a perspective and cross-sectional view of a portion of an eighth exemplary embodiment of a high-density phase-shifting array element according to this invention.

FIG. 15 illustrates a portion of an eighth exemplary embodiment of a high-density phase-shift array element 480 according to this invention. The high-density phase-shifting array element 480 is usable in various exemplary embodiments of the multiple phase-shift generating structure 1400'', as described above with respect to the third exemplary embodiment of the phase-shift imaging element 5000. As shown in FIG. 15, the eighth exemplary high-density phase-shift array element 480 includes a null-phase-shift substrate 482. It should be appreciated that the null phase-shift substrate 482 can be formed using an amorphous or other non-birefringent material. In such exemplary embodiments, the thickness of the substrate 482 can be any desired value. That is possible because such substrates 482 do not apply any thickness-dependent phase shift to light incident upon the substrate 482. The substrate 482 includes portions 485. Recessed first portions 485a underlie phase-shift portions $P_{90(v)}$, recessed second portions 485b underlie phase-shift portions $P_{180(v)}$, recessed third portions 485c underlie phase-shift portions $P_{270}(v)$ and recessed fourth portions 485d underlie phase-shift portions $P_{0(v)}$, as described in detail below.

For purposes of explanation, the high-density phase-shifting array element 480 may be regarded as operating similarly to the high-density phase-shifting array elements 460 shown in FIG. 12, in that the fast axis direction 488 is everywhere the same in the high-density phase-shifting array element 480. However, in contrast to the high-density phase-shifting array elements 460 shown in FIG. 12, in the high-density phase-shifting array element 480 the substrate material is non-birefringent, such that the substrate provides no relative phase shift. Rather, in the high-density phase-shifting array element 480, it is the fill material in a birefringent material layer 483 that is birefringent and produces the relative phase-shift portions $P_{0(v)}$–$P_{270(v)}$ shown in FIG. 15. Thus, in terms of fabrication and materials, the high-density phase-shifting array element 480 may be fabricated similarly to the high-density phase-shifting array element 470, as described above. However, in this eighth exemplary embodiment, the fast axis alignment direction is everywhere the same.

The high-density phase-shifting array element 480 includes a birefringent material layer 483 including a surface 489. The birefringent material layer 483 can be formed of any of the birefringent materials previously discussed with reference to the birefringent material layer 473 shown in FIG. 14. In particular, the material that forms the layer 483 provides an amount of retardation that depends on the thickness of the layer 483. As indicated above, the direction along which the fast axis of the birefringent material lies can be set in based on the alignment conditions present as the layer 483 is polymerized.

As shown in FIG. 15, the birefringent material layer 483 of the eighth exemplary embodiment of the high-density phase-shifting array element 480 has phase-shift portions $P_{90(v)}$ corresponding to a nominal thickness $T'_{90}$ overlying and/or determined by the recessed first portions 485a. The nominal thickness $T'_{90}$ of the birefringent material layer 483 is determined in the same manner as the nominal thickness $T'_{90}$ of the birefringent material layer 473 of the high-density phase-shifting array element 470, to produce the same retardation effect. Similarly, the birefringent material layer 483 has phase-shift portions $P_{180(v)}$ corresponding to a nominal thickness $T'_{180}$ overlying and/or determined by the recessed second portions 485b. The nominal thickness $T'_{180}$ of the birefringent material layer 483 is determined in the same manner as the nominal thickness $T'_{180}$ of the birefringent material layer 473 of the high-density phase-shifting array clement 470, to produce the same retardation effect.

In an analogous manner, the birefringent material layer 483 has phase-shift portions $P_{270(v)}$ corresponding to a nominal thickness $T'_{270}$ overlying and/or determined by the portions 485c. The nominal thickness $T'_{270}$ of the birefringent material layer 483 overlying and/or determined by the recessed third portions 485c is determined such that the high-density phase-shifting array element 480 produces a three-quarter wavelength retardation effect in those portions. In an analogous manner, the birefringent material layer 483 has phase-shift portions $P_{180(v)}$ corresponding to a nominal thickness $T'_0$ overlying and/or determined by the recessed fourth portions 485d. The nominal thickness $T'_0$ of the birefringent material layer 483 overlying and/or determined by the portions 485d is determined such that the high-density phase-shifting array element 480 produces a full wavelength retardation effect in those portions. It should be appreciated that the various thicknesses and/or substrate step heights discussed above can be determined according to Eq. (6), as discussed previously, where the birefringence value used is that of the birefringent material layer 483 in its aligned and polymerized state.

As shown in FIG. 15, the fast axis 488 of the birefringent material layer 483 is oriented vertically. That is, the fast axis 488 of the birefringent material layer 483 is oriented parallel to the expected operational orientation of a vertically oriented one of the orthogonal components of a combined wavefront 129. This is indicated by the exemplary REFERENCE and OBJECT orthogonal components and the fast axis alignment line 488 shown in FIG. 15. It should be appreciated that with these relative orientations, all of the portions $P_{0(v)}$–$P_{270(v)}$ function identically to the similarly number portions $P_0$–$P_{270}$ of the high-density phase-shifting array element 460, shown in FIG. 12, to produce the same optical effects.

It should be appreciated, from the above-outlined description, that the portions $P_{0(v)}$–$P_{270(v)}$ of the eighth exemplary embodiment of the high-density phase-shifting array element 480 are functionally equivalent to the portions $P_0$–$P_{270}$ of the sixth exemplary embodiment of the high-density phase-shifting array element 460, with respect to their net optical effects in multiple phase-shifted interference image information. Thus, in various exemplary embodiments of the phase-shift imaging element 5000 according to this invention, the high-density phase-shifting array elements 480 and 460 are nominally interchangeable. Accordingly, the high-density phase-shifting array elements 480 and 460 may be employed according to similar design considerations, similarly dimensioned, and similarly assembled in the phase-shift imaging element 5000 to produce similar or identical interleaved phase-shifted image information, for example, as described with reference to FIG. 13 above.

As shown in FIG. 15, in various exemplary embodiments, fabricating the interleaved thicknesses $T'_0$, $T'_{90}$, $T'_{180}$, and $T'_{270}$, is facilitated by the preliminarily fabricating the recessed portions 485a–485d formed in the substrate 482 with four distinct depths that produce and/or correspond to the thicknesses $T'_0$–$T'_{270}$, respectively. The four distinct depths of the recessed first-fourth portions 485a–485d may be formed in the substrate 482 by known etching or micro-embossing techniques, or any other appropriate known or later-developed technique. In various exemplary embodiments, the surfaces of the recessed first-fourth portions 485a–485d receive various alignment treatments as described above and in the previously incorporated references, if needed, and are filled with the birefringent material layer 483 of any appropriate birefringent material.

Any of the polymerizable birefringent materials described previously that can receive a fast axis aligning process, and that are compatible with the various fast axis alignment treatments used in a particular embodiment, can be used. In particular, in the embodiment shown in FIG. 15, in various portions, the material that forms the layer 483 provides a retardation effect that depends on the thickness of the layer 483 in that portion. The fast axis direction 488 is set for all portions based on the conditions that the layer 483 experiences as the layer 483 is polymerized, as previously described. In various exemplary embodiments, the surface 489 of the birefringent material layer 483 is made coplanar with a peripheral surface of the substrate 482.

FIGS. 16 and 17 show two patterns 401 and 401', respectively, of relative phase-shift portions that can be used in place of the patterns 461, 471 and/or 481 shown in FIGS. 12, 14 and 15, respectively. As shown in FIGS. 16 and 17, these patterns 401 and 401' define arrays of three different phase-shift portions, in contrast to the patterns 461, 471 and 481, which define arrays of four different phase-shift portions. That is, in the patterns 401 and 401' shown in FIGS. 16 and 17, the phase-shift portions provide relative phase shifts that are offset from each other by 120 degrees of phase shift, instead of the 90 degrees of relative phase shift that separate the phase-shift portions in the patterns 461, 471 and 481.

In the first exemplary three-phase pattern 401 shown in FIG. 16, each of the three different phase-shift portions $P_0$, $P_{120}$ and $P_{240}$ are consistently repeated along a diagonal direction, which slants down and to the right in the particular exemplary embodiment shown FIG. 16. Additionally, in the first exemplary three-phase pattern 401 shown in FIG. 16, the three different phase-shift portions $P_0$, $P_{120}$ and $P_{240}$ are distributed in a simple pattern such that each type of phase-shift portion is adjacent to the other two types of phase-shift portions in both the vertical and horizontal directions. Similarly, in the first exemplary three-phase pattern 401 shown in FIG. 16, the three different phase-shift portions $P_0$, $P_{120}$ and $P_{240}$ are distributed in a regular pattern such that each type of phase-shift portion represented at least once in each set or "square" of four contiguous phase shift portions.

However, while the three phase-shift portions $P_0$, $P_{120}$ and $P_{240}$ are distributed in a regular pattern in the first exemplary three-phase pattern 401 shown in FIG. 16, it is difficult to compare the interference information arising from the respective phase-shift portions $P_0$, $P_{120}$ and $P_{240}$ at the same point in a resulting image, as may be desired in various exemplary embodiments which require particularly high inference measurement accuracy and spatial resolution. This difficulty arises because the effective spatial averaging points for each respective local family of each of the three different phase-shift portions $P_0$, $P_{120}$ and $P_{240}$ do not coincide.

In the second exemplary three-phase pattern 401' shown in FIG. 17, one of the three different phase-shift portions $P_0$, $P_{120}$ and $P_{240}$ is consistently repeated along a diagonal direction, which slants down and to the right in the particular exemplary embodiment shown FIG. 17, and the other two of the three different phase-shift portions $P_0$, $P_{120}$ and $P_{240}$ are alternately repeated along that diagonal direction. In particular, in the particular exemplary embodiment of the second exemplary three-phase pattern 401' shown in FIG. 17, the first phase-shift portion $P_0$ is consistently repeated along the diagonal direction and the two portions $P_{120}$ and $P_{240}$ are alternately repeated along the diagonal direction.

As a result, in the second exemplary three-phase pattern 401' shown in FIG. 17, the three different phase-shift portions $P_0$, $P_{120}$ and $P_{240}$ are distributed in a more complicated pattern such that provides an enhanced spatial averaging configuration. In particular, in the particular exemplary embodiment of the second exemplary three-phase pattern 401' shown in FIG. 17, for the first phase-shift portion $P_0$, the other two phase-shift portions are laterally adjacent and symmetrically distributed around the first phase-shift portion $P_0$. Moreover, other ones of the first phase-shift portions $P_0$ are diagonally and symmetrically distributed around that first phase-shift portion $P_0$.

Similarly, in the particular exemplary embodiment of the second exemplary three-phase pattern 401' shown in FIG. 17, for the other phase-shift portions $P_{120}$ and $P_{240}$, the first phase-shift portion $P_0$ is laterally adjacent and symmetrically distributed around those phase-shift portions, while the other one of these two phase-shift portions $P_{120}$ and $P_{240}$ are diagonally and symmetrically distributed around that phase-shift portion. As a result, for each set or "square" of nine contiguous phase shift portions, the effective spatial averaging points for each respective local family of each of the three different phase-shift portions $P_0$, $P_{120}$ and $P_{240}$ do coincide.

It should be appreciated that the patterns 401 or 401' can each be employed in an embodiment of a high-density phase shift array element that is fabricated in a manner analogous to the embodiments 460 and 480, described above with reference to FIGS. 12 and 15, respectively. It should be appreciated that the fast axis alignment direction is consistent for each portion throughout the high-density phase shift array element in these embodiments. The various thicknesses and/or substrate step heights needed to provide the patterns 401 and 401' can be determined according to Eq. (6), as previously described.

It should further be appreciated that such embodiments of a high density phase shift array element that uses the patterns 401 or 401' can be used in alternative embodiments constructed similarly to the phase-shift imaging element 5000 shown in FIG. 13, to provide an embodiment of the multiple phase-shifted interference image information 600 that includes three interleaved interference portions, $Q_0$, $Q_{120}$ and $Q_{240}$, respectively arranged in a pattern corresponding to the pattern 401 or 401' of the phase-shift portions $P_0$, $P_{120}$ and $P_{240}$.

An interferometric measurement value can be determined from the three corresponding phase signals which arise in a detector subsystem 700 which receives the multiple phase-shifted interference image information 600 that includes the three interleaved interference portions, as described below. The three intensity signals are designated as $I_{Q0(X,Y)}$, $I_{Q120(X,Y)}$, and $I_{Q240(X,Y)}$, where each respective intensity signal symbol indicates the area-averaged image intensity value for each respective type of interference portion, regardless of whether there are one, two or more of the various respective interference portions utilized and averaged in a particular computation scheme for determining an interferometric measurement value associated with a particular (x,y) location. In general, the three intensity signals will be related approximately as follows in the vicinity of a particular (x,y) location:

$$I_{Q0(x,y)} = A_0 \sin\left(2\pi \frac{d_{(x,y)}}{\lambda}\right), \quad (7)$$

$$I_{Q120(x,y)} = A_0 \times \sin\left(2\pi \frac{d_{(x,y)}}{\lambda} + \frac{2\pi}{3}\right), \text{ and} \quad (8)$$

$$I_{Q240(x,y)} = A_0 \times \sin\left(2\pi \frac{d_{(x,y)}}{\lambda} - \frac{2\pi}{3}\right), \quad (9)$$

wherein:

$d_{(x,y)}$ is a nominally "object beam" optical path length to a corresponding (x,y) point on the object, $A_0$ is the nominal peak amplitude of the interference pattern in the vicinity of the (x,y) location, and $\lambda$ is the wavelength of the light in the interference pattern.

New signals can then be created by pair-wise subtracting the $I_{Q0(X,Y)}$, $I_{Q120(X,Y)}$, and $I_{Q240(X,Y)}$ signals from each other:

$$V_R = \quad (10)$$
$$I_{Q240(x,y)} - I_{Q120(x,y)} = A_0 \left(\sin\left(2\pi \frac{d_{(x,y)}}{\lambda} - \frac{2\pi}{3}\right) - \sin\left(2\pi \frac{d_{(x,y)}}{\lambda} + \frac{2\pi}{3}\right)\right) =$$
$$-A_0 \sqrt{3} \cos 2\pi \frac{d_{(x,y)}}{\lambda},$$

$$V_S = I_{Q0(x,y)} - I_{Q240(x,y)} = A_0 \left(\sin\left(2\pi \frac{d_{(x,y)}}{\lambda}\right) - \sin\left(2\pi \frac{d_{(x,y)}}{\lambda} - \frac{2\pi}{3}\right)\right) = \quad (11)$$
$$A_0 \sqrt{3} \cos\left(2\pi \frac{d_{(x,y)}}{\lambda} - \frac{2\pi}{6}\right), \text{ and}$$

$$V_T = I_{Q120(x,y)} - I_{Q0(x,y)} = A_0 \left(\sin\left(2\pi \frac{d_{(x,y)}}{\lambda} + \frac{2\pi}{3}\right) - \sin\left(2\pi \frac{d_{(x,y)}}{\lambda}\right)\right) = \quad (12)$$
$$A_0 \sqrt{3} \cos\left(2\pi \frac{d_{(x,y)}}{\lambda} + \frac{2\pi}{6}\right).$$

Then, to get a quadrature signal $V_{QUAD}$ that complements the signal $V_R$ for an interferometric measurement calculation, $V_S$ and $V_T$ are combined:

$$V_{QUAD} = V_S - V_T \quad (13)$$
$$= A_0 \sqrt{3} \left(\cos\left(2\pi \frac{d_{(x,y)}}{\lambda} - \frac{2\pi}{6}\right) - \cos\left(2\pi \frac{d_{(x,y)}}{\lambda} + \frac{2\pi}{3}\right)\right)$$

$$= A_0 \sqrt{3} * 2\sin 2\pi \frac{d_{(x,y)}}{\lambda} \sin\left(-\frac{2\pi}{6}\right)$$

$$= A_0 3\sin 2\pi \frac{d_{(x,y)}}{\lambda}$$

After identifying the applicable quarter-wavelength measurement-value quadrant within an incremental wavelength $\lambda$ the interpolated quadrature phase position within the quarter wavelength is then calculated by:

$$\frac{V_{QUAD}}{-V_R} = \sqrt{3} * \tan\left(2\pi \frac{d_{(x,y)}}{\lambda}\right). \quad (14)$$

Finally, solving for the interpolated interferometric measurement value $d_{(x,y)}$ within the applicable quarter-wavelength measurement-value quadrant generates:

$$d_{(x,y)} = \frac{\lambda}{2\pi} * \tan^{-1}\left(\frac{V_{QUAD}}{-V_R * \sqrt{3}}\right), \text{ and} \quad (15)$$

$$d_{(x,y)} = \frac{\lambda}{2\pi} * \tan^{-1}\left(\frac{(I_{Q0(x,y)} - I_{Q240(x,y)}) - (I_{Q120(x,y)} - I_{Q0(x,y)})}{-(I_{Q240(x,y)} - I_{Q120(x,y)}) * \sqrt{3}}\right). \quad (16)$$

Figure 18:
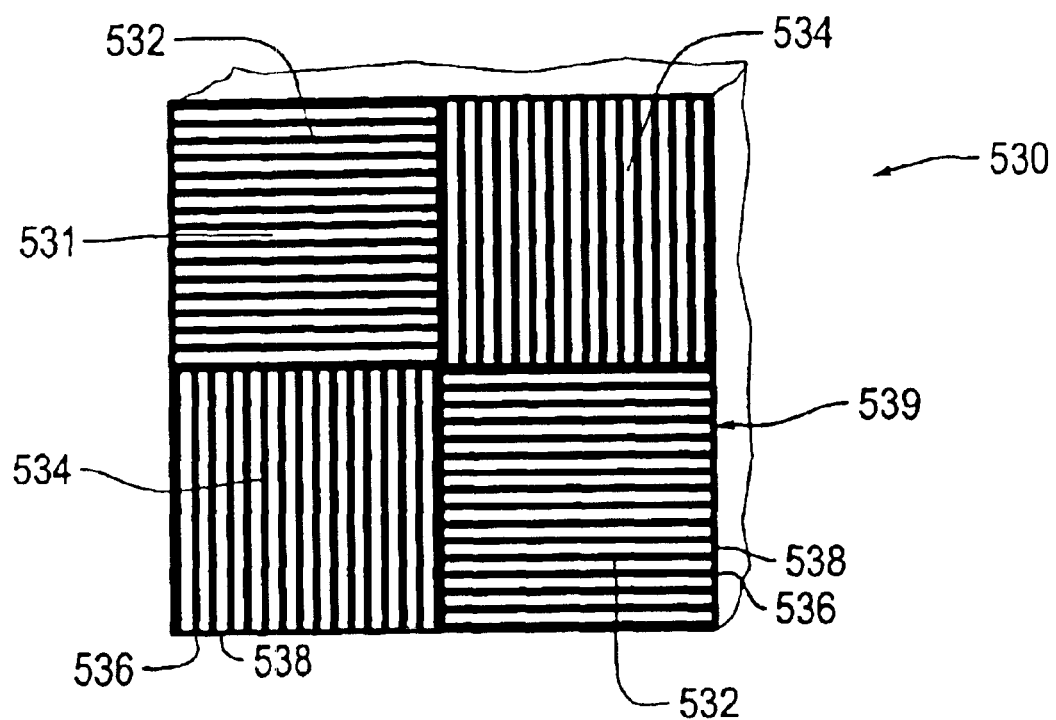
FIG. 18 illustrates a first exemplary embodiment of a high-density polarizer array element that is combinable with various exemplary embodiments of a high-density phase-shifting array element according to this invention, which is usable in various embodiments of the high-density multi-phase generating structure according to this invention.

FIG. 18 illustrates a portion of one exemplary embodiment of a high-density polarizer array 530 according to this invention. The high-density polarizer array 530 is usable in various exemplary embodiments of the multiple phase-shift generating structure 1400''', as described below with respect to the fourth exemplary embodiment 6000 of a phase-shift imaging element according to this invention that is shown in FIG. 19.

As shown in FIG. 18, the high-density polarizer array 530 includes alternating first polarization portions 532 and second polarization portions 534. In particular, as shown in FIG. 18, the first and second polarization portions 532 and 534 alternate in both the horizontal and vertical directions of the high-density polarizer array 530. This creates a checkerboard placement of the first and second polarization portions 532 and 534. In various exemplary embodiments, when the high-density polarizer array 530 is incorporated into various embodiments of the phase-shift imaging element 6000 according to this invention, the checkerboard pattern of first and second polarization portions 532 and 534 extends to cover substantially the entire surface area of each portion of the detector device 710 used to implement the detector subsystem 700.

The first polarization portions 532 and second polarization portions 534 of the high-density polarizer array 530 may be formed by any known or later-developed method of fabrication. In particular, the only manufacturing requirement is that the first polarization portions 532 and second polarization portions 534 be fabricated in relatively high-density arrays. Specifically, the dimensions of the first polarization portions 532 and second polarization portions 534 must be able to approach the dimensions of one pixel, or a small group of pixels, of an optical detector array, as described further below. In various exemplary embodiments according to this invention, as shown in FIG. 18, each of the first and second polarization portions 532 and 534 is implemented using a wire grid polarizing element formed by an array of parallel conductive elements 536 separated by spaces 538. U.S. Pat. Nos. 6,108,131, 6,122,103 and 6,243,199, each incorporated herein by reference for its relevant teachings, disclose systems and methods for forming such wire grid polarizing elements.

It should be appreciated that, as shown in FIG. 18, the first and second polarization portions 532 and 534, respectively, transmit horizontally and vertically polarized components of an incident light wavefront. However, more generally, it should be appreciated that the polarization directions of the first and second polarization portions 532 and 534 are arbitrarily selectable in combination with the complementary elements of a multiple phase-shift generating structure according to this invention. However, in various exemplary embodiments, the polarization directions for the first and second polarization portions 532 and 534 will be rotated by 45 degrees relative to the two orthogonally polarized incident wavefronts 124 and 128 comprising the combined wavefront 129, and will be mutually orthogonal, to obtain the best relevant contrast in the resulting images.

Thus, in various exemplary embodiments, when the two orthogonally polarized incident wavefronts 124 and 128 are oriented along the polarization directions 132A and 133A as shown in FIG. 19, the parallel conductive elements 536 and spaces 538 in the first polarization portions 532 will be oriented along a 45 degree angle. Likewise, when the two orthogonally polarized incident wavefronts 124 and 128 are oriented along the polarization directions 132A and 133A, as shown in FIG. 19, the parallel conductive elements 536 and spaces 538 in the second polarization portions 534 will be oriented along an orthogonal 45 degree angle.

It should also be appreciated that, in the exemplary embodiment shown in FIG. 18, the replication directions of the first and second polarization portions 532 and 534 are arranged horizontally and vertically. However, more generally, the replication directions of each of the first and second polarization portions 532 and 534 are completely controllable and selectable in combination with the complementary elements of a multiple phase-shift generating structure according to this invention. In various exemplary embodiments, the first and second polarization portions 532 and 534 will be of equal size and shape and will cover equal portions of the detector device 710.

In various exemplary embodiments, each of the first or second polarization portions 532 and 534 will extend over an integer-number of pixels of the detector device 710. In various exemplary embodiments, the boundaries of the first and second polarization portions 532 and 534 will be aligned with the boundaries between the pixels of the detector device 710. Thus, in such exemplary embodiments, each pair or set of the first and second polarization portions 532 and 534 define unit cells within the high-density polarizer array 530 and the detector device 710. At one extreme, each of the respective first and second polarization portions 532 and 534 can be associated with and aligned with a respective single pixel of the detector device 710.

FIG. 19 is an exploded view illustrating a fourth exemplary embodiment of a phase-shift imaging element 6000 according to this invention. As shown in FIG. 19, the phase-shift imaging element 6000 includes a third exemplary embodiment of a multiple phase-shift generating structure 1400''' according to this invention and a detector subsystem 700''. In various exemplary embodiments, a single detector 710 of any suitable known or later-developed type is used to implement the detector subsystem 700''. As shown in FIG. 19, the multiple phase-shift generating structure 1400''' incorporates any of the high-density phase-shifting array element elements 410 or 430 described above or a high-density phase-shifting array element 490 according to this invention, combined with the high-density polarizer array 530 according to this invention. As in the third exemplary phase-shift imaging element 5000 previously described with respect to FIG. 13, no beam splitter is required in the phase-shift imaging element 6000.

As shown in FIG. 19, the combined wavefront 129 is transmitted by the optical input portion 135". The transmitted combined wavefront 129 includes the reference wavefront 124 and the object wavefront 128. The transmitted combined wavefront 129 propagates as a single wavefront that fills the high-density phase-shifting array element 490, which provides the combined functions of two interleaved retarder plates having a quarter-wave retardation difference between them, as described in detail below. Thus, in various exemplary embodiments, the transmitted combined wavefront 129 that propagates from the high-density phase-shifting array element 490 includes an interleaved pattern of at least two phase-shift portions having different relative phase-shifts that are separated by 90 degrees of relative phase shift.

The transmitted combined wavefront 129 passing out of the high-density phase-shifting array element 490, including the interleaved pattern of 90-degree-different relative phase-shifts, is directed onto the high-density polarizer array 530. As described in detail below, in various exemplary embodiments one of the first and second polarization portions 532 and 534 of the high-density polarizer array 530 is oriented to transmit and interfere the in-phase components of the orthogonally polarized components 124 and 128 in various portions of the transmitted combined wavefront 129 passing out of the high-density phase-shifting array element 490 and having a first one of the different relative phase-shifts that are separated by 90 degrees. Similarly, the other of the first and second polarization portions 532 and 534 of the high-density polarizer array 530 is orthogonally oriented to transmit and interfere the out-of-phase components of the orthogonally polarized components 124 and 128 in various portions of the transmitted combined wavefront 129 passing out of the high-density phase-shifting array element 490 and having a second one of the different relative phase-shifts that are separated by 90 degrees.

As a result, in various exemplary embodiments, a 2-dimensionally interleaved pattern of $Q_0$–$Q_3$ interference portions is produced in the multiple phase-shifted interference image information 640 that passes out of the polarizer array element 530. This 2-dimensionally interleaved pattern of $Q_0$–$Q_3$ interference portions is received as a single image that extends substantially over the entire surface area of the detector device 710 that is used to implement the detector subsystem 700".

In various exemplary embodiments, similar to various embodiments described above, the patterned surface of the high-density phase-shifting array element 490 is oriented towards the polarizer element 530 and the detector 710. More generally, in various exemplary embodiments, the respective fabrication, orientation and assembly of the high-density phase-shifting array element 490, the polarizer element 530 and the detector 710 can be similar to any of the various embodiments previously described for the respective fabrication, orientation and assembly of the corresponding elements of the phase-shift imaging elements 3000 and 4000, described above with reference to FIGS. 7, 8, 10 and 1. In various exemplary embodiments, regardless of their respective fabrication methods, the polarizer element 530, the high-density phase-shifting array element 490 and the detector 710 are effectively bonded or joined together to form the phase-shift imaging element 6000 shown in FIG. 19 as a monolithic phase-shift imaging element.

It should be appreciated that, in various exemplary embodiments according to this invention, it is advantageous to fabricate the polarizer element 530, the high-density phase-shifting array element 490 and the detector 710 such that each portion of the effective optical path length of the combined wavefront 129 are as similar as possible, and ideally, equal. It should be appreciated that, in various exemplary embodiments, a distance d (not shown) between the active portion of the high-density phase-shifting array element 490 and a detector surface of the detector device 710 should be less than the maximum depth of focus of the image that is presented at the detector device 710. In various exemplary embodiments, the distance d is approximately 1–2 mm or less. In various other exemplary embodiments, the distance d is less than 0.2 mm.

In various exemplary embodiments, the high-density polarizer array 530 includes a pattern of first polarizing portions 532 and second polarizing portions 534 that complement a pattern of zero-degree phase-shift portions $P_0$ and 90-degree phase-shift portions $P_{90}$ included in the high-density phase-shifting array element 490. The complementary patterns of the high-density phase-shifting array element 490 and the high-density polarizer array 530 combine to produce a desired 2-dimensionally interleaved pattern of first, second, third and fourth relative-phase interference portions that are interleaved at a high spatial frequency in the multiple phase-shifted interference image information 640.

In such embodiments, it should be appreciated that the 2-dimensionally interleaved pattern of first, second, third and fourth relative-phase interference portions in the multiple phase-shifted interference image information 640 corresponds to a high-density interleaving of the $Q_0$–$Q_3$ quadrants, 232–238; shown in FIG. 4, transmitted as a single image onto the surface of the detector device 710 that is used to implement the detector subsystem 700"; Various exemplary embodiments of such complementary patterns, and the various resulting exemplary embodiments of the multiple phase-shifted interference image information 149' are described in greater detail below.

In a first exemplary embodiment of the phase-shift imaging element 6000, the reference wavefront 124 and the object wavefront 128 are polarized along the orthogonal directions 132A and 133A shown in FIG. 19. In this first exemplary embodiment, the high-density polarizer array 530 includes a pattern 531A, which includes the strip-like first polarizing portions 532A and the strip-like second polarizing portions 534A, having respective polarization directions as indicated by the respective "grid lines" in the detailed view of the pattern 531A.

In this exemplary embodiment, when the high-density polarizer array 530 includes the pattern 531A, the first exemplary embodiment of the phase-shift imaging element 6000 includes the high-density phase-shifting array element 490, which includes a pattern 491A. The pattern 491A, as shown in the detailed view shown in FIG. 19B, includes alternatingly-arranged strip-like zero-degree phase-shift portions $P_0$ and strip-like 90-degree phase-shift portions $P_{90}$. In various exemplary embodiments, the strip-like zero-degree phase-shift portions $P_0$ and strip-like 90-degree phase-shift portions $P_{90}$ of the high-density phase-shifting array element 490 are fabricated by forming the appropriate thickness in a birefringent material layer or a birefringent substrate according to any of the previously described methods, such as the strip-like embodiments shown in FIG. 14. However, it should be appreciated that, in this particular exemplary embodiment, the fast axis direction of the birefringent material layer or a birefringent substrate is everywhere uniformly vertical, as in the embodiment shown in FIG. 15.

In such exemplary embodiments, it should be appreciated that the first polarization portions 532A function to transmit and interfere the in-phase components of the orthogonally polarized components 124 and 128 in the transmitted combined wavefront 129 passing out of the high-density phase-shifting array element 490. Similarly, the second polarization portions 534A function to transmit and interfere the out-of-phase components of the orthogonally polarized components 124 and 128 in the transmitted combined wavefront 129 passing out of the high-density phase-shifting array element 490. The structure of the multiple phase-shifted interference image information 640 corresponding to this exemplary embodiment is further described with reference to FIG. 20, below.

In a second exemplary embodiment of the phase-shift imaging element 6000, the reference wavefront 124 and the object wavefront 128 are polarized along the orthogonal directions 132B and 133B shown in FIG. 19. In this second exemplary embodiment, the high-density polarizer array 530 includes a pattern 531B, which includes the first polarizing portions 532B and the second polarizing portions 534B, having respective polarization directions as indicated by the respective "grid lines" in the detailed view of pattern 531B. In such a case, it should be appreciated that the first polarization portions 532B and the second polarization portions 534B may be identical to those similarly numbered elements described above with reference to FIG. 18.

In this exemplary embodiment, when the high-density polarizer array 530 includes the pattern 531B, the first exemplary embodiment of the phase-shift imaging element 6000 includes the high-density phase-shifting array element 490, which includes a pattern 491B. The pattern 491B, as shown in the detailed view of FIG. 19D, includes a checkerboard pattern of zero-degree phase-shift portions $P_0$ and 90-degree phase-shift portions $P_{90}$. In various exemplary embodiments, the checkerboard pattern of zero-degree phase-shift portions $P_0$ and 90-degree phase-shift portions $P_{90}$ of the high-density phase-shifting array element 490 are fabricated by forming the appropriate thickness in a birefringent material layer or a birefringent substrate according to any of the previously described methods, such as the embodiments shown in FIG. 6 or 15. In this particular exemplary embodiment, the fast axis direction of the birefringent material layer or a birefringent substrate is everywhere uniformly vertical, as in the embodiments shown in FIGS. 6 and 15.

In such exemplary embodiments, it should be appreciated that the first polarization portions 532A function to transmit and interfere the in-phase components of the orthogonally polarized components 124 and 128 in the transmitted combined wavefront 129 passing out of the high-density phase-shifting array element 490. Similarly, the second polarization portions 534A function to transmit and interfere the out-of-phase components of the orthogonally polarized components 124 and 128 in the transmitted combined wavefront 129 passing out of the high-density phase-shifting array element 490. The structure of the multiple phase-shifted interference image information 640 corresponding to this exemplary embodiment is further described with reference to FIG. 21, below.

More generally, it should be appreciated that there are a number of usable combinations of patterns of the high-density phase-shifting array element and the high-density polarizer array 530 that can be used in the fourth exemplary embodiment of the phase-shift imaging element 6000. Furthermore, various other alternative methods of fabricating various embodiments of the high-density polarizer array 530 and the high-density phase-shifting array element 490 in various complementary polarization and fast axis and orientations are possible, as will be apparent based on the discussions outlined both above and below. Thus, the foregoing embodiments of the fourth exemplary embodiment of the phase-shift imaging element 6000 which uses a high-density polarizer array 530 are exemplary only, and not limiting.

It should be appreciated that various exemplary embodiments of the multiple phase shift generating structures 1400" and 1400'" and the exemplary phase shift imaging elements 5000 and 6000 provide three or more different phases, including but not limited to the three different phases and four different phases disclosed in relation to various exemplary embodiments discussed above and below, of relative phase-shift interference information arising from a single image that is derived from a single undivided wavefront. Thus, it should be appreciated that all of the previously described features and benefits of the various embodiments of the multiple phase-shift generating structure 1400' and the phase-shift imaging element 3000 shown in FIGS. 7 and 8, and the multiple phase-shift generating structure 1400' and the phase-shift imaging element 4000 shown in FIGS. 10 and 11, are similarly provided by various embodiments of the multiple phase-shift generating structures 1400" and 1400'" and the phase-shift imaging elements 5000 and 6000 shown in FIGS. 13 and 19, respectively.

In addition, in various exemplary embodiments, the multiple phase-shift generating structures 1400" and 1400'" and the phase-shift imaging elements 5000 and 6000 shown in Figs; 13 and 19 enjoy an additional advantage in that the high-density phase-shifting array elements 460, 470, 480 or 490 and the like are provided as single elements. Furthermore, because the high-density phase-shifting array elements 460, 470, 480 or 490 and the like allow more than two different "types" of differently phase-shifted interference portions to be provided along a single optical path, that is, within a single image on the detector 710, no beam splitting element is required. This results not only in fewer optical element aberrations and more convenient assembly and/or signal processing, but also in improved matching between the gain characteristics and the like, of all comparable image pixels. This occurs because all comparable pixels are located in the same small region of the detector.

Furthermore, all comparable pixels are located in the same small region of the detector. Accordingly, the optical path lengths from a particular portion of the object to each of the particular corresponding $Q_0$–$Q_3$ interference portions in a particular local portion of the multiple phase-shifted interference image information 630 or 640 are inherently similar. Thus, the related relative phase-shift information and the related measurement determination will generally be insensitive to reasonably expected rotational and/or translational motions of the exemplary phase shift imaging elements 5000 or 6000. As a result, in various exemplary embodiments, both costs and measurement errors are further reduced in the phase-shift imaging elements 5000 and 6000, in comparison to the phase-shift imaging elements 3000 and 4000.

Figure 20:
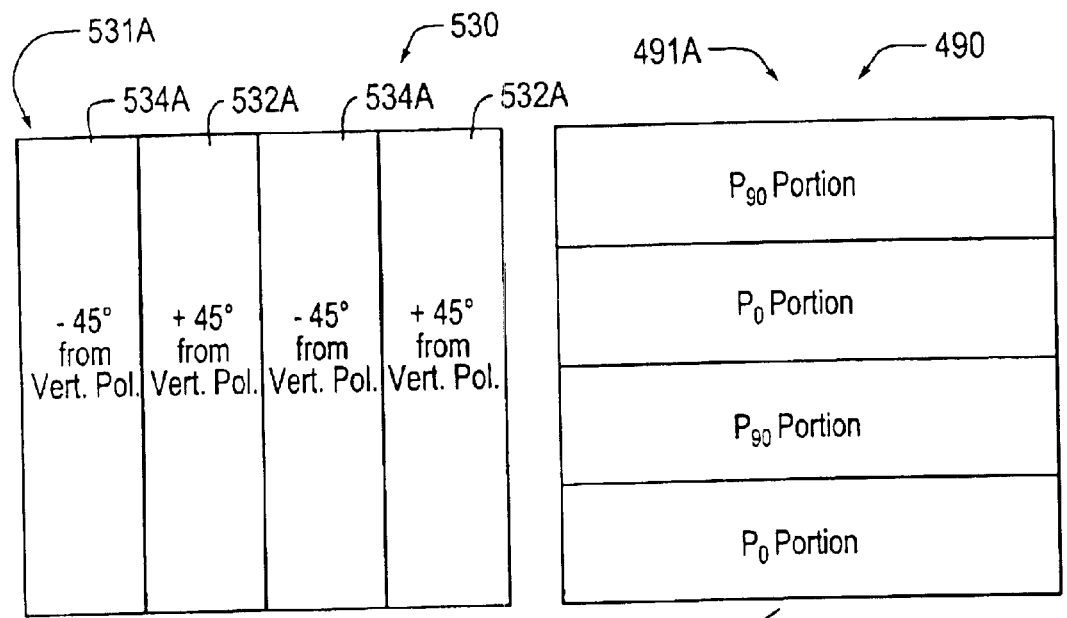
FIG. 20 is a schematic diagram illustrating in greater detail a first exemplary embodiment of the fourth exemplary embodiment of the multiple phase-shift generating structure shown in FIG. 19 that incorporates a high-density phase-shifting array element according to this invention combined with a high-density polarizer array according to this invention.
Figure 21:
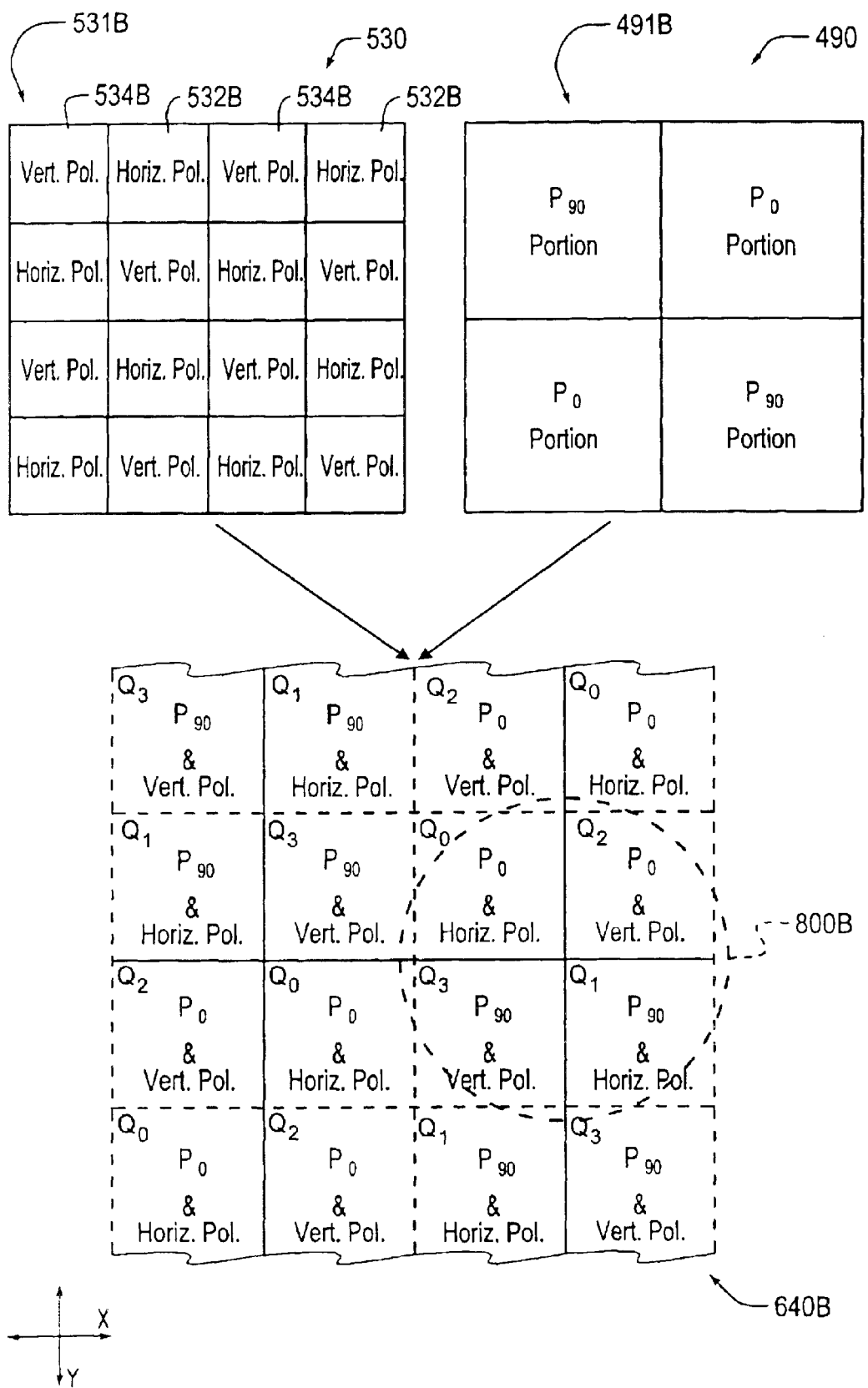
FIG. 21 is a schematic diagram illustrating in greater detail a second exemplary embodiment of the fourth exemplary embodiment of the multiple phase-shift generating structure shown in FIG. 19 that incorporates a high-density phase-shifting array element according to this invention combined with a high-density polarizer array according to this invention.
Figure 22:
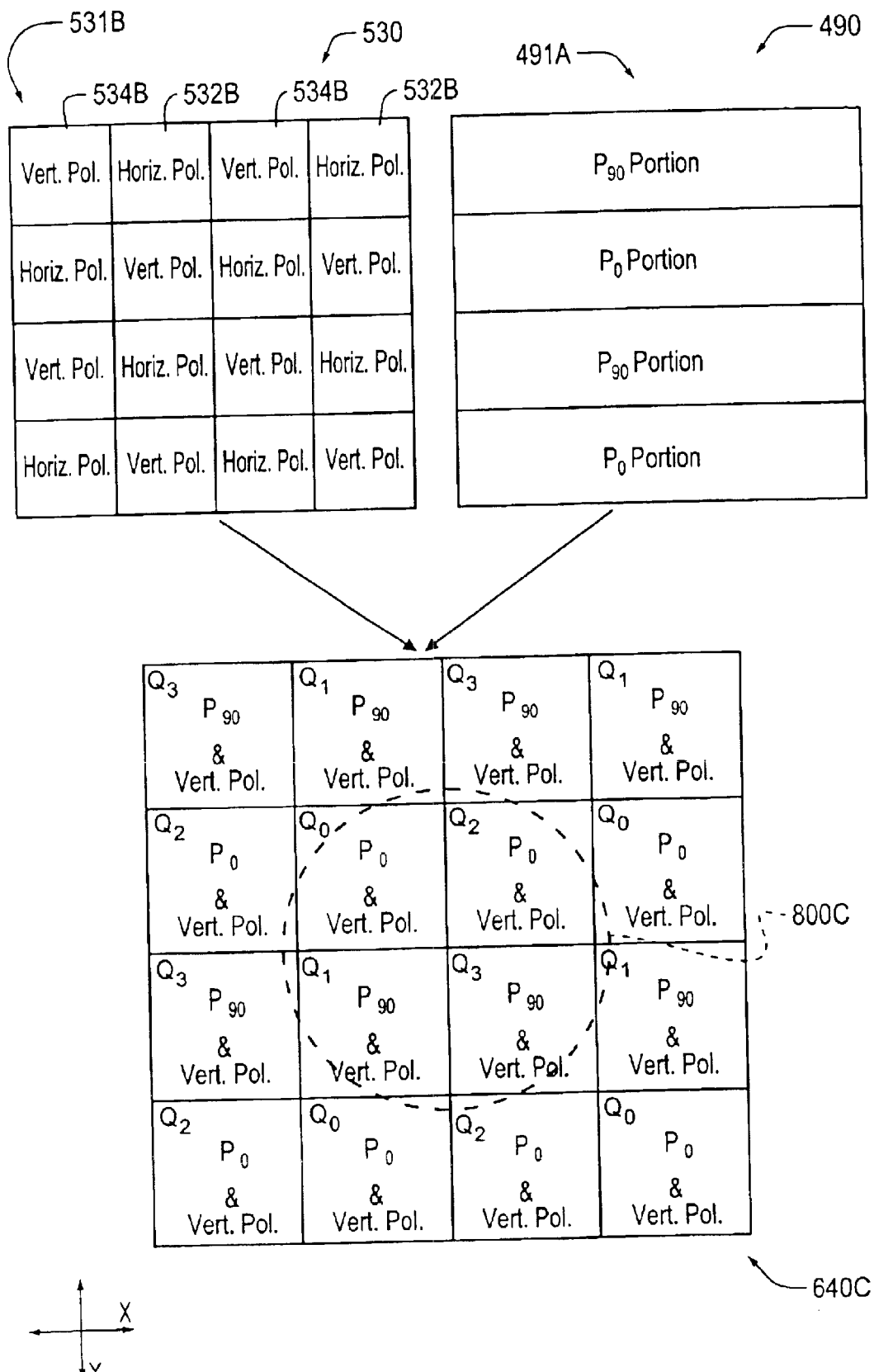
FIG. 22 is a schematic diagram illustrating in greater detail a third exemplary embodiment of the fourth exemplary embodiment of the multiple phase-shift generating structure shown in FIG. 19 that incorporates a high-density phase-shifting array element according to this invention combined with a high-density polarizer array according to this invention.

FIGS. 20–22 are schematic diagrams illustrating in greater detail patterns and operation of the first and second, and a third, particular embodiments of the fourth exemplary embodiment of the phase-shift imaging element 6000 shown in FIG. 19 that incorporates, in place of the polarizer elements 510, the high-density polarizer array 530 according to this invention in addition to the high-density phase-shifting array element 490 according to this invention.

In particular, FIG. 20 is a schematic diagram illustrating the patterns and operation of the first exemplary embodiment of the fourth exemplary phase-shift imaging element 6000 described above with reference to FIG. 19. This first exemplary embodiment is usable when the reference wavefront 124 and the object wavefront 128 are polarized along the orthogonal directions 132A and 133A shown in FIG. 19. FIG. 20 shows a portion of the exemplary pattern 531A of the high-density polarizer array 530 and, a portion of the exemplary pattern 491A of the high-density phase-shifting array-element 490 that is nominally aligned with the portion of the exemplary pattern 531A. These elements have been previously described with reference to the first exemplary embodiment of the fourth phase-shift imaging element 6000 shown in FIG. 19.

FIG. 20 also shows a nominally aligned portion of the resulting interleaved pattern 640A of the "$Q_0$–$Q_3$" interference portions in the multiple phase-shifted interference image information 640 that is transmitted as a single image onto the surface of the detector device 710. This interleaved pattern 640A is obtained from the combination of the pattern 531A of the high-density polarizer array 530 and the pattern 491A of the high-density phase-shifting array element 490, as described above with reference to the first exemplary embodiment of the fourth exemplary phase-shift imaging element 6000 shown in FIG. 19. The optical generation and characteristics of the various $Q_0$–$Q_3$ interference portions are the same as previously described. A nominal lateral resolution indicator 800A is also shown, as discussed in detail further below.

In various exemplary embodiments, the edges of the $Q_0$–$Q_3$ interference portions in the multiple phase-shifted interference image information 640A are nominally aligned with the edges of detector elements of the detector device 710. That is, each of the $Q_0$–$Q_3$ interference portions are an integer number of pixels high, and an integer number of pixels wide, and are nominally aligned with a corresponding set of pixels. For example, in various exemplary embodiments, when only coarse lateral resolution is required, the integer number of pixels may be on the order of approximately 16 pixels or more. In various exemplary embodiments where finer lateral resolution is required, the integer number of pixels may be on the order of approximately 4–8 pixels. In various exemplary embodiments where the finest lateral resolution is required, the integer number of pixels may be approximately 1–4 pixels. The dimensions of the various elements of the high-density polarizer array 530 and the high-density phase-shifting array element 490 are designed accordingly, and will be apparent to one skilled in the art.

As described above, this first exemplary embodiment of the fourth exemplary phase-shift imaging element 6000 provides four different phases of relative phase-shift interference information, that is, the $Q_0$–$Q_3$ interference information portions, arising from a single image. Thus, this first exemplary embodiment of the fourth exemplary phase-shift imaging element 6000 provides four; separate "phase signals" arising from the four $Q_0$–$Q_3$ interference information portions, similar to the phase signals provided by the phase-shift imaging elements 3000 and 4000 described above.

Thus, by analogy with discussions above related to Eq. (2) and FIGS. 7, 8, 10 and 11, for various exemplary embodiments according to this invention where a single image of the multiple phase-shifted interference image information interleaves the four $Q_0$–$Q_3$ interference information portions, as shown in FIG. 20, for any 2×2 region of four contiguous different interference portions centered at a location (x,y), which will nominally be the interference portions $Q_3(x,y)$, $Q_1(x,y)$, $Q_0(x,y)$ and $Q_2(x,y)$, one expression comparable to Eq. 10 in the 330 patent and to Eq. (2) above is:

$$\Phi(x,y)=\tan^{-1}\{[I_{Q3(x,y)}-I_{Q1(x,y)}]/[I_{Q0(x,y)}-I_{Q2(x,y)}]\} \quad (17)$$

where I indicates the image intensity value for each respective interference portion.

Similarly to the discussion above related to Eqs. (2) and (3), it should be appreciated that, if each respective interference portion corresponds to a set of more than one pixel on the detector, in various exemplary embodiments the image intensity value I indicates the average or representative intensity value for that entire set of pixels. The entire set of pixels can thus be regarded as a "meta-pixel". It should be appreciated that, in various exemplary embodiments, such meta-pixels have an extent corresponding to the extent of the respective overlapping area combinations of the first and second portions of a high-density polarizer array 530 and the zero degree phase-shift portions $P_0$ and the 90-degree phase-shift portions $P_{90}$ of the pattern 491A of the high-density phase-shifting array element 490 according to this invention. In various exemplary embodiments, such meta-pixels provide one desirable met hod of spatial averaging usable according to the principles of this invention.

Also similarly to the discussion above related to Eqs. (2) and (3), it should be appreciated that, in various exemplary embodiments, each individual interference portion may be a comparable interference portion involved in a measurement determination at at least four different (x,y) locations corresponding to the four borders of the individual interference portion with the four comparable individual neighboring interference portions that neighbor, e.g., are adjacent to, that individual interference portion.

Furthermore, by analogy with discussions outlined above related to Eq. (3), for any 3×3 region of nine contiguous interference portions centered at a location (x,y) coinciding with the central pixel, the following exemplary alternative expression is also usable:

$$\Phi(x,y)=\tan^{-1}\{[I^{ave}_{Q3(x,y)}-I^{ave}_{Q1(x,y)}]/[I^{ave}_{Q0(x,y)}-I^{ave}_{Q2(x,y)}]\} \quad (18)$$

wherein $I^{ave}$ indicates the ar ea-averaged image intensity value for each respective interference portion, regardless of whether there are one, two, or four of the various respective interference portions in the region of nine contiguous interference portions.

It should be appreciated that Eq. (18) averages the pixels on each side of an (x,y) center pixel, which nominally removes the minimal gradient or offset error present in Eq. (17). That is, in various exemplary embodiments, a "comparable average" according to Eq. (18) has a nominal spatial location that, ideally, coincides with the (x,y) center pixel. It should be appreciated that, in various exemplary embodiments, each individual interference portion may be a comparable interference portion involved in a measurement determination at at least eight different (x,y) locations corresponding to the four edge-adjacent comparable neighboring interference portions of that individual interference portion, and the four diagonally-located comparable neighboring interference portions of that individual interference portion.

Based on the foregoing examples and discussion, various modifications and other signal processing methods usable with these and other embodiments according to this invention will be apparent to one skilled in the art.

FIG. 21 is a schematic diagram illustrating the patterns and operation of the second exemplary embodiment of the fourth exemplary phase-shift imaging element 6000, as described above with reference to FIG. 19. This second exemplary embodiment is usable when the reference wavefront 124 and the object wavefront 128 are polarized along the orthogonal directions 132B and 133B shown in FIG. 19. FIG. 21 shows a portion of the exemplary pattern 531B of the high-density polarizer array 530, and a portion of the exemplary pattern 491B of the high-density phase-shifting array element 490 that is nominally aligned with the portion of the exemplary pattern 531B. These elements have been previously described with reference to the second exemplary embodiment of the fourth exemplary phase-shift imaging element 6000 shown in FIG. 19.

FIG. 21 also shows a nominally-aligned portion of the resulting interleaved pattern 640B of $Q_0$–$Q_3$ interference portions in the multiple phase-shifted interference image information 640 that is transmitted as a single image onto the surface of the detector device 710. This interleaved pattern 640B is obtained from the combination of the pattern 531B of the high-density polarizer array 530 and the pattern 491B of the high-density phase-shifting array element 490, as described above with reference to the second exemplary embodiment of the fourth exemplary phase-shift imaging element 6000 shown in FIG. 19. The optical generation and characteristics of the various $Q_0$–$Q_3$ interference portions are the same as previously described. A nominal lateral resolution indicator 800B is also shown, as discussed in detail further below.

Similarly to the first exemplary embodiment described with reference to FIG. 20, in various exemplary embodiments, the edges of the $Q_0$–$Q_3$ interference portions in the multiple phase-shifted interference image information 640B are nominally aligned with the edges of detector elements of the detector device 710. That is, each of the $Q_0$–$Q_3$ interference portions are an integer number of pixels high, and an integer number of pixels wide, and are nominally aligned with a corresponding set of pixels. The dimensions of the various elements of the high-density polarizer array 530 and the high-density phase-shifting array element 490 are designed accordingly, and will be apparent to one skilled in the art.

It should be appreciated that this second exemplary embodiment also provides four separate "phase signals" arising from the four $Q_0$–$Q_3$ interference information portions, similar to the four phase signals provided by the first exemplary embodiment described above. Thus, by analogy with the discussions outlined above related to the first exemplary embodiment shown in FIG. 20, Eq. (17) is also usable with this second exemplary embodiment, for any 2×2 region of four contiguous different interference portions centered at a location (x,y). However, it should be appreciated that, due to the particular structure of the second exemplary embodiment, as shown by the dashed outline lines in the pattern 640B shown in FIG. 21, the centers of regions of four contiguous different interference portions occur only at (x,y) locations coinciding with the centers of the edges between a 90-degree phase-shift portion $P_{90}$ and a zero-degree phase-shift portion $P_0$ in the pattern 491B of the high-density phase-shifting array element 490. Thus, Eq. (17) may only be applied to make measurement determinations at these particular locations for the second exemplary embodiment.

However, it should be appreciated that at each (x,y) location midway between the aforementioned (x,y) locations coinciding with the centers of the edges between a 90-degree phase-shift portion $P_{90}$ and a zero-degree phase-shift portion $P_0$, the "averaging" Eq. (18) is usable with this second particular embodiment, for a region of eight contiguous interference portions that is 2 interference portions wide along the x direction and 4 interference portions high along the y direction, or vice-verse. Based on the foregoing examples and discussion, various modifications and other signal processing methods usable with the second exemplary embodiment will be apparent to one skilled in the art.

FIG. 22 is a schematic diagram illustrating the patterns and operation of a third exemplary embodiment of the fourth exemplary phase-shift imaging element 6000 as described above with reference to FIG. 19. This third exemplary embodiment is usable when the reference wavefront 124 and the object wavefront 128 are polarized along the orthogonal directions 132B and 133B shown in FIG. 19. FIG. 22 shows a portion of the exemplary pattern 531B of the high-density polarizer array 530, and a portion of the exemplary pattern 491A of the high-density phase-shifting array element 490 that is nominally aligned with the portion of the exemplary pattern 531B. These elements have been previously described with reference to the first and second exemplary embodiments of the fourth exemplary phase-shift imaging element 6000 shown in FIG. 19.

FIG. 22 also shows a nominally-aligned portion of the resulting interleaved pattern 640C of $Q_0$–$Q_3$ interference portions in the multiple phase-shifted interference image information 640 that is transmitted as a single image onto the surface of the detector device 710. This interleaved pattern 640C is obtained from the combination of the pattern 531B of the high-density polarizer array 530 and the pattern 491A of the high-density phase-shifting array element 490, as described above with reference to the fourth exemplary phase-shift imaging element 6000 shown in FIG. 19. The optical generation and characteristics of the various $Q_0$–$Q_3$ interference portions are the same as previously described. A nominal lateral resolution indicator 800C is also shown, as discussed in detail further below.

Similarly to the first exemplary embodiment described with reference to FIG. 20, in various exemplary embodiments, the edges of the $Q_0$–$Q_3$ interference portions in the multiple phase-shifted interference image information 640C are nominally aligned with the edges of detector elements of the detector device 710. That is, each of the $Q_0$–$Q_3$ interference portions are an integer number of pixels high, and an integer number of pixels wide, and are nominally aligned with a corresponding set of pixels. The dimensions of the various elements of the high-density polarizer array 530 and the high-density phase-shifting array element 490 are designed accordingly, and will be apparent to one skilled in the art.

It should be appreciated that this third exemplary embodiment provides four separate "phase signals" arising from the four $Q_0$–$Q_3$ interference information portions, similar to the four phase signals provided by the first exemplary embodiment described above with respect to FIG. 20. Despite a minor difference in the arrangement of the four $Q_0$–$Q_3$ interference information portions between the pattern 640A of the first exemplary embodiment shown in FIG. 20 and the pattern 640C of this third exemplary embodiment, Eq. (17) is similarly usable with this third exemplary embodiment, for any 2×2 region of four contiguous different interference portions centered at a location (x,y). Similarly, for any 3×3 region of nine contiguous interference portions centered at a location (x,y) coinciding with a central pixel, Eq. (18) is usable. Based on the foregoing examples and discussion, various modifications and other signal processing methods usable with the third particular embodiment will be apparent to one skilled in the art.

Figure 23:
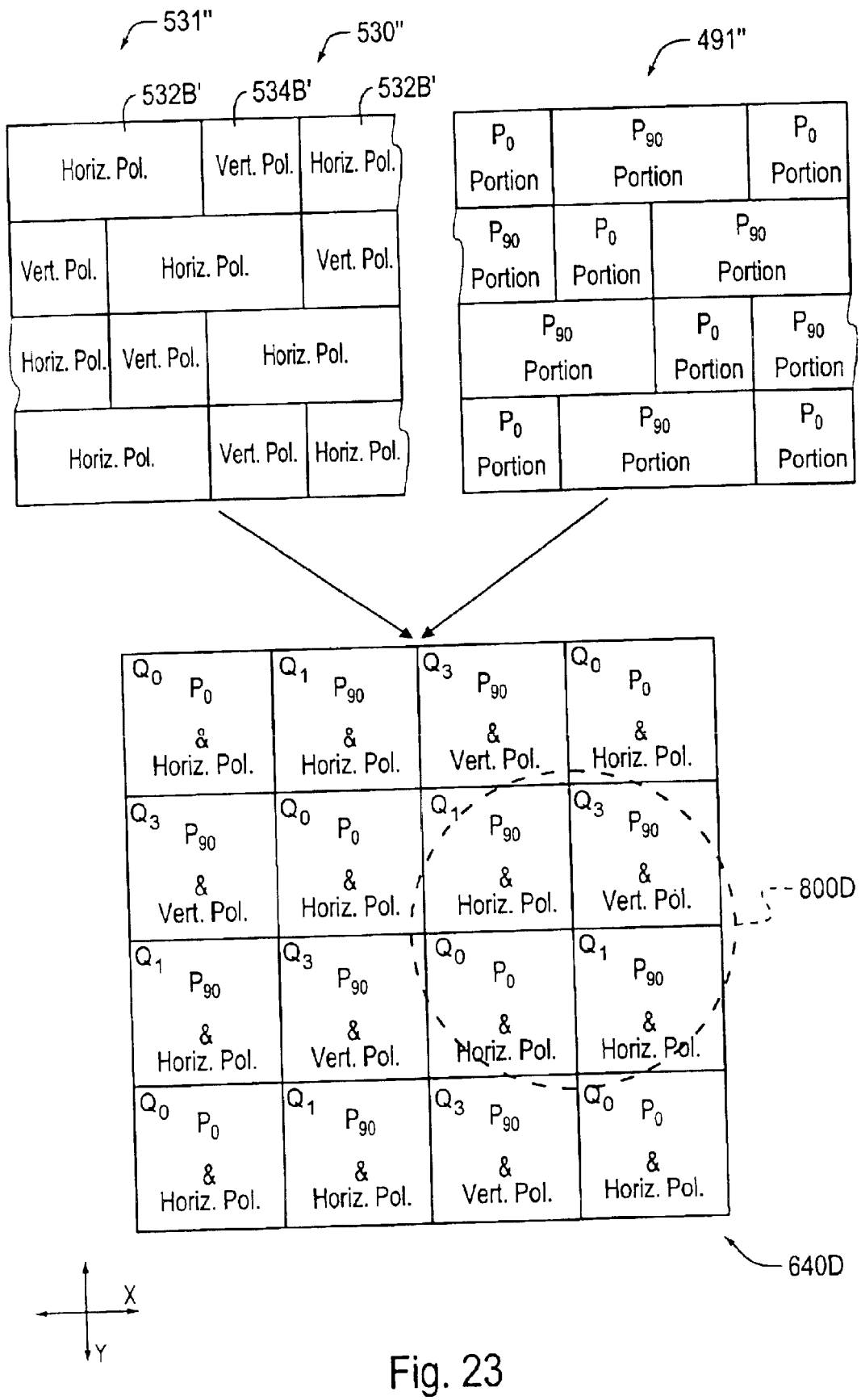
FIG. 23 is a schematic diagram illustrating in greater detail a fourth exemplary embodiment of the fourth exemplary embodiment of the multiple phase-shift generating structure shown in FIG. 19 that incorporates a high-density phase-shifting array element according to this invention combined with a high-density polarizer array according to this invention.

FIG. 23 is a schematic diagram illustrating the patterns and operation of a fourth exemplary embodiment of the fourth exemplary phase-shift imaging element 6000. This fourth exemplary embodiment usable when the reference wavefront 124 and the object wavefront 128 are polarized along the orthogonal directions 132B and 133B shown in FIG. 19. In contrast to the embodiments illustrated in FIGS. 20–22, the embodiment illustrated in FIG. 23 shows an exemplary embodiment that provides only 3 different interference portions, the $Q_0$, $Q_1$ and $Q_3$ interference portions. Thus, this exemplary embodiment is usable for measurement determinations that use only 3 phases.

FIG. 23 shows a portion of an alternative exemplary pattern 531" of the high-density polarizer array 530, and a portion of an alternative exemplary pattern 491" of the high-density phase-shifting array element 490 that is nominally aligned with the portion of the exemplary pattern 531". The general characteristics of these elements are similar to those previously described with reference to the similarly number elements shown in FIG. 19. FIG. 23 also shows a nominally aligned portion of the resulting interleaved pattern 640D of $Q_0$, $Q_1$, and $Q_3$ interference portions in the multiple phase-shifted interference image information 640 that is transmitted as a single image onto the surface of the detector device 710. This interleaved pattern 640D is obtained from the combination of the pattern 531" of the high-density polarizer array 530 and the pattern 491" of the high-density phase-shifting array element 490, in this fourth exemplary embodiment of the fourth exemplary phase-shift imaging element 6000 shown in FIG. 19. The optical generation and characteristics of the various $Q_0$, $Q_1$ and $Q_3$ interference portions are the same as previously described.

Similarly to the first exemplary embodiment described with reference to FIG. 20, in various exemplary embodiments, the edges of the $Q_0$, $Q_1$ and $Q_3$ interference portions in the multiple phase-shifted interference image information 640 are nominally aligned with the edges of detector elements of the detector device 710. That is, each of the $Q_0$, $Q_1$, and $Q_3$ interference portions are an integer number of pixels high, and an integer number of pixels wide, and are nominally aligned with a corresponding set of pixels. The dimensions of the various elements of the high-density polarizer array 530 and the high-density phase-shifting array element 490 are designed accordingly, and will be apparent to one skilled in the art.

It should be appreciated that this fourth exemplary embodiment provides three separate "phase signals" arising from the three $Q_0$, $Q_1$, and $Q_3$ interference information portions. Due to this minor difference between the pattern 640A of the first exemplary embodiment and the pattern 640D of this fourth exemplary embodiment, instead of Eq. (17), Eq. (19) is usable with this fourth exemplary embodiment, for any three contiguous different interference portions centered at a location (x,y). The three contiguous different interference portions may be along a row, along a column, or an "L" shape of any orientation. In the case of an "L" shape, the (x,y) location is nominally the interior corner of the "L". Thus, for any region of three such contiguous different interference portions centered at a location (x,y), which will nominally be identified as the interference portions $Q_3(x,y)$, $Q_1(x,y)$, and $Q_0(x,y)$, one expression comparable to Eq. 10 in the 330 patent and to Eq. (2) above is:

$$\Phi(x,y)=\tan^{-1}\{[I_{Q3(x,y)}-I_{Q1(x,y)}]/[2I_{Q0(x,y)}-(I_{Q3(x,y)}+I_{Q1(x,y)})]\} \quad (19)$$

where I indicates the image intensity value for each respective interference portion.

Similarly, because this fourth exemplary embodiment provides only three separate "phase signals" arising from the three $Q_0$, $Q_1$ and $Q_3$ interference information portions, due to this minor difference between the pattern 640A of the first exemplary embodiment and the pattern 640D of this fourth exemplary embodiment, instead of Eq. (18), Eq. (20) is usable with this fourth exemplary embodiment. Thus, for any 4 contiguous interference portions, which can include at least three different types of interference portions, centered at a location (x,y), Eq.

(20) is usable. The four contiguous interference portions may be along a row, along a column, or within a 2×2 block. That is, the following exemplary alternative expression is also usable:

$$\Phi(x,y)=\tan^{-1}\{[I^{ave}_{Q3(x,y)}-I^{ave}_{Q1(x,y)}]/[2I^{ave}_{Q0(x,y)}-(I^{ave}_{Q3(x,y)}+I^{ave}_{Q1(x,y)})]\} \quad (20)$$

where $I^{ave}$ indicates the area-averaged image intensity value for each respective interference portion, regardless of the number of the various respective interference portions in the region of four contiguous interference portions.

It should be appreciated that, in each of Eqs. (19) and (20), in comparison to Eqs. (17) and (18), the "$I_{Q2(x,y)}$" terms are absent. Thus, some of the signal offsets that may be present in the $I_{Q0(x,y)}$ signals are not removed. However, because of the previously described "common-mode" error benefits that are obtained when using various embodiments according to the principle of this invention, many of the signal offsets in the $I_{Q0(x,y)}$ signals can be assumed to be the same as those in the $I_{Q3(x,y)}$ and $I_{Q1(x,y)}$ signals. Thus, it should be appreciated that subtracting the sub-expression ($I^{ave}_{Q3(x,y)}+I^{ave}_{Q1(x,y)}$) in Eq. (20) effectively removes most of the offset effects present in the $I_{Q0(x,y)}$ signals.

Thus, despite a minor disadvantage, the pattern configurations shown in FIG. 23, as well as other patterns configurations producing various combinations of 3 different interference portions, are usable in various embodiments according to the principles of this invention. Based on the foregoing examples and discussion, various modifications and other signal processing methods usable with the fourth particular embodiment will be apparent to one skilled in the art. More generally, based on the foregoing examples and discussion related to the various patterns shown in FIGS. 20–23, various other pattern modifications and other pattern combinations usable according to the principles of this invention will be apparent to one skilled in the art.

In various exemplary embodiments of the phase-shift imaging elements 3000, 4000, 5000 and/or 6000 according to this invention, the optical input portion 135 as representative of the various embodiments 135' or 135', includes a half-wave plate at its output, and outputs the combined wavefront 129 from the output imaging lens through the half-wave plate. As is known in the art, a selected orientation of the fast axis of the half-wave plate can rotate the polarization of the two orthogonally polarized incident wavefronts 124 and 128, which form the combined wavefront 129, by a selected amount. For example, either of orientations along the directions 132A and 133A, or along the directions 132B and 133B, as shown in FIGS. 8 and 13, are easily achieved, regardless of the initial orientation of the orthogonally polarized incident wavefronts 124 and 128 prior to entering the optical input portion 135. Of course, alternatively, the entire phase-shift imaging element may be rotated around the optical input axis to achieve a desired polarization angle relationship. However, this may be more complicated, unstable, or inconvenient than including an adjustable half-wave plate in the optical input portion 135.

Furthermore, in various exemplary embodiments of the phase-shift imaging elements 3000, 4000, 5000 and/or 6000 according to this invention, the optical input portion 135 as representative of the various embodiments 135' or 135' inputs the combined wavefront 129 through an "input" imaging lens, then spatially filters the combined wavefront 129 through an aperture, and propagates the resulting combined wavefront 129 through an "output" imaging lens. Such telecentric arrangements are known in the art for various interferometers that are similar to that shown in FIG. 1. The lenses of the optical input portion 135 may have a focal length f, and may provide a magnification M. It should be appreciated that the values for these parameters can be appropriately selected for a particular application of an apparatus according to this invention by experimentation or it can be appropriately selected by basic optical analysis.

In various exemplary embodiments according to this invention, two related considerations when appropriately selecting the values for these parameters are the speckle size, i.e., the size of speckles that are produced by certain objects at the surface of the detectors in various embodiments of the detector subsystem 700, and the lateral resolution determined by the optical input portion 135. In general, in applications where speckle is present, the nominal speckle size coincides with the nominal lateral resolution of the system.

In various exemplary embodiments, Eq. (21) can be used to analyze and adjust the nominal lateral resolution LR, and/or nominal speckle size S:

$$LR=S=1.22(M+1)*\lambda*f/a, \qquad (21)$$

where:
M is the magnification;
f is the focal length of the imaging lenses;
a is the effective aperture dimension; and
k is the wavelength of the light emitted by the laser source 110.

It should be appreciated that the speckle size obtained in various exemplary embodiments, where a collimated, coherent reference beam wavefront is mixed with the object beam wavefront by a polarizer near the detector, may actually be approximately twice that indicated by Eq. (21). It should be appreciated that the speckle size may be adjusted in various exemplary embodiments by changing an aperture of the input optical system. Moreover, that the aperture may be experimentally adjusted to achieve the speckle size and/or lateral resolution desired for a given application.

In general, in various exemplary embodiments, it is desirable that none of the comparable $Q_0$–$Q_3$ pixels in a set of $Q_0$–$Q_3$ pixels used to determine a measurement value corresponding to a particular location on the object 130 have a unique speckle content. Such a unique speckle content would distort the image intensity value I of the related comparable pixel, and, thus, introduce an error in the related measurement determination. Similarly, in various exemplary embodiments, it is desirable that none of the comparable $Q_0$–$Q_3$ pixels in a set of $Q_0$–$Q_3$ pixels used to determine measurement value corresponding to a particular location on the object 130 correspond to a unique local height on the object 130. Such a unique height would produce a unique nominal phase difference and a unique image intensity value I of the related comparable pixel. As a result, the related measurement determination would not reflect the best estimate of the average height at the particular location on the object 130.

Thus, in various exemplary embodiments, the lateral resolution provided in the image on a detector by the optical input portion 135 is nominally as large or larger than the largest lateral dimension of each complete set of comparable interference portions $Q_0$–$Q_3$ in the multiple phase-shifted interference image information 600 generated using the various exemplary embodiments of the systems and methods according to this invention. That is, in various exemplary embodiments, the lateral spatial averaging provided by the lateral resolution of the optical input portion 135 is nominally equal to or larger than the lateral spatial resolution corresponding to each complete set of comparable interference portions $Q_0$–$Q_3$ in the multiple phase-shifted interference image information 600 generated using the various exemplary embodiments of the systems and methods according to this invention.

The lateral resolution indicators 800A–800D in FIGS. 20–23 indicate, respectively, for various exemplary embodiments, the approximate exemplary relationship between a set of comparable $Q_0$–$Q_3$ pixels and the lateral resolution provided by the optical input portion 135. In various other exemplary embodiments, a relatively larger lateral resolution is used, and becomes the limiting factor in the lateral spatial resolution of the systems of such embodiments.

In any case, it should be appreciated that, in various exemplary embodiments according to this invention, at least the lateral resolution, the dimensions of the various portions of a high-density polarizer array 530 and/or the various portions of the various high-density phase-shifting array element 490 according to this invention, and the pixel size of detector are chosen interdependently, in light of various limiting design factors, costs and the like, to achieve various desirable features and relationships as outlined above.

It should be appreciated that, while various embodiments that generate interleaved two-, three-, and four-phase interference information have been emphasized above, the various elements, techniques, and combinations of elements disclosed above exemplify various additional elements, techniques and combinations of elements that are usable to generate up to several more phases of interleaved interference information, including redundant and/or "cyclic" interleaved phase information. For example, additional retardation thicknesses are easily incorporated into various high-density phase-shifting arrays according to this invention, to provide additional relative phase-shifts. Furthermore, various high-density polarizing arrays according to this invention can be used in combination with such high-density phase-shifting arrays having additional retardation thicknesses. It should be appreciated that, in various exemplary embodiments, such additional interleaved phase information is usable in combination with various corresponding signal processing methods to achieve higher levels of interpolated accuracy and resolution.

Thus, while this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An interferometer for analyzing a dimension of an object based on interleaved multiple phase-shifted interference information, comprising:
a transmitting portion that directs first and second differently polarized lights from a coherent light beam to a reference element and an object, respectively, combines the first and second differently polarized lights returned from the reference element and the object into a combined wavefront, and outputs the combined wavefront; and a multiple phase shift image generating portion arranged to input the combined wavefront, the multiple phase shift image generating portion comprising:

at least a first relative retardation array arranged along at least a first optical path, the first relative retardation array comprising at least two respective pluralities of relative retardation portions, each respective plurality of relative retardation portions comprising relative retardation portions of a single respective type that produces a respective amount of relative phase shift when transmitting the first and second differently polarized lights, the at least two respective pluralities of relative retardation portions arranged in an interleaved pattern within the first relative retardation array, and a first polarizer element arranged along the first optical path; and a detector portion comprising at least a first detector array arranged along the first optical path;

wherein:

the first relative retardation array receives at least a sub-wavefront of the combined wavefront including the first and second differently polarized lights;

each of the at least two respective pluralities of relative retardation portions transmits the first and second differently polarized lights of the sub-wavefront through the first polarizer element, each respective plurality of relative retardation portions in combination with the first polarizer element producing at least one respective plurality of interference portions along the first optical path, each of the respective pluralities of interference portions produced along the first optical path comprising interference light having a single respective relative phase shift; and the multiple phase shift image generating portion outputs interleaved multiple phase-shifted interference image information from at least the first optical path, the interleaved multiple phase-shifted interference image information output from the first optical path comprising the respective pluralities of interference portions produced along the first optical path, mutually interleaved in a pattern determined at least partially by the interleaved pattern of the respective pluralities of relative retardation portions in the first relative retardation array.

2. The interferometer of claim 1, wherein the interleaved multiple phase-shifted interference image information from the first optical path is output to form an interleaved multiple phase-shifted interference image on the first detector array.

3. The interferometer of claim 2, wherein each of the individual respective interference portions produced along the first optical path has nominal extents in the interleaved multiple phase-shifted interference image on the first detector array, and the nominal extents are nominally aligned to coincide with the boundaries of a coextensive set of pixels of the first detector array.

4. The interferometer of claim 3, wherein the coextensive set of pixels on the first detector array is N pixels wide and M pixels high, where M and N are integers.

5. The interferometer of claim 4, wherein M is at most equal to 16 and N is at most equal to 16.

6. The interferometer of claim 5, wherein M is at most equal to 8 and N is at most equal to 8.

7. The interferometer of claim 1, wherein the respective relative phase shift of a first respective plurality of interference portions produced along the first optical path differs from the respective relative phase shift of a second respective plurality of interference portions produced along the first optical path by one of (360N)+90 degrees, (360N)+120 degrees, (360N)+180 degrees, (360N)+240 degrees and (360N)+270 degrees, where N is an integer.

8. The interferometer of claim 1, wherein the at least two respective pluralities of relative retardation portions comprise at least three respective pluralities of relative retardation portions, at least three respective pluralities of interference portions are produced along the first optical path, and the at least three respective pluralities of interference portions comprise respective interference lights having respective relative phase shifts of (360N) degrees, (360N)+120 degrees, and (360N)+240 degrees.

9. The interferometer of claim 1, wherein the at least two respective pluralities of relative retardation portions comprise at least four respective pluralities of relative retardation portions, at least four respective pluralities of interference portions are produced along the first optical path, and the at least four respective pluralities of interference portions comprise respective interference lights having respective relative phase shifts of (360N) degrees, (360N)+90 degrees, (360N)+180 degrees and (360N)+270 degrees.

10. The interferometer of claim 1, wherein a structure of the first relative retardation array that at least partially determines the interleaved pattern of the first relative retardation array is positioned proximate to a detector surface of the first detector array, within a distance that is smaller than a depth of focus of the interleaved multiple phase-shifted interference image information output from the first-optical path.

11. The interferometer of claim 1, wherein the first polarizer element is fabricated on a surface of the first relative retardation array that faces the first detector array and the first polarizer element is positioned proximate to a detector surface of the first detector array.

12. The interferometer of claim 11, wherein the first polarizer element comprises a wire-grid polarizer element.

13. The interferometer of claim 1, wherein at least the first relative retardation array, the first polarizer element, and the first detector array form an integrated monolithic phase-shift imaging element.

14. The interferometer of claim 1, wherein:

the first polarizer element comprises a first polarizer array including a plurality of first polarizing portions having a first polarization direction and a plurality of second polarizing portions having a second polarization direction, the first and second polarizing portions arranged in a pattern within the first polarizer array;

the first polarizer array is aligned relative to the first relative retardation array along the first optical path such that:

for the first polarizing portions that are aligned with a relative retardation portion of a first respective type, the first polarizing portions transmit the first and second differently polarized lights of the sub-wavefront to produce a first respective plurality of interference portions along the first optical path comprising interference light having a first respective relative phase shift;

for the second polarizing portions that are aligned with a relative retardation portion of the first respective type, the second polarizing portions transmit the first and second differently polarized lights of the sub-wavefront to produce a second respective plurality of interference portions along the first optical path comprising interference light having a second respective relative phase shift;

for the first polarizing portions that are aligned with a relative retardation portion of a second respective type, the first polarizing portions transmit the first and second differently polarized lights of the sub-wavefront to produce a third respective plurality of interference portions along the first optical path comprising interference light having a third respective relative phase shift;

for the second polarizing portions that are aligned with a relative retardation portion of the second respective type, the second polarizing portions transmit the first and second differently polarized lights of the sub-wavefront to produce a fourth respective plurality of interference portions along the first optical path comprising interference light having a fourth respective relative phase shift; and the interleaved multiple phase-shifted interference image information output from the first optical path comprises at least the first, second, third and fourth respective pluralities of interference portions along the first optical path mutually interleaved in a pattern determined at least partially by the pattern of the first polarizing portions and the second polarizing portions in the first polarizer array in combination with the interleaved pattern of the respective pluralities of relative retardation portions in the first relative retardation array.

15. The interferometer of claim 14, wherein the first respective relative phase shift differs from the second respective relative phase shift by 180 degrees and the third respective relative phase shift differs from the fourth respective relative phase shift by 180 degrees.

16. The interferometer of claim 14, wherein the interleaved multiple phase-shifted interference image information from the first optical path is output to form an interleaved multiple phase-shifted interference image on the first detector array, each of the individual respective interference portions produced along the first optical path has nominal extents in the interleaved image on the first detector array, and the nominal extents are nominally aligned to coincide with the boundaries of a coextensive set of pixels of the first detector array.

17. The interferometer of claim 14, wherein:
the pattern of the plurality of first polarizing portions and the plurality of second polarizing portions in the first polarizer array comprises a striped polarization pattern, the interleaved pattern of the at least two respective pluralities of relative retardation portions of the first and second respective types in the first relative retardation array comprises a striped relative retardation pattern; and the striped relative retardation pattern is nominally orthogonal to the striped polarization pattern.

18. The interferometer of claim 14, wherein:
the pattern of the plurality of first polarizing portions and the plurality of second polarizing portions in the first polarizer array comprises a checkerboard polarization pattern, the interleaved pattern of the at least two respective pluralities of relative retardation portions of the first and second respective types in the first relative retardation array comprises a striped relative retardation pattern; and an individual stripe of the relative retardation pattern is nominally aligned with one of an individual row and an individual column of the checkerboard polarization pattern.

19. The interferometer of claim 1, wherein:
the multiple phase shift image generating portion further comprises:
a beam-splitting surface,
a second relative retardation array arranged along at least a second optical path, the second relative retardation array comprising at least two respective pluralities of relative retardation portions, each respective plurality of relative retardation portions comprising relative retardation portions of a single respective type that produces a respective amount of relative phase shift when transmitting the first and second differently polarized lights, the at least two respective pluralities of relative retardation portions arranged in an interleaved pattern within the second relative retardation array, and
a second polarizer element arranged along the second optical path; and
the detector portion further comprises a second detector array arranged along the second optical path;
wherein:
the beam-splitting surface is arranged to receive the combined wavefront and to transmit a first sub-wavefront of the combined wavefront including the first and second differently polarized lights along the first optical path and a second sub-wavefront of the combined wavefront including the first and second differently polarized lights along the second optical path;
the second relative retardation array receives the second sub-wavefront of the combined wavefront including the first and second differently polarized lights;
each of the at least two respective pluralities of relative retardation portions of the second relative retardation array transmits the first and second differently polarized lights of the second sub-wavefront through the second polarizer element, each respective plurality of relative retardation portions, in combination with the second polarizer element, producing at least one respective plurality of interference portions along the second optical path, each of the respective pluralities of interference portions produced along the second optical path comprising interference light having a single respective relative phase shift;
the first relative retardation array receives the first sub-wavefront of the combined wavefront and, in combination with the first polarizer array, transmits the first and second differently polarized lights of the first sub-wavefront to produce the respective pluralities of interference portions produced along the first optical path based on the first sub-wavefront;
the multiple phase shift image generating portion outputs the interleaved multiple phase-shifted interference image information from the first optical path comprising the respective pluralities of interference portions produced along the first optical path based on the first sub-wavefront; and
the multiple phase shift image generating portion further outputs interleaved multiple phase-shifted interference image information from the second optical path, the interleaved multiple phase-shifted interference image information output from the second optical path comprising the respective pluralities of interference portions produced along the second optical path, mutually interleaved in a pattern determined at least partially by the interleaved pattern of the respective pluralities of relative retardation portions in the second relative retardation array.

20. The interferometer of claim 19, wherein:
the interleaved multiple phase-shifted interference image information from the first optical path is output to form a first interleaved multiple phase-shifted interference image on the first detector array;
the interleaved multiple phase-shifted interference image information from the second optical path is output to form a second interleaved multiple phase-shifted interference image on the second detector array; and
the second interleaved multiple phase-shifted interference image corresponds to the first multiple phase-shifted interference interleaved image.

21. The interferometer of claim 20, wherein each of the individual respective interference portions produced along the first optical path and the second optical path has nominal extents in the corresponding interleaved multiple phase-shifted interference images on the corresponding detector arrays, and the nominal extents are nominally aligned to coincide with the boundaries of coextensive sets of pixels of the corresponding detector arrays, and the coextensive set of pixels are each N pixels wide and M pixels high, where M and N are integers at most equal to 16.

22. The interferometer of claim 19, wherein the respective relative phase shift of at least one respective plurality of interference portions produced along the first optical path differs from the respective relative phase shift of at least one respective plurality of interference portions produced along the second optical path by one of (360N)+90 degrees, (360N)+120 degrees, (360N)+180 degrees, (360N)+240 degrees and (360N)+270 degrees, where N is an integer.

23. The interferometer of claim 19, wherein:
the multiple phase shift image generating portion further comprises a first reflective surface and a second reflective surface;
the first reflective surface is arranged to receive the first sub-wavefront from the beam splitting surface and reflect the first sub-wavefront along a portion of the first optical path that extends along a first direction;
the second reflective surface is arranged to receive the second sub-wavefront from the beam splitting surface and reflect the second sub-wavefront along a portion of the second optical path that is parallel to the first direction;
the first relative retardation array and the second relative retardation array are nominally coplanar;
the first polarizer element and the second polarizer element are nominally coplanar; and
the first detector array and the second detector array are nominally coplanar.

24. The interferometer of claim 23, wherein at least one of a) the set of the relative retardation array and the second relative retardation array, b) the set of the first polarizer element and the second polarizer element, and c) the set of the first detector array and the second detector array comprise first and second portions of the same element.

25. The interferometer of claim 19, wherein at least the elements of the multiple phase shift image generating portion and the first detector array form an integrated phase-shift imaging element.

26. The interferometer of claim 1, wherein the first relative retardation array comprises a birefringent material formed such that each respective plurality of relative retardation portions has a corresponding respective thickness in the birefringent material along the direction of the first optical path.

27. The interferometer of claim 26, wherein the birefringent material comprises at least one of a substrate and a material layer of the first relative retardation array.

28. The interferometer of claim 1, wherein the first relative retardation array comprises a birefringent material that can be processed to vary the fast axis direction within the birefringent material, and each respective plurality of relative retardation portions has a corresponding respective fast axis alignment direction in the birefringent material.

29. The interferometer of claim 28, wherein the birefringent material that can be processed to vary the fast axis direction has a substantially constant nominal thickness throughout the first relative retardation array.

30. The interferometer of claim 28, wherein the birefringent material that can be processed to vary the fast axis direction is formed with a pattern of at least two thicknesses, such that the respective amount of relative phase shift produced by each respective plurality of relative retardation portions depends on a respective combination of the respective thickness and the respective fast axis alignment direction corresponding to that respective plurality of relative retardation portions.

31. An interferometer for analyzing a dimension of an object based on interleaved multiple phase-shifted interference information, comprising:
a transmitting portion that directs first and second differently polarized lights from a coherent light beam to a reference element and an object, respectively, combines the first and second differently polarized lights returned from the reference element and object into a combined wavefront, and outputs the combined wavefront;
a multiple phase shift image generating portion arranged to input the combined wave front, the multiple phase shift image generating portion comprising:
at least a first relative retardation array arranged along at least a first optical path, the first relative retardation array comprising at least two respective pluralities of relative retardation portions, each respective plurality of relative retardation portions comprising relative retardation portions of a single respective type that produces a respective amount of relative phase shift when transmitting the first and second differently polarized lights, the at least two respective pluralities of relative retardation portions arranged in an interleaved pattern within the first relative retardation array, and
a first polarizer element arranged along the first optical path; and
a detector portion comprising at least a first detector array arranged along the first optical path, wherein:
the multiple phase shift image generating portion generates and outputs interleaved multiple phase-shifted interference image information from at least the first optical path, the interleaved multiple phase-shifted interference image information output from the first optical path comprising respective pluralities of interference portions produced along the first optical path, the respective pluralities of interference portions mutually interleaved in a pattern determined at least partially by the interleaved pattern of the respective pluralities of relative retardation portions in at least the first relative retardation array.

32. A method for using an interferometer that analyzes a dimension of an object based on interleaved multiple phase-shifted interference information, comprising:
directing first and second differently polarized lights from a coherent light beam to a reference element and an object;

combining the first and second differently polarized light returned from the reference element and object into a combined wavefront;

directing at least a sub-wavefront of the combined wavefront including the first and second differently polarized lights to be received by at least a first relative retardation array arranged along at least a first optical path, the first relative retardation array comprising:

at least two respective pluralities of relative retardation portions, each respective plurality of relative retardation portions comprising relative retardation portions of a single respective type that produces a respective amount of relative phase shift when transmitting the first and second differently polarized lights, the at least two respective pluralities of relative retardation portions arranged in an interleaved pattern within the first relative retardation array;

transmitting the first and second differently polarized lights of the sub-wavefront received by the first relative retardation array through each of the at least two respective pluralities of relative retardation portions and through a first polarizer element arranged along the first optical path such that each respective plurality of relative retardation portions, in combination with the first polarizer element, produces at least one respective plurality of interference portions along the first optical path, each of the respective pluralities of interference portions produced along the first optical path comprising interference light having a single respective relative phase shift; and outputting interleaved multiple phase-shifted interference image information from at least the first optical path to a detector portion comprising at least a first detector array arranged along the first optical path;

wherein the interleaved multiple phase-shifted interference image information output from the first optical path comprises the respective pluralities of interference portions produced along the first optical path, mutually interleaved in a pattern determined at least partially by the interleaved pattern of the respective pluralities of relative retardation portions in the first relative retardation array.

33. The method of claim 32, wherein outputting the interleaved multiple phase-shifted interference image information from at least the first optical path to a detector portion comprises forming an interleaved multiple phase-shifted interference image on the first detector array.

34. The method of claim 33, wherein each of the individual respective interference portions produced along the first optical path has nominal extents in the interleaved multiple phase-shifted interference image on the first detector array; and forming the interleaved image on the first detector array comprises projecting the individual respective interference portions produced along the first optical path onto the first detector array such that the nominal extents nominally coincide with the boundaries of a coextensive set of pixels of the first detector array.

35. The method of claim 34, wherein the coextensive set of pixels on the first detector array is N pixels wide and M pixels high, where M and N are integers and M is at most equal to 16 and N is at most equal to 16.

36. The method of claim 32, wherein the first polarizer element comprises a first polarizer array including a plurality of first polarizing portions having a first polarization direction and a plurality of second polarizing portions having a second polarization direction, the first and second polarizing portions arranged in a pattern within the first polarizer array;

the pattern within the first polarizer array and the interleaved pattern within the first relative retardation array are in a nominal alignment along the direction of the first optical path; and transmitting the first and second differently polarized lights of the sub-wavefront received by the first relative retardation array through each of the at least two respective pluralities of relative retardation portions and through the first polarizer element arranged along the first optical path comprises:

transmitting the first and second differently polarized lights of the sub-wavefront received by the first relative retardation array through relative retardation portions of a first respective type and through the first polarizing portions that are aligned with the relative retardation portions of the first respective type to produce a first respective plurality of interference portions along the first optical path comprising interference light having a first respective relative phase shift;

transmitting the first and second differently polarized lights of the sub-wavefront received by the first relative retardation array through relative retardation portions of the first respective type and through the second polarizing portions that are aligned with the relative retardation portions of the first respective type to produce a second respective plurality of interference portions along the first optical path comprising interference light having a second respective relative phase shift;

transmitting the first and second differently polarized lights of the sub-wavefront received by the first relative retardation array through relative retardation portions of a second respective type and through the first polarizing portions that are aligned with the relative retardation portions of the second respective type to produce a third respective plurality of interference portions along the first optical path comprising interference light having a third respective relative phase shift;

transmitting the first and second differently polarized lights of the sub-wavefront received by the first relative retardation array through relative retardation portions of the second respective type and through the second polarizing portions that are aligned with the relative retardation portions of the second respective type to produce a fourth respective plurality of interference portions along the first optical path comprising interference light having a fourth respective relative phase shift; and outputting the interleaved multiple phase-shifted interference image information from at least the first optical path to a detector portion comprises outputting at least the first, second, third and fourth respective pluralities of interference portions along the first optical path mutually interleaved in a pattern determined at least partially by the pattern of the first polarizing portions and the second polarizing portions in the first polarizer array in combination with the interleaved pattern of the respective pluralities of relative retardation portions in the first relative retardation array.

37. The method of claim 36, wherein the first respective relative phase shift differs from the second respective relative phase shift by 180 degrees and the third respective relative phase shift differs from the fourth respective relative phase shift by 180 degrees.

38. The method of claim 32, further comprising:
directing at least a second sub-wavefront of the combined wavefront including the first and second differently polarized lights to be received by at least a second relative retardation array arranged along at least a second optical path, the second relative retardation array comprising:
at least two respective pluralities of relative retardation portions, each respective plurality of relative retardation portions comprising relative retardation portions of a single respective type that produces a respective amount of relative phase shift when transmitting the first and second differently polarized lights, the at least two respective pluralities of relative retardation portions arranged in an interleaved pattern within the second relative retardation array;
transmitting the first and second differently polarized lights of the sub-wavefront received by the second relative retardation array through each of the at least two respective pluralities of relative retardation portions and through a second polarizer element arranged along the second optical path such that each respective plurality of relative retardation portions produces at least one respective plurality of interference portions along the second optical path, each of the respective pluralities of interference portions produced along the second optical path comprising interference light having a single respective relative phase shift; wherein
outputting the interleaved multiple phase-shifted interference image information from at least the first optical path to a detector portion further comprises outputting interleaved multiple phase-shifted interference image information from at least the second optical path to a detector portion comprising at least a second detector array arranged along the second optical path; and
the interleaved multiple phase-shifted interference image information output from the second optical path comprises the respective pluralities of interference portions produced along the second optical path mutually interleaved in a pattern determined at least partially by the interleaved pattern of the respective pluralities of relative retardation portions in the second relative retardation array.

39. The method of claim 38, wherein:
outputting interleaved multiple phase-shifted interference image information from at least the first optical path to the first detector array comprises forming a first interleaved multiple phase-shifted interference image on the first detector array;
outputting interleaved multiple phase-shifted interference image information from at least the second optical path to the second detector array comprises forming a second interleaved multiple phase-shifted interference image on the second detector array; and
the second interleaved multiple phase-shifted interference image corresponds to the first interleaved multiple phase-shifted interference image.

40. The method of claim 38, wherein:
each of the individual respective interference portions produced along the first optical path and the second optical path has nominal extents in the corresponding interleaved multiple phase-shifted interference images on the corresponding detector arrays;
the nominal extents are nominally aligned to coincide with the boundaries of coextensive sets of pixels of the corresponding detector arrays; and the coextensive set of pixels are each N pixels wide and M pixels high, where M and N are integers at most equal to 16.

41. The method of claim 38, wherein the respective relative phase shift of at least one respective plurality of interference portions produced along the first optical path differs from the respective relative phase shift of at least one respective plurality of interference portions produced along the second optical path by one of (360N)+90 degrees, (360N)+120 degrees, (360N)+180 degrees, (360N)+240 degrees and (360N)+270 degrees, where N is an integer.

42. The method of claim 38, wherein:
directing at least a sub-wavefront of the combined wavefront including the first and second differently polarized lights to be received by at least a first relative retardation array arranged along at least a first optical path comprises:
directing the first sub-wavefront to a first reflective surface, and
directing the first sub-wavefront from the first reflective surface to the first relative retardation array along a portion of the first optical path that extends along a first direction; and
directing at least a second sub-wavefront of the combined wavefront including the first and second differently polarized lights to be received by at least a second relative retardation array arranged along at least a second optical path comprises:
directing the second sub-wavefront to a second reflective surface, and
directing the second sub-wavefront from the second reflective surface to the second relative retardation array along a portion of the second optical path that that is parallel to the first direction;
wherein:
the first relative retardation array and the second relative retardation array are nominally coplanar;
the first polarizer element and the second polarizer element are nominally coplanar; and
the first detector array and the second detector array are nominally coplanar.

43. A method for using an interferometer that analyzes a dimension of an object based on interleaved multiple phase-shifted interference information, comprising:
directing first and second differently polarized lights from a coherent light beam to a reference element and an object;
combining the first and second differently polarized light returned from the reference element and object into a combined wavefront;
directing at least a sub-wavefront of the combined wavefront including the first and second differently polarized lights to be received by at least a first relative retardation array arranged along at least a first optical path, the first relative retardation array comprising:
at least two respective pluralities of relative retardation portions, each respective plurality of relative retardation portions comprising relative retardation portions of a single respective type that produces a respective amount of relative phase shift when transmitting the first and second differently polarized lights, the at least two respective pluralities of relative retardation portions arranged in an interleaved pattern within the first relative retardation array;
transmitting the first and second differently polarized lights of the sub-wavefront received by the first relative retardation array through a first polarizer element arranged along the first optical path to produce interleaved multiple phase-shifted interference image information from at least the first optical path; and outputting interleaved multiple phase-shifted interference image information from at least the first optical path;

wherein the interleaved multiple phase-shifted interference image information output from the first optical path comprises the respective pluralities of interference portions produced along the first optical path, mutually interleaved in a pattern determined at least partially by the interleaved pattern of the respective pluralities of relative retardation portions in the first relative retardation array.

* * * * *